United States Patent [19]

Winograd

[11] 4,156,920
[45] May 29, 1979

[54] COMPUTER SYSTEM ARCHITECTURE FOR PERFORMING NESTED LOOP OPERATIONS TO EFFECT A DISCRETE FOURIER TRANSFORM

[75] Inventor: Shmuel Winograd, Scarsdale, N.Y.

[73] Assignee: International Business Machines Corporation, Armonk, N.Y.

[21] Appl. No.: 811,731

[22] Filed: Jun. 30, 1977

[51] Int. Cl.² .......................................... G06F 15/34
[52] U.S. Cl. ................................................ 364/726
[58] Field of Search ...................................... 364/726

[56] References Cited

U.S. PATENT DOCUMENTS

| | | | |
|---|---|---|---|
| 3,952,186 | 4/1976 | Speiser et al. | 364/726 |
| 4,023,028 | 5/1977 | Dllard | 364/726 |
| 4,051,357 | 9/1977 | Bonnerot | 364/726 |
| 4,058,715 | 11/1977 | Niwa | 364/726 |

*Primary Examiner*—Jerry Smith
*Attorney, Agent, or Firm*—Roy R. Schlemmer, Jr.

[57] ABSTRACT

A computer system architecture and method for performing the Discrete Fourier Transform on a set of N sampled input signals wherein N is chosen to be the product of a group of predetermined relatively prime factors ($n_1 \cdot n_2 \cdot ... \cdot n_L$). The present architecture then proceeds to the solution of the Fourier transform via a unique nested loop solution method, wherein each loop is specifically related to each factor and wherein no multiplications are performed in the outer loops said method being further characterized by the fact that the system control is automatically passed to the next inner loop whenever a multiplication instruction is encountered. A unique predetermined sequence of operations which is unique to each factor ($n_j$) is built into the system controls and automatic control means proceed from one sequence to another depending upon the factors (n) associated with a chosen N. The unique set of instruction sequences for each small factor of (n) is predicated upon a unique solution for the small Fourier transform matrix associated with said factor.

Means are included in the system so that in all outer loops all addition operations required are performed on vector quantities and, in the single innermost loop, additions and multiplications are performed on scalar quantities. Means are additionally provided for determining composite coefficients to be used in multiplications occuring in the innermost loop, said composite coefficients comprising the product of the multiplication coefficient to be currently performed in the innermost loop as well as the coefficient essential with each pseudo multiply in each outermost loop currently involved in the current innermost loop computation.

After all loop input adds, multiplications, and output adds have been performed the resultant output vector is the Fourier transform of the original input vector.

In addition to the actual transform procedure an input vector reordering operation must be performed and an output vector reordering operation.

7 Claims, 35 Drawing Figures

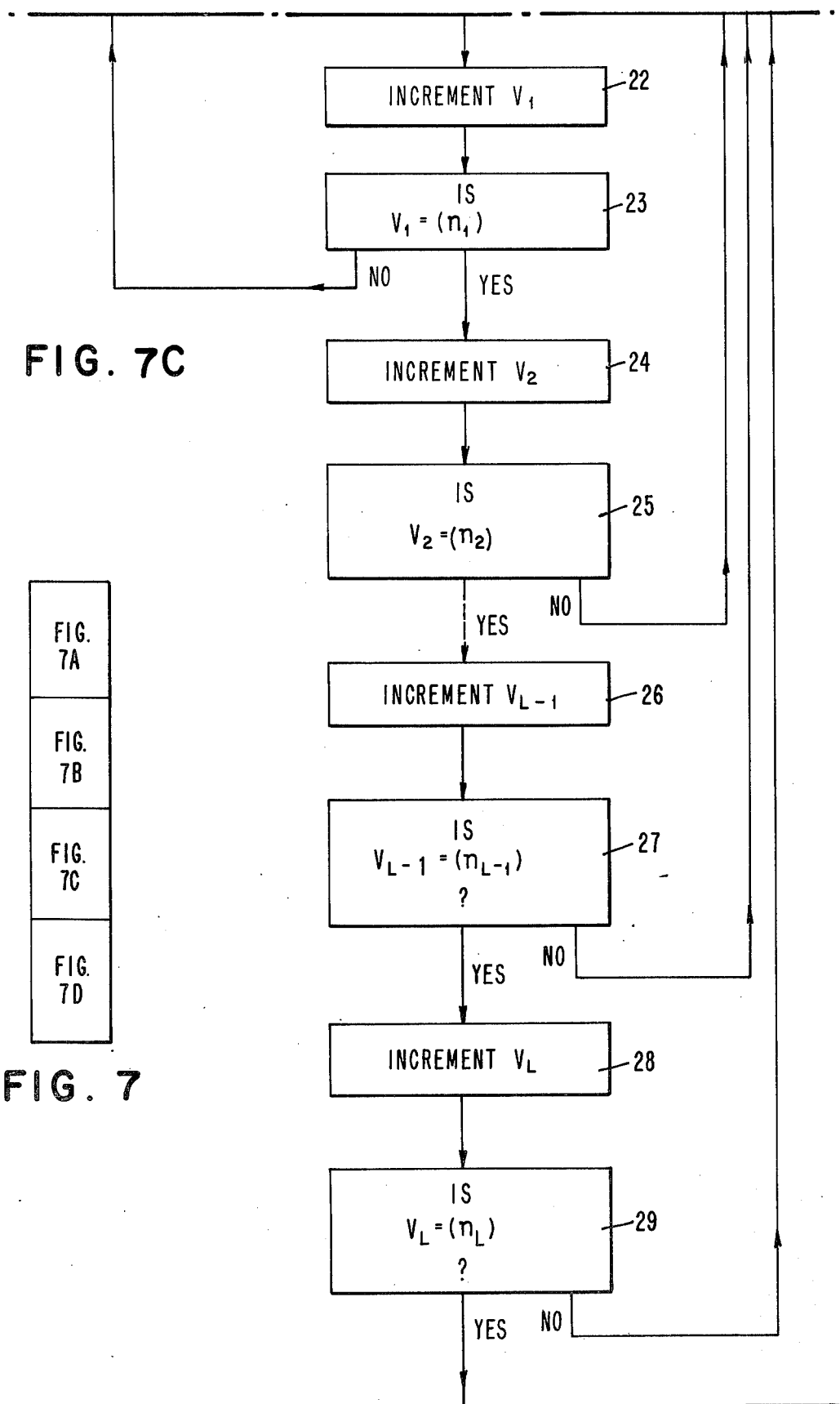

| FIG. 8A | FIG. 8B |

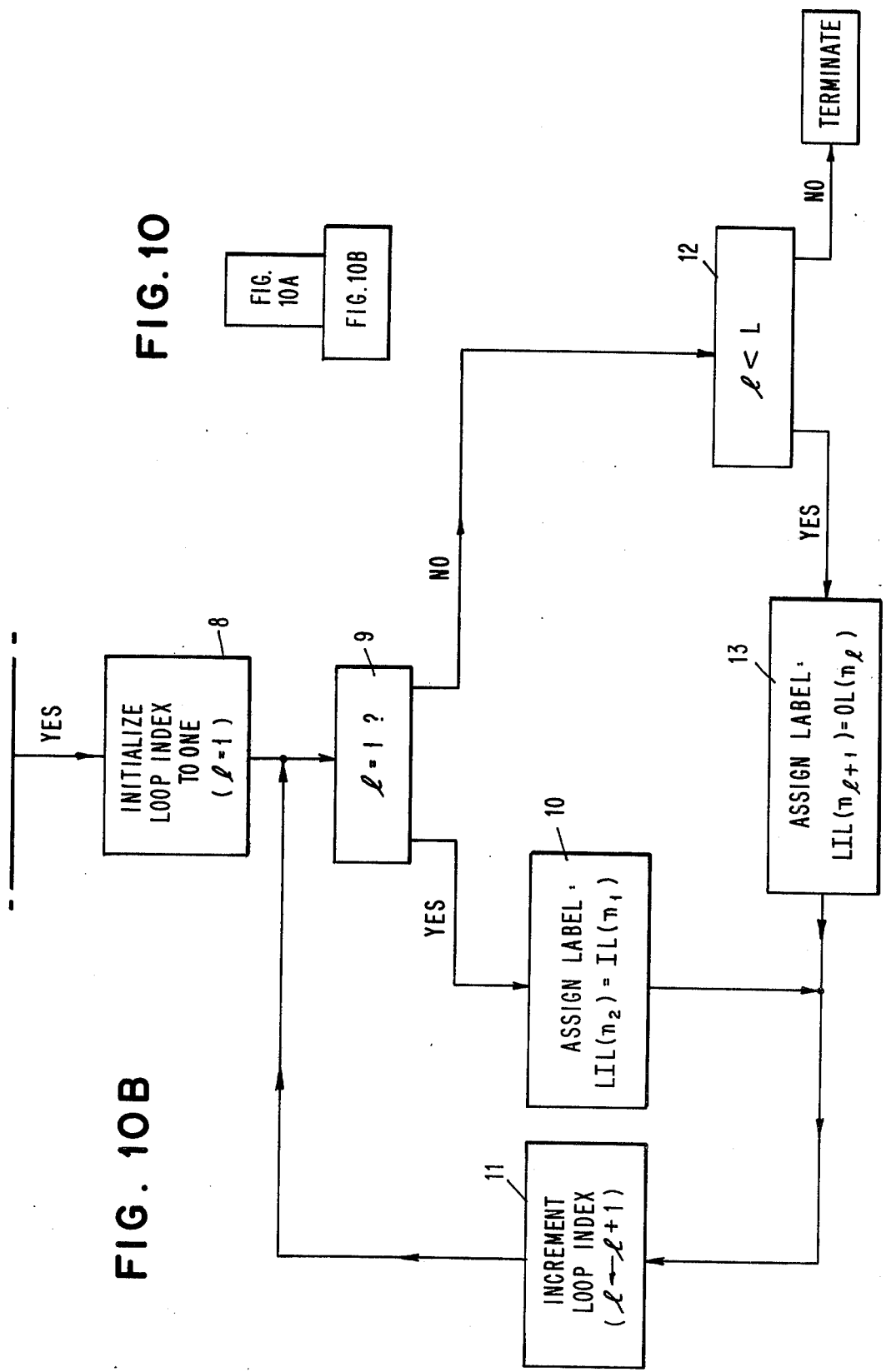

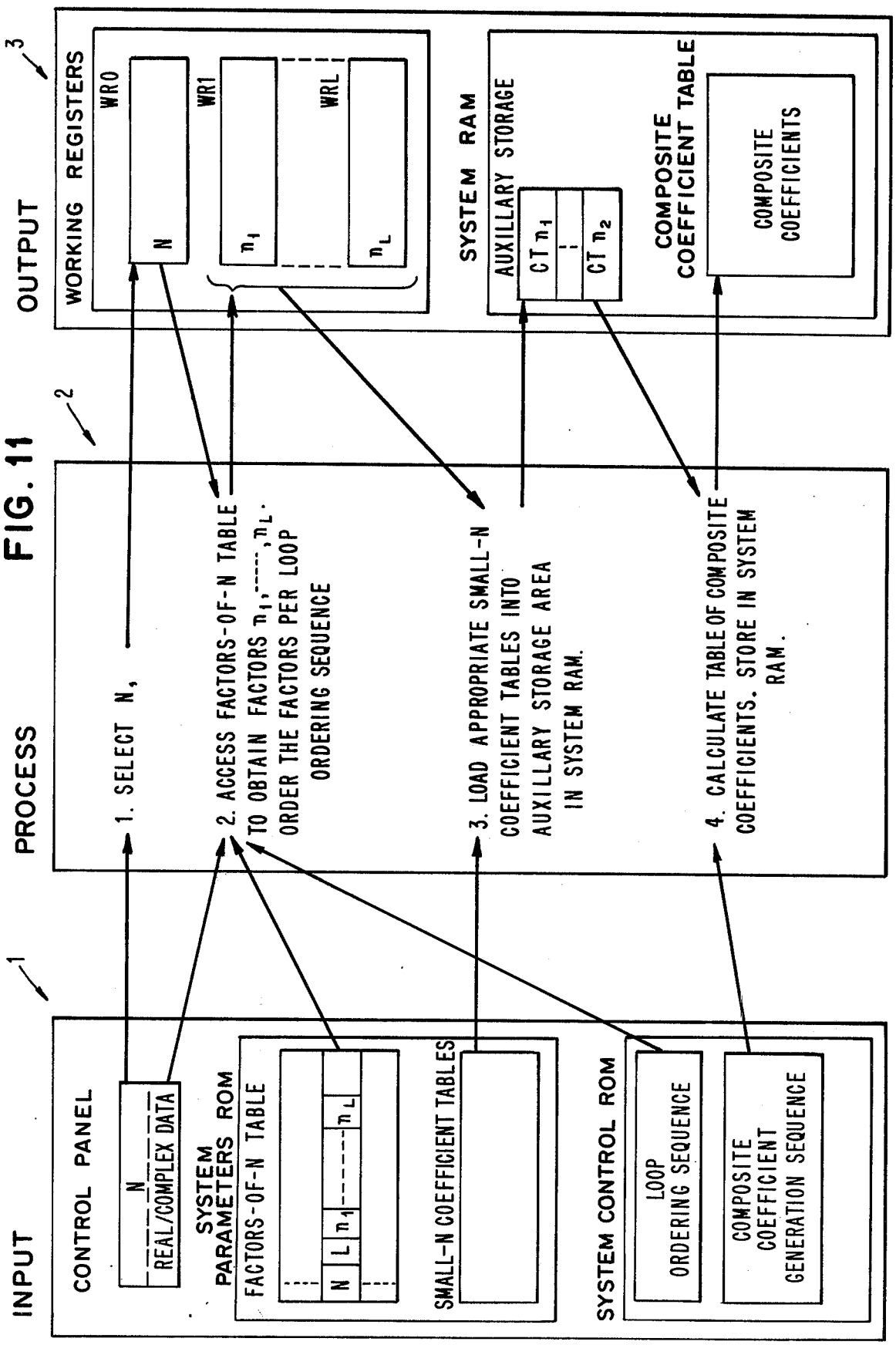

SYSTEM PARAMETERS ROM    FIG. 15

SMALL-n COEFFICIENT TABLES:

| CT2 | CT3 | CT4 | CT5 | CT7 | CT8 |
|---|---|---|---|---|---|
| C 2-1<br>C 2-2 | C 3-1<br>C 3-2<br>C 3-3 | C 4-1<br>⋮<br>C 4-4 | C 5-1<br>⋮<br>C 5-6 | C 7-1<br>⋮<br>C 7-9 | C 8-1<br>⋮<br>C 8-8 |

| CT9 | CT13 | CT16 |
|---|---|---|
| C 9-1<br>⋮<br>C 9-13 | C 13-1<br>⋮<br>C 13-21 | C 16-1<br>⋮<br>C 16-18 |

MULTIPLIES/FACTOR TABLE

| $n_i$ | $M_{n_i}$ |
|---|---|
| 2 | 2 |
| 3 | 3 |
| 4 | 4 |
| 5 | 6 |
| 7 | 9 |
| 8 | 8 |
| 9 | 13 |
| 13 | 21 |
| 16 | 18 |

FACTORS-OF-N TABLE:

| N | L | n1 | n2 | n3 | n4 | n5 |
|---|---|---|---|---|---|---|
| 2 | 1 | 2 | - | - | - | - |
| ⋮ | | | | | | |
| 5 | 1 | 5 | - | - | - | - |
| ⋮ | | | | | | |
| 10 | 2 | 5 | 2 | - | - | - |
| ⋮ | | | | | | |
| 234 | 3 | 13 | 9 | 2 | - | - |
| ⋮ | | | | | | |
| 2,520 | 4 | 9 | 5 | 7 | 8 | - |
| ⋮ | | | | | | |
| 65,520 | 5 | 13 | 9 | 5 | 7 | 16 |

SYSTEM RAM ALLOCATION DIAGRAM

DATA RAM ALLOCATION DIAGRAM

| | | |
|---|---|---|
| LOOP INDEX : | 3 | |
| LOOP FACTOR | $n3 = 3$ | |
| LOOP PROCEDURE | OL(3) | |
| VECTOR DIMENSION | N(3) VEC = 20 | |
| LOOP ENTRY LABEL | LL(3) = OL(3) | |
| LOOP INWARD LABEL | LIL(3) = OL(4) | |
| LOOP OUTWARD LABEL | LOL(3) = RTNLAB | |

COMPUTER SYSTEM ARCHITECTURE FOR PERFORMING NESTED LOOP OPERATIONS TO EFFECT A DISCRETE FOURIER TRANSFORM

BACKGROUND OF THE INVENTION

The present invention relates generally to the field of digital data processing apparatus and more particularly to the architecture of a computer system adapted to perform a discrete Fourier transform on a set of input signals representing a complex waveform.

It has long been known that the frequency spectrum of an electrical signal may be derived by application of the Fourier transform to that signal in the time domain. The frequency domain characteristics of a waveform in the time domain provide a very useful analytical tool in a variety of technical disciplines. The pure Fourier analysis of a given periodic function represents the function as the sum of a number, usually infinite, of simple harmonic components. Because the response of a linear dynamic system to a simple harmonic input is usually easy to obtain, the response to an arbitrary complex periodic input can be obtained from its Fourier analysis. Likewise, the field of spectrum analysis, by providing a frequency domain representation of a waveform, facilitates identification of unknown waveforms. Stated differently, if the frequency and the magnitude of the components can be identified, a composite can often be identified or at least usefully characterized. (A typical application would be in human voice recognition.)

In biomedicine, there have been attempts at the Massachusetts Institute of Technology as early as 1950 to adopt the tools of correlation and spectral-density analysis to the interpretations of the electroencephalogram. The Fourier transform is an efficient method for performing correlation and spectral-density analysis of an input signal. This analysis of input signals has not only been attempted with brain waves but also with electrocardiograph signals where reasonable success has taken place in the automatic machine diagnosis of cardiac pathology. These methods have also provided a better basis for the understanding of biological systems through their application to model synthesis.

Analysis of echoes from subterranean structures, such as are produced in seismic technology, has in recent years, been furthered through the use of Fourier transforms on such data. In oceanography, the Fourier transform has been important in the analysis of various time series such as water temperature, salinity, tides, ocean currents, etc.

The post World War II era has also seen the tools of Fourier transforms of time series stimulate new research in the fields of economics. Significant contributions to the literature has been made by R. G. Brown and Arthur D. Little in the field of inventory and production control, and by C. Granger of the Economics Research Program at Princeton University in the application of spectral-analysis to economic time series.

In the prior art, the computation of the Fourier transform for a given data sample has required an elaborate computer means if the results are to be meaningful and quickly obtainable. Large scale general purpose digital computers have been employed for computing the Fourier transform. These systems are exceedingly expensive, not availabe in many instances, require programming and related paper work, do not communicate directly with the scientist or economist user and are generally inefficient in performing the Fourier transform. Recently, time sharing has made the digital computer more accessible but the availability of terminal equipment for two-way communication and especially communication of visual information presents considerable problems and expense. In addition, the availability of telephone lines and the simultaneous use of a central computer by many users makes real time computation exceedingly difficult to realize and presents serious problems of priority and program storage and selections.

With respect to the more efficient usage of the digital computer, special techniques for improving the efficiency of large scale digital computers have been developed. The publication by J. W. Cooley and J. W. Tukey, "An Algorithm for the Machine Calculation of Complex Fourier Series," Math of Computation, Vol. 19, pp. 297–301, April 1965, explains such techniques further.

It is also known that an N Point FFT processor may be formed by cascading an A point FFT processor and a B point FFT processor where $A \cdot B = N$. When a prime factor algorithm is selected for implementation, that is, when A and B are mutually prime numbers, no intervening phase shifters (or "twiddle factors") are required between the cascaded stages as discussed in an article entitled "Historical Notes on the Fast Fourier Transform" by J. W. Cooley, P. A. W. Lewis and P. D. Welch published in the IEEE transactions on Audio and Electroacoustics, Vol. AU-15, No. 2, June 1967. Therefore, implementation of such prime factor algorithm by cascading a pair of mutually prime FFT processors would not require interstage (or inter-processor) multipliers.

General Description of the Fourier Transform

The Fourier transform depends upon the underlying realization that any periodic amplitude function in the time domain may be constructed by superimposing a variety of sine and cosine functions in the time domain, each of these functions having a predetermined amplitude.

The Fourier transform is usually defined as follows:

$$A(f) = \int_{-\infty}^{\infty} a(t) e^{-j2\pi ft} dt \tag{1}$$

Early attempts to mechanize the Fourier transform utilized analog techniques which consisted primarily of the application of a time domain waveform to a series of bandpass filters, such that the response from each of the filters is indicative of the amplitude of the frequency domain components of the time domain function within a given frequency band width. Because of the requirement for a large number of filters, in order to cover a broad over-all pass band while maintaining the pass bands of the individual filters reasonably narrow, such techniques were notable for their high equipment cost. These costs were reduced through the use of a number of analog techniques, including the reiteration of a given time sample through a single bandpass filter, while changing the center frequency of the filter for each iteration, thereby allowing one filter to selectively sample for a plurality of frequency components. This reiteration, however, required additional time, and the input waveform could be sampled only once during each of the relatively long reiteration periods.

General Description of the Discrete Fourier Transform

Early attempts to use digital techniques for determining the frequency domain function corresponding to a time domain, waveform utilized the discrete Fourier transform which allows frequency domain components to be derived from a set of periodic discrete amplitude samples of an input time domain waveform. These techniques were likewise limited to a periodic sampling of the input waveform, but the speed of digital calculation allowed a reduction of the sampling period from that required by analog techniques. The analogous discrete Fourier transform pair that applies to sampled versions of the functions given in the equation can be written in the following form:

$$A(r) = \sum_{k=0}^{N-1} a(k)e^{-\frac{(i2\pi rk)}{N}} \quad (2).$$

where:

$A(r) =$ THE $r^{th}$ COEFFICIENT OF THE FREQUENCY DOMAIN FUNCTION $a(k) =$ THE $k^{th}$ COEFFICIENT OF THE TIME DOMAIN FUNCTION $N =$ number of samples taken Since the discrete Fourier transform samples must be taken during a predetermined time period, the input time domain waveform is assumed to be periodic in the time domain, and to have a period which is equal to N times the sampling time, i.e., the errors introduced by truncating the time domain waveform are assumed to be negligible. In fact, these errors are often not negligible, and numerous techniques have been utilized to diminish the effect of the time domain truncation, such as the multiplicative superimposition upon the time domain samples of a suitable "window" function, for example, the cosine-squared function, in order to smooth the transition into and out of the time sampling period.

In order to accomplish the discrete Fourier transform or the inverse discrete Fourier transform $N^2$ computations are required, each computation including a multiplication and an addition. For a reasonably precise transform, such as one where $N = 2048$, the number of computations exceed 4,000,000, and therefore either an excessive amount of hardware is necessary, or an unreasonably long time is required to complete the computation if the same hardware handles successive computations.

General Description of the Cooley/Tukey Fourier Transform Algorithm

A fast Fourier transform algorithm (FFT) was derived by J. W. Cooley and J. W. Tukey and initially published in Mathematics of Computation, volume 19, pages 297 to 301, April, 1965. This algorithm recognizes the similarities in a number of the $N^2$ multiply and add computations of the discrete Fourier transform, and utilizes these similarities to reduce the total number of computations required to calculate the discrete Fourier transform. By using the fast Fourier transform algorithm outlined by J. W. Cooley and J. W. Tukey, the computations are reduced from $N^2$ operations to $N/(2) \log_2 N$ complex multiplications, $N/(2) \log_2 N$ complex additions, and $N/(2) \log_2 N$ complex subtractions.

Although the Fast Fourier Transform algorithm clearly has the advantages stated for the particular class of N values, its usefulness is essentially limited to values of N which are a power of 2. However, anytime one of the factors is not a power of two the advantages of the FFT begin to diminish.

As stated previously, the FFT results in a saving of several orders of magnitude in total computation necessary in order to perform a particular Fourier Transform and thus constitutes a major step forward in the computational arts in this area. The advantages of providing a computer system capable of performing the Fourier Transform with one or two orders of magnitude saving even over the FFT method and systems based thereon would have obvious advantages especially in areas where it might be desirable to utilize the Fourier Transform for purposes for which it was hitherto considered either too time consuming and/or too expensive.

It is also obvious that it would be most helpful to have a computer capable of performing a Fourier Transform in a highly efficient manner on a substantially larger number of N's so that the method could be applied to a wider range of problems.

PRIOR ART

The following patents are exemplary of hardware systems which exist in the art for enhancing the performances of the Discrete Fouier Transform on various forms of computing engines. All of these patents are directed to a variety of special architectures for simplifying and/or improving the efficiency of calculation of the transform. These patents taken as a whole together with the hereinafter referenced articles by Messrs. Cooley and Tukey, are representative of the state of the art in this field prior to the entrance by the present inventor.

It is to be noted that none of these patents discloses or suggests an architectural system or method of solution which is considered in any way similar to that set forth herein.

U.S. Pat. No. 3,610,901, entitled Digital Modified Discrete Fourier Transform Doppler Radar Processor of D. D. Lynch, Oct. 5, 1971.

U.S. Pat. No. 3,636,333, entitled Fourier Coefficient Generator of W. E. Klund, Jan. 18, 1972.

U.S. Pat. No. 3,638,004, entitled Fourier Transform Computer of E. A. Sloane et al dated Jan. 25, 1972.

U.S. Pat. No. 3,800,130, entitled Fast Fourier Transform Stage Using Floating Point Numbers of L. W. Martinson dated Mar. 26, 1974.

U.S. Pat. No. 3,883,726, entitled Redundant Fast Fourier Transform Data Handling Computer of R. O. Schmidt dated May 13, 1975.

U.S. Pat. No. 3,899,667, entitled Serial Three Point Discrete Fourier Transform Apparatus of J. D. Simone dated Aug. 12, 1975.

While the above list in no way approaches being complete it is considered exemplary of currently issuing patents in the special purpose Fast Fourier Transform computer area. There are a number of subclasses devoted to this art, however, it is believed that the herein disclosed system architecture and method departs quite radically from any previously known and utilized.

SUMMARY AND OBJECTS OF THE INVENTIONS

It has now been found that a highly novel and efficient digital computer system architecture for the solution of Fourier transforms is possible by first selecting an input vector size N such that it is factorable into a set of unique relatively prime factors, each of which is susceptible of a unique individual solution wherein the numbers of adds and multiples are minimized. Utilizing these concepts, the computer architecture and controls perform the transform on a given input data vector of dimension N utilizing a nested loop sequence of operations wherein each operation consists of at least one inner loop. It is implicit in the system that all operations performed in outer loops are vector operations whose size is determined by the particular N being evaluated, but wherein only additions are performed in said outer loops and wherein once a multiplication is encountered in the instruction sequence an automatic jump inward occurs and an evaluation of said next inner loop and subsequent inward jumps continue until the innermost loop is encountered. In this innermost loop all additions are scalar in nature as are the multiplications. However, the coefficient utilized with each inner multiplication loop is a composite of all the coefficients encountered in all of the loops of the system for the particular sequence of inward transitions for the multiplication being performed. Means are further provided for automatically returning to an outer loop each time an inner loop is completed, the product of return being directly ascertainable from the loop sequence controls.

When the output adds of the outer most loop have been completed the transform evaluation is terminated. However, it will be understood from the subsequent description that an initial vector reordering or permutation is performed on the input data vector prior to entering the evaluation stage of the system and similarly subsequent to the actual tranform evaluation a final or output vector reordering must occur to return the output vector to its proper order. It will further be noted that the input and output reorderings are not simple inverses of each other but must be ascertained independently.

It is a primary object of the present invention to provide a computer system architecture uniquely adapted to the rapid and efficient calculation of the Fourier transform of a vector of dimension N.

It is another object of the invention to provide such an architecture which minimizes the number of calculations necessary to perform such a transform.

It is still another object of the present invention to provide such a computer architecture for performing fast and efficient Fourier transform operations which will render practical a whole new class of applications of the Fourier analysis techniques.

It is still a further object of the invention to provide such a computer system for performing highly efficient Fourier transforms on a broad and highly useful class of transform sizes (N's).

It is another object to provide such a system which is equally adaptable to perform the Fourier transform equation on either real or complex data with similar savings in times of solution.

It is a further object of the invention to provide such a system architecture based on the concept of a nested loop solution method of the discrete Fourier transform.

It is a still further object of the invention to provide such an architecture wherein only vector addition operations are performed in the outer loops.

It is yet another object to provide such a system architecture wherein once the inner solution loop is entered only scalar additions (subtractions) and multiplies are performed.

It is a still further object of the present invention to provide a method and apparatus for the solution of Fourier transforms utilizing the aforesaid nested loop solution method wherein the solution is broken into two distinct steps of a first overall system initialization and parameterization procedure and the final step of evaluation.

It is another object of the invention to provide such a method and apparatus as set forth above wherein the initialization step in effect pre-configures the system so that any desired number of subsequent transforms may be performed on initial input vectors of size N.

It is a still further object of the invention to provide such a method and apparatus as set forth above wherein said initialization operation includes the steps of selecting a suitable N vector size for the transform and the various factors $n_j$ which represent the factors of N, determining reordering maps for the input and output vectors, precomputing the composite coeficients for the inner loop multiplications and parameterizing the input and output loop operational sequences to effect the evaluation operation.

These and other objects, features and advantages of the invention will be apparent from the subsequent description of the invention with respect to the embodiment set forth in the drawings and claims.

DESCRIPTION OF THE DRAWINGS

FIG. 7 comprises an organizational diagram for FIGS. 7A through 7D.

FIGS. 7A through 7D comprise a system flow chart specifying the functions required during the 'Input Reordering Sequence' block (3) of FIG. 4.

FIG. 10 comprises an organizational diagram for FIGS. 10A and 10B.

FIGS. 10A and 10B comprise a system flow chart illustrating the sequences of operations required by the 'Set Up Control Flow Linkages' block (7) of FIG. 4.

FIG. 11 comprises a system operation and data sequence diagram which specifies the input data required, the processing functions performed and the output produced by part of the 'Initialization' procedure shown in FIG. 2.

FIG. 14 comprises an organizational diagram for FIGS. 14A through 14D.

FIG. 15 is an allocation diagram showing the contents of the System Parameters ROM of FIG. 1.

FIG. 21 comprises an organizational diagram for FIGS. 21A through 21D.

DESCRIPTION OF THE DISCLOSED EMBODIMENT

Figure 1:
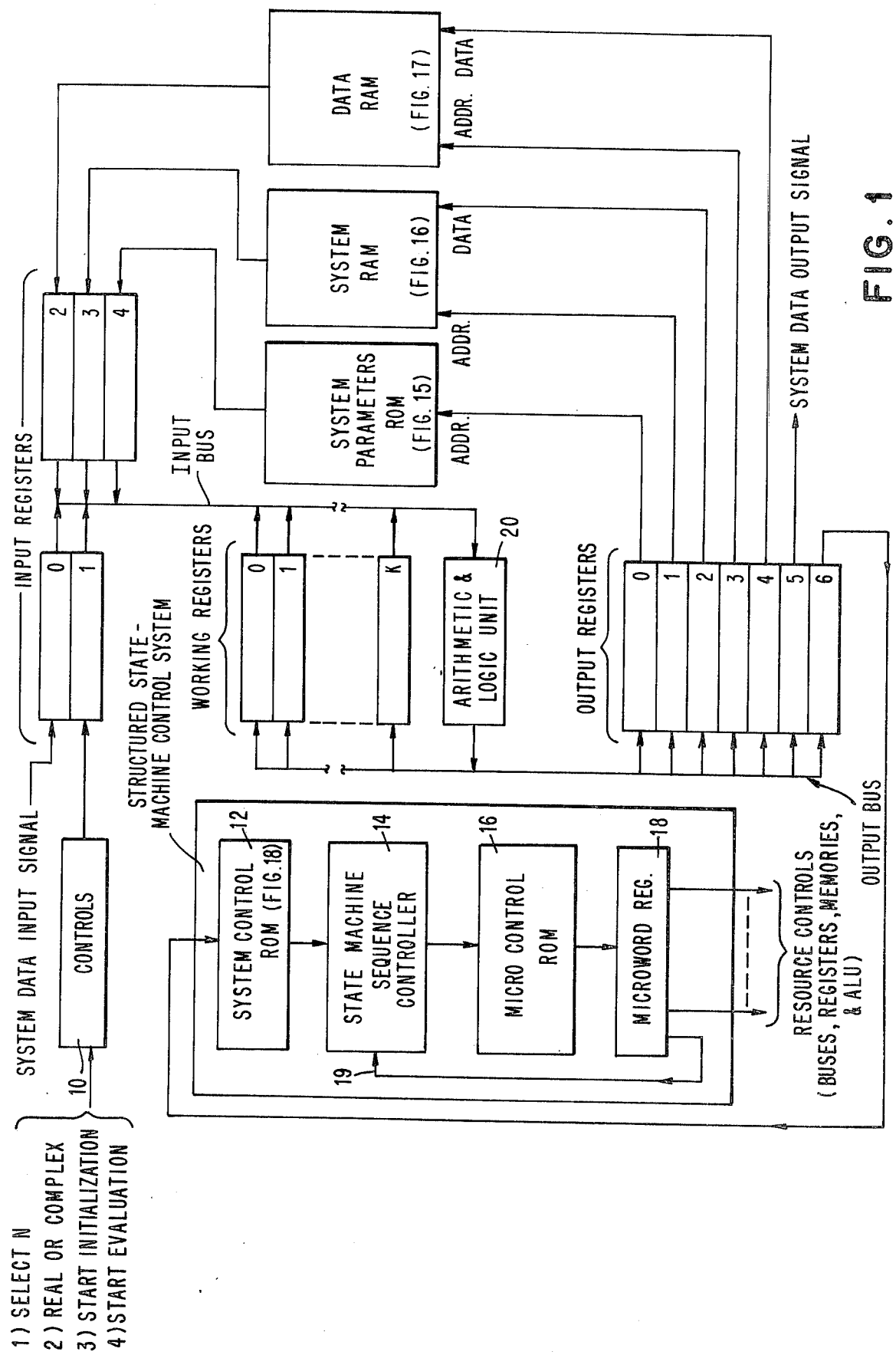
FIG. 1 comprises a functional block diagram of the present system architecture.

The objects of the present invention are accomplished in general by a Fourier Transform computer system architecture, which utilizes a nested loop solution method for the transform imbedded within the system. Further, each loop sequence is patterned after efficient solution algorithms uniquely associated with each such loop. In performing the Fourier Transform only vector additions occur in outer loop sequences and each time a multiply is encountered in such outer loop an inward loop transition occurs until finally the innermost loop is entered. Multiplies are performed only within the innermost loop of the transform sequence. Each time a given loop is completed the system includes means to automatically return to a predetermned operational sequence located in the adjacent outer loop.

A dimension N is chosen for the transform which is separable into a plurality of mutually prime factors ($n_j$) chosen from the group consisting of 2, 3, 4, 5, 7, 8, 9, 13 and 16. The dimension N chosen must meet the above criteria, it being noted that some advantages would be obtained wherein only a single factor is involved, chosen from the above list of numbers, however, the significant aspects of the present unique system architecture do not provide the considerable advantages available unless a plurality of such factors are involved. Each of the factors $n_j$ has a unique operational sequence stored in the system controls directly related to that factor. Each said operational sequence is structured directly from the highly efficient solution algorithms disclosed herein.

All inner loop multiplies are scalar but must utilize a composite coefficient, each of which is the product of all of the individual coefficients of all loop pseudo and real multiplications which are involved in a particular transition into the innermost loop.

The operation of the present system is separated into two distinct phases. During the initialization phase all of the data to be used in subsequent evaluations are computed and also the requisite operational sequences related to each of the nested loops are appropriately linked together and also the various counters are parameterized for addressing the memory storage locations where the data vectors are stored so that they may be sequentially accessed for the input and output adds (in the outer loops).

Briefly the initialization phase requires the following operational sequences which at this point will only be mentioned quite generally, it being understood that they will be explained more fully subsequently with respect to the system operational sequence diagrams relating to each of the specific initialization steps, as well as the steps which must occur during the evaluation phase.

The first operation which must be performed is the selection of a suitable value of N meeting the mutually prime requirement from the allowable factor list 2, 3, 4, 5, 7, 8, 9, 13 and 16. Implicit in the selection of the value of N is the ordering of the factors in the nested loop structure, i.e., which loops are outer loops and which factor is related to an inner loop. The methods by which this decision is made are presented subsequently, it being noted that the ordering will vary somewhat depending on whether the input data signals are real or complex.

One of the major computational operations which must occur during the initialization phase is the computation of the composite coefficients (CC) utilized in the system, which must be computed from a stored list of predetermined coefficients derived from the small-n algorithms set forth subsequently at the end of the mathematical description. The composite list of coefficients utilizes a lexical ordering operational procedure and as is implicit in such a procedure there are as many composite coefficients generated as there are multiplies performed in the inner loop. This total number is a product of the individual multiplies normally associated with each factor $n_1$. The term utilized herein for the number of multiplies associated with a given factor is $Mn_j$. It is also necessary to know the size of the vectors utilized in the addition operations, both input and output, in each of the outer loops. The size of these vectors is implicit for a given value of N and a given loop ordering. It may thus be either computed individually each time the value of N is chosen or may be computed a single time and stored in the "Factors of N table".

The System Control ROM contains a complete set of general operational sequences for both inner and outer loop sequences for each of the possible factors ($n_j$). When a value of N is selected, means must be provided as stated previously, to suitably link the required operational sequences together in the proper order so that suitable transitions may be effected between said loops during the evaluation phase of the transform operation.

Obviously these sequences must also be parameterized with operational sequence counters as well as provided with address locations for branching to and from loops and also for accessing data as required.

In order to achieve the efficiency of the present solution method, both input and output reordering of the original input vector $a_N$, and the transformed output vector $A_N'$ must be performed. The reasons for these operations are explained subsequently. To perform these operations, two reordering tables are required, which are utilized in a straightforward manner to reorder the vectors in the required manner.

These reordering tables are established during the initialization phase of the operation of the system and, once established, the reordering tables are used to do as many N-point transforms as desired on many different input sample vectors provided, of course, that the value N remains constant.

The evaluation phase comprises three distinct operations, the first and last of which are the input and output reorderings, respectively. The principle operational sequence is referred to herein as the 'main procedure' and utilizes the data generated during the initialization phase. The main procedure performs the actual transform and specifies and controls the vector additions (subtractions) in the outer loops, the loop transitions each time a pseudo multiply is encountered in an outer loop and the scalar additions (subtractions) and multiplies in the inner loop. This procedure must also control the automatic branch-back or return from one loop to the next outer loop each time a given inner loop is completed. The overall operational procedures continue until such time as the complete operational sequence is completed, with the exception of the output reordering, which will complete the transform.

At this point a mathematical explanation of the solution method developed by the inventor will be set forth in considerable detail, it being understood that the present invention is imbedded in the system architecture for performing the improved Fourier Transform and not in the mathematical solution per se.

For an even more detailed explanation of the mathematics of the solution, reference may be made to an article by Harvey F. Silverman entitled, "An Introduction to Programming the Winograd Fourier Transform Algorithm (WFTA)", published in the IEEE Transactions on Acoustics, Speech, and Signal Processing, Volume ASSP-25, No. 2, April 1977. A very brief description of the mathematical algorithm is presented in an article by the present inventor, entitled "On Computing the Discrete Fourier Transform", published in Proceedings of the National Academy of Sciences, Volume 73, No. 4, pages 1005 and 1006, April 1976.

Mathematical Explanation

As has been stated previously, the present Fourier Transform Computer is based upon a mathematical solution of the Fourier Transform which significantly reduces the number of multiplication operations, especially relative to previously known Fast Fourier Transforms, and does not increase the number of addition operations in most cases. The following description moves through both the derivation of the new solution approaches and also the details of the solution method mathematically. It is believed that this description will materially aid the reader in understanding the architecture and operation of the subsequently described hardware.

A general outline of a nest loop solution method or algorithm was described by the inventor in an article entitled, "On Computing the Discrete Fourier Transform", Proceeding of the National Academy of Sciences, April 1976, on pages 1005 and 1006. This paper described the broad concept of factoring the transform matrix and suggested the concept of performing vector additions in outer loops. Subsequent work with the algorithm suggested the present computer architecture with the necessary hardware for performing the essential steps of the evaluation including input and output reordering of the input vector $a_j$ in setting up the controls for performing nested loop operations wherein the outer loops require vector additions and subtractions and only the inner loop performs multiplies (which are scalar). Further the necessary hardware for generating the composite coefficients which must be utilized with the inner loop scalar multiplies was developed.

A very real and intrinsic portion of the present overall system organization and operating concept are the set of "small-n" DFT algorithms which have been developed by the inventor as representing the best possible, i.e., most efficient solution approach to the Fourier Transform for the particular value of N, which each of the algorithms represents. In other words, these algorithms represent the most efficient solution in terms of numbers of adds and multiplies. These solution algorithms are important in the overall successful operation of the present architecture, however, since they are mathematical, they do not themselves form a part of the present invention. They are intrinsic to the structure of the operational sequences referred to herein subsequently as the Outer Loop operations and the Inner Loop operations. As will be apparent, each of the factors for small-n in the present system, i.e., 2, 3, 4, 5, 7, 8, 9, 13 and 16, each has a unique and different Outer Loop and Inner Loop operational sequence, depending on where the particular factor is utilized in the solution being currently performed. As will also be apparent from the following description, the Outer Loop operations involve additions and subtractions of vectors, and multiplications are translated into branch-to and branch-back operations. Whereas with the Inner Loop operations all mathematical operations are performed on scalar quantities. There is obviously no need for branching operations other than a branch-back instruction at the end of a particular Inner Loop sequence.

It should be noted that no attempt will be made to derive the "small-in" DFT algorithms as no attempt is made to claim same. It should be noted, however, that these optimized solution methods suggested the presently disclosed system architecture.

The following discussion treats the heuristic development of the mathematical concepts involved in the presently disclosed method of performing the Fourier Transform on a unique set of input vectors of size N.

The N point discrete Fourier Transform (DFT) is defined as:

$$A(k) = \sum_{n=0}^{N-1} a(n) W_N^{nk} \qquad (1)$$

where $$k(\epsilon)\ [0, N-1] \text{ and } W_N = e^{-i2\pi/N} \qquad (2)$$

may be written as a matrix system by defining $\vec{a}$ and $\vec{A}$ as N point column vectors, i.e., $$\vec{a} = \begin{bmatrix} a(0) \\ a(1) \\ \cdot \\ \cdot \\ a(N-1) \end{bmatrix}, \vec{A} = \begin{bmatrix} A(0) \\ A(1) \\ \cdot \\ \cdot \\ A(N-1) \end{bmatrix} \text{ and } D \text{ as} \quad (3)$$

an $N \times n$ matrix with elements $D_N(i,r) = [W_N^{ir}] = [W_N^{ir \bmod n}]$ $i, r\epsilon[0, N-1]$.

A canonical decomposition for $D_N$ is hypothesized of the form $$SCT = D_N \quad (4)$$

where T is a J×N incidence matrix (i.e., has elements with values 0,1,−1 only), C is a J×J diagonal matrix, and S is an N×J incidence matrix.

The existence of this decomposition is easy to show for large values of J (relative to values of N) e.g., $J=N^2$, and is shown below for the case where $N=3$.

$$\overset{3+9}{\begin{bmatrix} 111 & 000 & 000 \\ 000 & 111 & 000 \\ 000 & 000 & 111 \end{bmatrix}} \overset{9+9}{\begin{bmatrix} C_0 & & & & & \\ & C_1 & & & & \\ & & C_2 & & & \\ & & & C_3 & & 0 \\ & & & & C_4 & \\ & 0 & & & & C_5 \\ & & & & & & C_6 \\ & & & & & & & C_7 \\ & & & & & & & & C_8 \end{bmatrix}} \overset{9+3}{\begin{bmatrix} 1 & 0 & 0 \\ 0 & 1 & 0 \\ 0 & 0 & 1 \\ 1 & 0 & 0 \\ 0 & 1 & 0 \\ 0 & 0 & 1 \\ 1 & 0 & 0 \\ 0 & 1 & 0 \\ 0 & 0 & 1 \end{bmatrix}} = \overset{\text{original}}{\begin{bmatrix} w_3^0 & w_3^0 & w_3^0 \\ w_3^0 & w_3^1 & w_3^2 \\ w_3^0 & w_3^2 & w_3^1 \end{bmatrix}}$$

(5)

here, clearly, $$C_l = D_3 \left( \frac{l - l \bmod 3}{3}, l \bmod 3 \right) \quad (6)$$

The difficult problem, however, is to determine a solution for (4) under the incidence matrix hypothesis in which the dimension J is much smaller than $N^2$. For several small values of N, namely 2, 3, 4, 5, 7, 8, 9, 13 and 16, the concept of field theory has been applied to show solutions where $J \sim N$. This implies the number of multiplications is of the order of N. These "small-n" algorithms also have the property that the number of additions is approximately the same as the number required for the Cooley-Tukey Fast Fourier Transform (FFT) referenced previously. These are significant improvements over many of the "small-n" transform algorithms currently being applied in multiple radix FFT programs.

While the new "small-n" algorithms could be adopted, and used in a multiple radix FFT structure, a method for combining several "small-n" algorithms in a nested structure for large N's has been developed by the inventor. The advantage of this method is that the number of multiplies for large N algorithms also grows at a much slower rate (with N) than with the FFT methods, and that the number of adds does not increase substantially over the number used in FFT (for many values of N the number of additions is actually less).

The implementation of the new procedure involves a reordering ($R_I$) of the input data, a, before processing, and a reordering ($R_F$) of the output data A after processing. These reorderings can be done if N is factorable into $n_1, n_2, \ldots n_L$ where the factors $n_e$ are mutually prime. It should be noted that $R_I$ and $R_F$ are not usually inverse mappings to one another. A method for generating these reorderings is given subsequently. For purposes of the present embodiment, it is sufficient for the reader to assume that $R_I$ and $R_F$ can be easily generated.

Given $R_I$ and $R_F$ the matrix form of (1) exhibits an evident structure. An example for $N=12$, $n_1=4$ and $n_2=3$ shows this.

The 12 point DFT system is normally written, (Note that here the 12 of $W_{12}$ is suppressed for clarity of presentation.)

$$\begin{bmatrix} A_0 \\ A_1 \\ A_2 \\ A_3 \\ A_4 \\ A_5 \\ A_6 \\ A_7 \\ A_8 \\ A_9 \\ A_{10} \\ A_{11} \end{bmatrix} = \begin{bmatrix} w^0 & w^0 & w^0 & w^0 & w^0 & w^0 & w^0 & w^0 & w^0 & w^0 & w^0 & w^0 \\ w^0 & w^1 & w^2 & w^3 & w^4 & w^5 & w^6 & w^7 & w^8 & w^9 & w^{10} & w^{11} \\ w^0 & w^2 & w^4 & w^6 & w^8 & w^{10} & w^0 & w^2 & w^4 & w^6 & w^8 & w^{10} \\ w^0 & w^3 & w^6 & w^9 & w^0 & w^3 & w^6 & w^9 & w^0 & w^3 & w^6 & w^9 \\ w^0 & w^4 & w^8 & w^0 & w^4 & w^8 & w^0 & w^4 & w^8 & w^0 & w^4 & w^8 \\ w^0 & w^5 & w^{10} & w^3 & w^8 & w^1 & w^6 & w^{11} & w^4 & w^9 & w^2 & w^7 \\ w^0 & w^6 & w^0 & w^6 & w^0 & w^6 & w^0 & w^6 & w^0 & w^6 & w^0 & w^6 \\ w^0 & w^7 & w^2 & w^9 & w^4 & w^{11} & w^6 & w^1 & w^8 & w^3 & w^{10} & w^5 \\ w^0 & w^8 & w^4 & w^0 & w^8 & w^4 & w^0 & w^8 & w^4 & w^0 & w^8 & w^4 \\ w^0 & w^9 & w^6 & w^3 & w^0 & w^9 & w^6 & w^3 & w^0 & w^9 & w^6 & w^3 \\ w^0 & w^{10} & w^8 & w^6 & w^4 & w^2 & w^0 & w^{10} & w^8 & w^6 & w^4 & w^2 \\ w^0 & w^{11} & w^{10} & w^9 & w^8 & w^7 & w^6 & w^5 & w^4 & w^3 & w^2 & w^1 \end{bmatrix} \begin{bmatrix} a_0 \\ a_1 \\ a_2 \\ a_3 \\ a_4 \\ a_5 \\ a_6 \\ a_7 \\ a_8 \\ a_9 \\ a_{10} \\ a_{11} \end{bmatrix}$$

(7)

or $$\vec{A} = D_{12} \vec{a} \text{ where: } D_{12} \text{ is the DFT matrix for } N = 12 \quad (8)$$

The example (Equation (7) becomes, (once again, here, $W = W_{12}$)

$$\begin{bmatrix} A_0 \\ A_3 \\ A_6 \\ A_9 \\ A_4 \\ A_7 \\ A_{10} \\ A_1 \\ A_8 \\ A_{11} \end{bmatrix} = \begin{bmatrix} w^0 & w^0 & w^0 & w^0 & w^0 & w^0 & w^0 & w^0 & w^0 & w^0 & w^0 & w^0 \\ w^0 & w^3 & w^6 & w^9 & w^0 & w^3 & w^6 & w^9 & w^0 & w^3 & w^6 & w^9 \\ w^0 & w^6 & w^0 & w^6 & w^0 & w^6 & w^0 & w^6 & w^0 & w^6 & w^0 & w^6 \\ w^0 & w^9 & w^6 & w^3 & w^0 & w^9 & w^6 & w^3 & w^0 & w^9 & w^6 & w^3 \\ w^0 & w^0 & w^0 & w^0 & w^4 & w^4 & w^4 & w^4 & w^8 & w^8 & w^8 & w^8 \\ w^0 & w^3 & w^6 & w^9 & w^4 & w^7 & w^{10} & w^1 & w^8 & w^{11} & w^2 & w^5 \\ w^0 & w^6 & w^0 & w^6 & w^4 & w^{10} & w^4 & w^{10} & w^8 & w^4 & w^8 & w^4 \\ w^0 & w^9 & w^6 & w^3 & w^4 & w^1 & w^{10} & w^7 & w^8 & w^5 & w^2 & w^{11} \\ w^0 & w^0 & w^0 & w^0 & w^8 & w^8 & w^8 & w^8 & w^4 & w^4 & w^4 & w^4 \\ w^0 & w^3 & w^6 & w^9 & w^8 & w^{11} & w^4 & w^5 & w^4 & w^7 & w^{10} & w^1 \end{bmatrix} \begin{bmatrix} a_0 \\ a_9 \\ a_6 \\ a_3 \\ a_4 \\ a_1 \\ a_{10} \\ a_7 \\ a_8 \\ a_5 \end{bmatrix}$$

-continued $$\begin{bmatrix} A_2 \\ A_5 \end{bmatrix} \quad \begin{bmatrix} W^0 & W^6 & W^0 & W^6 & W^8 & W^2 & W^8 & W^2 & W^4 & W^{10} & W^4 & W^{10} \\ W^0 & W^9 & W^6 & W^3 & W^8 & W^5 & W^4 & W^{11} & W^4 & W^1 & W^{10} & W^7 \end{bmatrix} \quad \begin{bmatrix} a_2 \\ a_{11} \end{bmatrix} \quad (9)$$

or $$\vec{A'} = D'_{12}\vec{a'} \text{ where: } D'_{12} \text{ is the reordered DFT matrix for } N=12 \quad (10)$$

If one recognizes that each submatrix in (9) is of the form $W^m \cdot D_4$ ($D_4$ is the 4×4 DFT matrix) i.e., $D_4$ has elements $W_4^{ir}$. Thus if $$\vec{y_0} = \begin{bmatrix} a_0 \\ a_9 \\ a_6 \\ a_3 \end{bmatrix}, \vec{y_1} = \begin{bmatrix} a_4 \\ a_1 \\ a_{10} \\ a_7 \end{bmatrix},$$

$$\vec{y_2} = \begin{bmatrix} a_8 \\ a_5 \\ a_2 \\ a_{11} \end{bmatrix} \text{ and } \vec{Y_0} = \begin{bmatrix} A_0 \\ A_3 \\ A_6 \\ A_9 \end{bmatrix}, \vec{Y_1} = \begin{bmatrix} A_4 \\ A_7 \\ A_{10} \\ A_1 \end{bmatrix} \text{ and } \vec{Y_2} = \begin{bmatrix} A_8 \\ A_{11} \\ A_2 \\ A_5 \end{bmatrix}$$

Equation (9) becomes, $$\begin{bmatrix} \vec{Y_0} \\ \vec{Y_1} \\ \vec{Y_2} \end{bmatrix} = \begin{bmatrix} W^0_{12} D_4 & W^0_{12} D_4 & W^0_{12} D_4 \\ W^0_{12} D_4 & W^4_{12} D_4 & W^8_{12} D_4 \\ W^0_{12} D_4 & W^8_{12} D_4 & W^4_{12} D_4 \end{bmatrix} \begin{bmatrix} \vec{y_0} \\ \vec{y_1} \\ \vec{y_2} \end{bmatrix} \quad (11)$$

Defining the operation * as Kronecker product, and $D_3$ as the 3×3 DFT matrix, $$\vec{A'} = (D_3 * D_4)\vec{a'} \quad (12)$$

This same relationship holds for L mutually prime factors. That is where $\vec{A}$ and $\vec{a}$ are each N vectors, and N may be factored into the L mutually prime factors $n_1, N_{1-1}, \ldots, n_1$.

$$\vec{A'} = (D_{nL} * D_{nL-1} * \ldots * D_{n1})\vec{a'} \quad (13)$$

If each factor $n_l$ corresponds to one of the presently disclosed "small-n" factors, then the decomposition of Equation (4) may be substituted into (13).

$$\vec{A'} = (S_{nL}C_{nL}*S_{nL-1}T_{nL-1}*\ldots*S_{n1}C_{n1}T_{n1})\vec{a'} \quad (14)$$

The property of Kronecker products, $$AB*CD = (A*C)(B*D) \quad (15)$$

may be applied successively in (14) to yield the fundamental result for the present Fourier Transform solution method.

$$A' = (S_{nL}*S_{nL-1}*\ldots*S_{n1})(C_{nL}*C_{nL-1}*\ldots*C_{n1})(T_{nL}*T_{nL-1}*\ldots*T_{n1})a' \quad (16)$$

or $$A' = S_N C_N T_N a' \quad (17)$$

The implications from Equations (16) are manifold, and clear from the definitions of S, C, and T and the properties of Kronecker products. First, as $C_{nl}$ is a diagonal matrix, the matrix $C_N$ is diagonal, and thus the total number of multiplies is the product of the product of the numbers of multiplies for the individual "small-n" algorithms. Next, the herein disclosed "small-n" algorithms all are derived to maintain the property that the diagonal elements of the $C_{nl}$ matrices are pure numbers—either purely real or purely imaginary but not complex. This is done by deriving "small-n" algorithms which always make use of the complex-conjugate symmetry of points equispaced about the unit circle in the Z-plane, i.e., $W_N^k$ and $W_N^{-k}$. This implies that all multiplications are real, and not complex. Therefore, if the "small-n" algorithm for factor $n_l$ has $M_{nl}$ multiplies, then $M_N$, the number of multiplies for the N point DFT using WFTA is $$M_N = M_{nL} M_{nL-1} \ldots M_{n1} \quad (18)$$

Thus $C_N$ is an $M_N$ by $M_N$ diagonal matrix with pure number diagonal entries, and $S_N$ and $T_N$ are $N \times M_N$ and $M_N \times N$ incidence matrices respectively.

The number of additions is more difficult to discuss simply by inspecting Equation (16). While upper bounds to the total number of input or output additions may be derived in this manner, the exact figures are easily ascertained via induction.

The concepts of "innermost" and "outer" factors will be useful to introduce. The "innermost factor" is defined as $n_1$, and the "outermost factor" is defined as $n_L$.

The idea of the nested programming structure may be seen from a two factor example. That is $n_2$ is the outermost factor and $n_1$ is the innermost.

$$\vec{A'} = (S_{n2}*S_{n1})(C_{n2}*C_{n1})(T_{n2}*T_{n1})\vec{a'} \quad (19)$$

$$(T_{n2}*T_{n1})\vec{a'} = \begin{bmatrix} T_{n2}(1,1) \cdot T_{n1} & T_{n2}(1,2) \cdot T_{n1} & \ldots & T_{n2}(1,n_2) \cdot T_{n1} \\ \vdots & \vdots & & \vdots \\ T_{n2}(M_{n2},1) \cdot T_{n1} & T_{n2}(M_{n2},2) \cdot T_{n1} & \ldots & T_{n2}(M_{n2},n_2) \cdot T_{n1} \end{bmatrix} \vec{a'} \quad (20)$$

If one considers $\vec{a'}$ as $n_2$ vectors each of length $n_1$, i.e., $z_m$ is an $n_1$ vector $$\vec{a'} = \begin{bmatrix} a'_0 \\ a'_1 \end{bmatrix} = \begin{bmatrix} z_0 \\ z_1 \end{bmatrix} \quad (21)$$

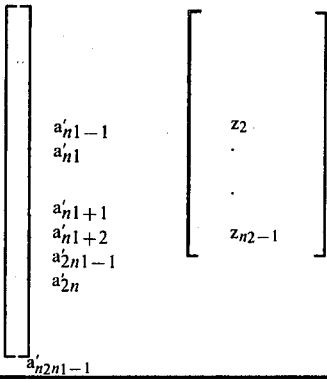

then it is clear that the calculation of (20) may be performed in two stages. First, it should be noted that $T_{n2}$ (1,1) is a factor which multiplies all of $z_0$, $T_{n2}$ (1,2) all of $z_1$ etc. Thus, these parts of (20) can be calculated first. More precisely one calculates a set of $M_{n2}$ vectors each of length $n_1$.

$$z_n \equiv \begin{matrix} a_0 & a_1 & \ldots a_{n1-1} \\ a_{n1} & a_{n1+1} & \ldots a_{2n1-1} \\ a_{(n2-1)n1} & a_{(n2-1)n1+1} & \ldots a_{n2n1-1} \end{matrix} \qquad (22)$$

then one uses additions only to calculate, $$V \equiv T_{n2} \cdot z_n \qquad (23)$$

where V is an $M_{n2} \times n_1$ matrix. Calling $V^t$ the transpose of V, then each $n_1$ vector of V then can be transformed by $T_{n1}$ to achieve a nested form for (20). The S matrix is calculated in much the same way as is T, although in inverse order. The nested form for the solution method is exemplified by Equation $$Z_N = S_{N2} \cdot [S_{N1} \cdot C \circ T_{N1} \cdot (T_{N2} \cdot z_N)^t]^t \qquad (24)$$

where t implies, conjugate transpose,
  ° implies element by element multiplication, and
  C is the $M_{n1} \times M_{n2}$ matrix of multipliers, (dense—not diagonal)
  $T_{nl}$ is an $M_{nl} \times n_l$ sparse incidence matrix
  $S_{nl}$ is an $n_l \times M_{nl}$ sparse incidence matrix, and
  $Z_N$ is the frequency domain counterpart matrix to $z_n$.
For L>2 the ideas of this development follow naturally. The matrix $T_{nL}$ first operates upon a z matrix which is now considered an L-dimensional matrix $n_L \times n_{L-1} \times \ldots \times n_1$. The operation of "multiplying" the standard matrix $T_{nL}$ which is $M_{nL} \times n_L$ by z results in an L-dimensional matrix $M_{nL} \times (n_{L-1} \times n_{L-2} \times \ldots \times n_1)$. Two different conjugate transpose operators need to be defined. The operator t takes the conjugate transpose of an $M_{nL} \times (n_{L-1} \times \ldots \times n_L)$ L-dimensional matrix by taking the conjugate and transposing elements to a $(n_{L-1} \times \ldots \times n_1) \times M_{nL}$ matrix. The operator $t^{-1}$ conjugate transposes the resultant matrix back to the original form. Thus for L factors and z and Z L-dimensional matrices as defined above.

$$Z_N = \qquad (25)$$
$$S_{n1}[S_{nL-1} \cdots [S_{n2}[S_{n1} C \circ T_{n1}(T_{n2} \cdots (T_{nL-1}(T_{nL}zN)^t)^{t} \cdots )^t]^{t-1}]^{t-1} \cdots ]^{t-1}$$

where
  $S_{nl}$ and $T_{nl}$ are defined as before, and
  C is an L-dimensional matrix of dimension $M_{nL} \times M_{nL-1} \times \ldots \times M_{n1}$.

This multidimensional representation is essentially the same as those described in the literature as far back as 1958. The reduction of a one-dimensional DFT of $p^n$ points (p a prime) to essentially a convolution with correction terms was described in the literature in 1968. However, the nested form of Equation (25) is, believed to be a new form developed by the inventor and represents a singularly important feature of the present improved F.F.T.

It has been assumed that N is factorable into the L mutually prime factors $n_1, n_2, \ldots n_L$, where each factor corresponds to one of the "small-n" factors.

For further development, the following are defined:
$M_{nl}$ = Number of real multiplications in factor $n_l$.
$I_{nl}$ = Number of additions required to compute the product $T_n \vec{a}_{n'}$ · Number of input additions.
$O_{nl}$ = Number of additions required to compute $\vec{A}'$ from $S_{nl}$ and the product $C_{nl} T_n \vec{a}_{n'}$ = Number of output additions.

Clearly, for the "small-n" algorithms listed, subsequently these may be counted.

The multiply operations count has already been shown as $$M_N = \prod_{l=1}^{L} M_{nl} \qquad (26)$$

For real data, $M_N$ real multiplies need be calculated and for complex data $2M_N$ real multiplies.

A count of the number of addition operations is somewhat more involved. First, the case where no discrimination of operations is made for real vs. complex data will be considered. Then separate equations for the calculation of the number of real additions for each data type will be derived.

For $n_1$ and $n_2$, one must first perform $I_{n2}$ additions each on $n_1$ vectors. For each resulting vector—there are $M_{n2}$ of them—the $M_{n1}$ multiplies are then performed, after the necessary $I_{n1}$ additions. Then $O_{n1}$ additions determine each $n_1$ point output vector from the innermost algorithm. Finally, $O_{n2}$ additions combine the output vector from the innermost loop to the desired $n_1 n_2$ vector. Therefore, the number of additions for two factors is $$A(2) = n_1(I_{n2} + O_{n2}) + M_{n2}(I_{n1} + O_{n1}) \qquad (27)$$

One can see that the figures in parentheses represent the total number of additions for the factors $n_2$ and $n_1$ respectively. For completeness, note one can derive the number of input additions I(2) and output additions O(2) for two factors.

$$I(2) = n_1 I_{n2} + M_{n2} I_{n1} \qquad (28)$$

$$O(2) = n_1 O_{n2} + M_{n2} O_{n1} \qquad (29)$$

For A(3), one need only consider the combination fo the $n_1 n_2$ factor as the innermost factor. Thus, $$A(3) = n_1 n_2 (I_{n3} + O_{n3}) + M_{n3} A(2) \qquad (30)$$

$$= n_1 n_2 (I_{n3} + O_{n3}) + M_{n3} n_1 (I_{n2} + O_{n2}) + M_{n3} M_{n2} (I_{n1} + n_1) \qquad (31)$$

Iterative substitution leads to the generalization $$A(L) = \sum_{l=1}^{L} (\prod_{j=1}^{L-l} n_j)(I_{nl} + O_{nl})(\prod_{j=L-l+2}^{L} M_{nj}) \qquad (32)$$

-continued where $\prod_{j=a}^{b} (\cdot) \equiv 1$ for $a > b$ (33)

For complex data, each addition in Equation (32) is a complex operation, and requires two real additions. Thus, for complex data, the present algorithm has, for the $m^{th}$ permutation of the L factors $[p_1, p_2, \ldots, p_L] \equiv P_m$ $$A_C(L; P_m) = \quad (34)$$
$$2 \sum_{l=1}^{L} (\sum_{j=1}^{L-l} n_{pj})(I_{n_{pl}} + O_{n_{pl}})(\sum_{j=L-l+2}^{L} M_{n_{pj}})$$

$$M_C(L) = 2 \sum_{l=1}^{L} M_{nl} \quad (35)$$

where A and M represent numbers of real operations, and the subscript C indicates complex data. It is worthwhile calling attention to the fact that the number of multiplies is independent of the permutation.

For real data, many operations can be saved. All multiplications are real, although some bookkeeping is necessary in order to keep track of pure imaginary and pure real results. Then, additions need not all be complex. First, all input additions operate upon the real data, and thus the factor of two does not apply to them. Next, output additions, for the innermost factor, are also not complex; rather, some of them are real additions—when two real or two purely imaginary results from innermost multiplies are to be added—and some are only apparent additions—when a purely real and a purely imaginary number are to be added together.

In this instance for the "small-n" algorithms, the number of output additions $O_{n1}$ may be considered as made up of two parts, $R_{n1}$, the number of real output adds, and $B_{n1}$, the number of apparent additions. Note that for outer factors, the resultant numbers from the innermost factor are all complex and thus all output additions are complex.

$$O_{n1} = R_{n1} + B_{n1} \quad (36)$$

Thus, for real data, (the subscript R indicative of real data), $$A_R(L; P_m) = \sum_{l=1}^{L} (\sum_{j=1}^{L-l} n_{pl}(\sum_{j=L-l+2}^{L} M_{n_{pj}}) +$$
$$(\sum_{j=2}^{L} M_{n_{pj}})R_{n_{pj}} +$$
$$2 \sum_{l=2}^{L} (\sum_{j=1}^{L-l} n_{pj})O_{n_{pl}}(\sum_{j=L-l+2}^{L} M_{n_{pj}}) \quad (37)$$

$$M_R = \prod_{l=1}^{L} M_{nl} \quad (38)$$

In order to calculate the smallest number of operations for L factors, each of the L! permutations must be evaluated for the appropriate type of data using (31) or (32). The values of $I_{nl}$, $O_{nl}$, and $R_{nl}$ are shown in various $n_l$ in the Table.

| FACTOR | M | I | O | R |
|--------|---|---|---|---|
| 2 | 2 | 2 | 0 | 0 |
| 3 | 3 | 3 | 3 | 1 |
| 4 | 4 | 6 | 2 | 0 |
| 5 | 6 | 8 | 9 | 5 |
| 7 | 9 | 17 | 19 | 13 |
| 8 | 8 | 14 | 12 | 8 |
| 9 | 13 | 20 | 24 | 16 |
| 13 | | | | |
| 16 | 18 | 40 | 34 | 24 |

From the above description of the mathematical development and support for the present Fourier Transform method, both factorization and pursuant thereto a nested evaluation procedure, when followed rigorously, leads exactly to the DFT calculation N×N. Thus at each point in the matrix for the outermost factor or loop $n_L$ a multiplication of the matrix constants by a further matrix represented by the next inner loop or factor is implied. And similarly for each next inner loop each point in its matrix is in turn multiplied by the matrix for its next inner loop, until the inner most loop is reached at which point scalar operations are called for and performed. The overall significance of this structure is that it is possible to perform the present solution method by doing only additions (subtractions) in the outer loops, said additions being vector operations. Further the present approach is rendered possible by utilizing the special small-n algorithms which require the various input and output vector rearrangement to greatly reduce the number of operations necessary to perform the equivalent DFT for the matrix representing a particular small-n.

It is believed that the small-n algorithms included at the end of this section, represent the ultimate optimization insofar as the reduction of total operations in the matrix solution for the matrix of the particular size represented by the particular small-n is concerned. Stated differently, each algorithm represents a specification of the precise operations required to evaluate the particular matrix of size n. As will be apparent from the arrangement in the table, each of the algorithms as specified above requires a set of input adds performed on the various items making up the particular vector of a dimension determined by a number of factors which will be set forth subsequently. Also as stated previously, each of these items in the case of outer loops is a vector quantity and in the inner loops is a scalar quantity. As will be well understood, each multiplication is the product of an original input vector quantity as modified by a series of input adds times a particular trigonometric function which is a composite function (coefficient) in the present system. Due to the nested configuration actual multiplies are only performed in inner most loop. Every inner loop multiply thus uses the composite coefficient described above rather than a simple coefficient. This composite coefficient is a product of all of the coefficients encountered, starting with the outermost loop to the innermost loop, during a particular transition. Thus, for example, assuming an input vector of dimension N is made up of four individual factors (small-n's), each composite coefficient would be made up of the product of four separate coefficients. This will be explained subsequently in the description of the generation of the composite coefficient tables utilized during the evaluation portion of the present solution.

All coefficieents in the present Fourier Transform are pure numbers, i.e., they are real or imaginary, but not both. This obviously applies also to the generated composite coefficients being currently run on the system.

Subsequent to the multiplies in all loops, whether inner or outer, are a set of output adds are performed which in the inner loop are scalar and in the outer loops are vector quantities.

The last section of each of the tables entitled, Output Vector, specifies the evaluation for each of the members of the output vector $A_n$. In some cases this evaluation is the result of a particular output add or the direct result of a multiplication product. As will be apparent, the output vector $A_n$ has as many members as the magnitude of the particular loop factor n.

Reference to the following Table of Operational Sequences for small-n's specifies in detail each and every addition and multiplication operation necessary for the solution of the particular small-n matrix which as explained is the DFT for a matrix of dimension n. These small-n operations actually form the basis for the inner and outer loop sequences used in the present system architecture.

As stated before, the actual algorithms are not considered to be part of the architectural organization, however, it will be noted that the use of these particular operational sequences are in essence required if the overall system performance is to reduce the total operations necessary when compared to the Fourier Transform methods.

TABLE OF OPERATIONS FOR SMALL n's n=2

$$A_k = \sum_{j=0}^{1} w^{kj} a_j \qquad K=0,1 \qquad w = e^{\frac{2\pi i}{2}}$$

Input Adds: $[s_1 = a_0 + a_1 \qquad s_2 = a_0 - a_1$

Multiplies: $[m_0 = (1) \cdot s_1 \qquad m_1 = (1) \cdot s_2$

Output Adds (none)

Output Vector: $[A_0 = m_0 \qquad A_1 = m_1$ n=3

$$A_k = \sum_{j=0}^{2} w^{kj} a_j \qquad K=0,1,2 \qquad w = e^{\frac{2\pi i}{3}}$$

Input Adds: $[s_1 = a_1 + a_2 \qquad s_2 = a_1 - a_2 \qquad s_3 = s_1 + a_0$

Multiplies: $m_0 = 1 \cdot s_3 \qquad m_1 = (\cos u - 1) \cdot s_1 \qquad m_2 = i \sin u \cdot s_2$ where: $u = \frac{2\pi}{3}$ Output Adds: $[s_4 = m_0 + m_1 \qquad s_5 = s_4 + m_2 \qquad s_6 = s_4 - m_2$ Output Vector: $[A_0 = m_0 \qquad A_1 = s_5 \qquad A_2 = s_6$ n=4

$$A_k = \sum_{j=0}^{3} w^{kj} a_j \qquad K=0,1,2,3 \qquad w = e^{\frac{2\pi i}{4}}$$

Input Adds:
$s_1 = a_0 + a_2 \qquad s_2 = a_0 - a_2 \qquad s_3 = a_1 + a_3 \qquad s_4 = a_1 - a_3$
$s_5 = s_1 + s_3 \qquad s_6 = s_1 - s_3$ Multiplies: $m_0 = (1) \cdot s_5 \qquad m_1 = (1) \cdot s_6 \qquad m_2 = (1) \cdot s_2 \qquad m_3 = (i \sin u) \cdot s_4$ where: $u = \frac{2\pi}{4}$ Output Adds: $[s_7 = m_3 + m_4 \qquad s_8 = m_3 - m_4$ Output Vector: $[A_0 = m_1 \qquad A_1 = s_7 \qquad A_2 = m_2 \qquad A_3 = s_8$ n=5

$$A_k = \sum_{j=0}^{4} w^{kj} a_j \qquad K=0,1,2,3,4, \qquad w = e^{\frac{2\pi i}{5}}$$

Input Adds:
$s_1 = a_1 + a_4 \qquad s_2 = a_1 - a_4 \qquad s_3 = a_3 + a_2 \qquad s_4 = a_3 - a_2$
$s_5 = s_1 + s_3 \qquad s_6 = s_1 - s_3 \qquad s_7 = s_2 + s_4 \qquad s_8 = s_5 + a_0$ Multiplies:
$m_0 = (1) \cdot s_8 \qquad m_1 = \left(\frac{\cos u + \cos 2u}{2} - 1\right) \cdot s_5$
$m_2 = \left(\frac{\cos u - \cos 2u}{2}\right) \cdot s_6$
$m_3 = (i(\sin u + \sin 2u)) \cdot s_2 \qquad m_4 = (i \sin 2u) \cdot s_7$
$m_5 = (i(\sin u - \sin 2u)) \cdot s_4$ where: $u = \frac{2\pi}{5}$ Output Adds:
$s_9 = m_0 + m_1 \qquad s_{10} = s_9 + m_2 \qquad s_{11} = s_9 - m_2 \qquad s_{12} = m_3 - m_4$
$s_{13} = m_4 + m_5 \qquad s_{14} = s_{10} + s_{12} \qquad s_{15} = s_{10} - s_{12}$
$s_{16} = s_{11} + s_{13} \qquad s_{17} = s_{11} - s_{13}$ Output Vector:
$A_0 = m_0 \qquad A_1 = s_{14} \qquad A_2 = s_{16} \qquad A_3 = s_{17}$
$A_4 = s_{15}$ n=7

$$A_k = \sum_{j=0}^{6} w^{kj} a_j \qquad K=0,1,\ldots,6 \qquad w = e^{\frac{2\pi i}{7}}$$

Input Adds:
$s_1 = a_1 + a_6 \qquad s_2 = a_1 - a_6 \qquad s_4 = a_4 + a_3 \qquad s_4 = a_4 - a_3$
$s_5 = a_2 - a_5 \qquad s_6 = a_2 - a_5 \qquad s_7 = s_1 + s_3 \qquad s_8 = s_7 + s_5$
$s_9 = s_8 + a_0 \qquad s_{10} = s_1 - s_3 \qquad s_{11} = s_3 - s_5 \qquad s_{12} = s_5 - s_1$
$s_{13} = s_2 + s_4 \qquad s_{14} = s_{13} + s_6 \qquad s_{15} = s_2 - s_4 \qquad s_{16} = s_4 - s_6$
$s_{17} = s_6 - s_2$ -continued
TABLE OF OPERATIONS FOR SMALL n's

Multiplies
$$\begin{array}{ll}
m_0 = (1) \cdot s_9 & m_1 = (\frac{\cos u + \cos 2u + \cos 3u}{3} - 1) \cdot s_8 \\
m_2 = (\frac{2\cos u - \cos 2u - \cos 3u}{3}) \cdot s_{10} & m_3 = (\frac{\cos u - 2\cos 2u + \cos 3u}{3}) \cdot s_{11} \\
m_4 = (\frac{\cos u + \cos 2u - 2\cos 3u}{3}) \cdot s_{12} & m_5 = i(\frac{\sin u + \sin 2u - \sin 3u}{3}) \cdot s_{14} \\
m_6 = i(\frac{2\sin u - \sin 2u + \sin 3u}{3}) \cdot s_{15} & m_7 = i(\frac{\sin u - 2\sin 2u - \sin 3u}{3}) \cdot s_{16} \\
m_8 = i(\frac{\sin + \sin 2u + 2\sin 3u}{3}) \cdot s_{17}
\end{array}$$

where: $u = \frac{2\pi i}{7}$

Multiplies
$$\begin{array}{ll}
m_0 = (1) \cdot s_9 & m_1 = (\frac{\cos u + \cos 2u + \cos 3u}{3} - 1) \cdot s_8 \\
m_2 = (\frac{2\cos u - \cos 2u - \cos 3u}{3}) \cdot s_{10} & m_3 = (\frac{\cos u - 2\cos 2u + \cos 3u}{3}) \cdot s_{11} \\
m_4 = (\frac{\cos u + \cos 2u - 2\cos 3u}{3}) \cdot s_{12} & m_5 = (\frac{\sin u + \sin 2u - \sin 3u}{3}) \cdot s_{14} \\
m_6 = (\frac{2\sin u - \sin 2u + \sin 3u}{3}) \cdot s_{15} & m_7 = i(\frac{\sin u - 2\sin 2u - \sin 3u}{3}) \cdot s_{16} \\
m_8 = i(\frac{\sin + \sin 2u + 2\sin 3u}{3}) \cdot s_{17}
\end{array}$$

where: $u = \frac{2\pi i}{7}$

Output Adds
$$\begin{array}{llll}
s_{18} = m_0 + m_1 & s_{19} = s_{18} + m_2 & s_{20} = s_{19} + m_3 & s_{21} = s_{18} - m_2 \\
s_{22} = s_{21} - m_3 & s_{23} = s_{18} - m_3 & s_{24} = s_{23} + m_4 & s_{25} = m_5 + m_6 \\
s_{26} = s_{25} + m_7 & s_{27} = m_5 - m_6 & s_{28} = s_{27} - m_8 & s_{29} = m_5 - m_7 \\
s_{30} = s_{29} + m_8 & s_{31} = s_{20} + s_{26} & s_{32} = s_{20} - s_{26} & s_{33} = s_{22} + s_{28} \\
s_{34} = s_{22} - s_{28} & s_{35} = s_{24} + s_{30} & s_{36} = s_{24} - s_{30}
\end{array}$$

Output Vector
$$\begin{array}{llll}
A_0 = m_0 & A_1 = s_{31} & A_2 = s_{33} & A_3 = s_{36} \\
A_4 = s_{35} & A_5 = s_{34} & A_6 = s_{32}
\end{array}$$

$\underline{n = 8}$ $$A_k = \sum_{j=0}^{7} w^{kj} a_j \qquad K = 0, 1, 2, \ldots, 7 \qquad w = e^{\frac{2\pi i}{8}}$$

Input Adds
$$\begin{array}{llll}
s_1 = a_0 + a_4 & s_2 = a_0 - a_4 & s_3 = a_2 + a_6 & s_4 = a_2 - a_6 \\
s_5 = a_1 + a_5 & s_6 = a_1 - a_5 & s_7 = a_3 + a_7 & s_8 = a_3 - a_7 \\
s_9 = s_1 + s_3 & s_{10} = s_1 - s_3 & s_{11} = s_5 + s_7 & s_{12} = s_5 - s_7 \\
s_{13} = s_9 + s_{11} & s_{14} = s_9 - s_{11} & s_{15} = s_6 + s_8 & s_{16} = s_6 - s_8
\end{array}$$

Multiplies
$$\begin{array}{llll}
m_0 = (1) \cdot s_{13} & m_1 = (1) \cdot s_{14} & m_2 = (1) \cdot s_{10} & m_3 = (i \sin 2u) \cdot s_{12} \\
m_4 = (1) \cdot s_2 & m_5 = (i \cdot \sin 2u) \cdot s_4 & m_6 = (i \sin u) \cdot s_{15} \\
m_7 = (\cos u) \cdot s_{16}
\end{array}$$
where: $u = \frac{2\pi}{8}$ Output Adds
$$\begin{array}{llll}
s_{17} = m_3 + m_4 & s_{18} = m_3 - m_4 & s_{19} = m_5 + m_8 & s_{20} = m_5 - m_8 \\
s_{21} = m_6 + m_7 & s_{22} = m_6 - m_7 & s_{23} = s_{19} + s_{21} & s_{24} = s_{19} - s_{21} \\
s_{25} = s_{20} + s_{22} & s_{26} = s_{20} - s_{22}
\end{array}$$

Output Vector
$$\begin{array}{llll}
A_0 = m_1 & A_1 = s_{23} & A_2 = s_{17} & A_3 = s_{26} \\
A_4 = m_2 & A_5 = s_{25} & A_6 = s_{18} & A_7 = s_{24}
\end{array}$$

$\underline{n = 9}$ $$A_k = \sum_{j=0}^{8} w^{kj} a_j \qquad K = 0, 1, \ldots, 7 \qquad w = e^{\frac{2\pi i}{9}}$$

Input Adds
$$\begin{array}{llll}
s_1 = a_1 + a_2 & s_2 = a_1 - a_8 & s_3 = a_7 + a_2 & s_4 = a_7 - a_2 \\
s_5 = a_3 + a_6 & s_6 = a_3 - a_6 & s_7 = a_4 + a_5 & s_8 = a_4 - a_5 \\
s_9 = s_1 + s_3 & s_{10} = s_9 + s_7 & s_{11} = s_{10} + s_5 & s_{12} = s_{11} + a_0 \\
s_{13} = s_4 & s_{14} = s_{13} + s_8 & s_{15} = s_1 - s_3 & s_{16} = s_3 - s_7 \\
s_{17} = s_7 - s_1 & s_{18} = s_2 - s_4 & s_{19} = s_4 - s_8 & s_{20} = s_8 - s_2
\end{array}$$

Multiplies
$$\begin{array}{lll}
m_0 = (1) \cdot s_{12} & m_1 = (\cos 3u - 1) \cdot s_{10} & m_2 = i \sin 3u \cdot s_{14} \\
m_3 = (\cos 3u - 1) \cdot s_5 & m_4 = i \sin 3u \cdot s_6 & m_5 = (\frac{\cos u + \cos 2u + \cos 4u}{3}) \cdot s_{10} \\
m_6 = (\frac{2\cos u - \cos 2u - \cos 4u}{3}) \cdot s_{15} & & m_7 = (\frac{\cos u + \cos 2u - \cos 4u}{3}) \cdot s_{16} \\
m_8 = (\frac{\cos u - 2\cos 2u + \cos 4u}{3}) \cdot s_{17} & & m_9 = (\frac{\sin u - \sin 2u + \sin 4u}{3}) \cdot s_{14} \\
m_{10} = (\frac{2\sin u + \sin 2u - \sin 4u}{3}) \cdot s_{18} & & m_{11} = (\frac{\sin u - \sin 2u - 2\sin 4u}{3}) \cdot s_{19}
\end{array}$$

TABLE OF OPERATIONS FOR SMALL n's -continued $$m_{12} = \left(\frac{\sin u + 2\sin 2u + \sin 4u}{3}\right) \cdot s_{20}$$

where: $u = \frac{2\pi}{9}$

Output Adds
- $s_{21} = m_0 + m_1$   $s_{22} = x_{21} + m_2$   $s_{23} = s_{21} - m_2$   $s_{24} = m_0 + m_3$
- $s_{25} = s_{24} + m_5$   $s_{26} = s_{25} + m_6$   $s_{27} = s_{26} + m_7$   $s_{28} = s_{25} - m_7$
- $s_{29} = s_{28} + m_8$   $s_{30} = s_{25} - m_6$   $s_{31} = s_{30} - m_8$   $s_{32} = m_4 + m_9$
- $s_{33} = s_{32} + m_{10}$   $s_{34} = s_{33} + m_{11}$   $s_{35} = s_{32} - m_{11}$   $s_{36} = s_{35} + m_{12}$
- $s_{37} = s_{32} - m_{10}$   $s_{38} = s_{37} - m_{12}$   $s_{39} = s_{27} + s_{34}$   $s_{40} = s_{27} - s_{34}$
- $s_{41} = s_{29} + s_{36}$   $s_{42} = s_{29} - s_{36}$   $s_{43} = s_{31} + s_{38}$   $s_{44} = s_{31} - s_{38}$ Output Vector
- $A_0 = m_0$   $A_1 = s_{39}$   $A_2 = s_{42}$   $A_3 = s_{22}$   $A_4 = s_{43}$
- $A_5 = s_{44}$   $A_6 = s_{23}$   $A_7 = s_{41}$   $A_8 = s_{40}$ n = 13

$$A_k = \sum_{j=0}^{12} w^{kj} a_j \qquad K = 0,1,\ldots,12 \qquad w = e^{\frac{2\pi i}{13}}$$

Input Adds
- $s_1 = a_1 + a_{12}$   $s_1 = a_3 + a_{10}$   $s_3 = a_9 + a_4$   $s_4 = a_8 + a_5$   $s_5 = a_{11} + a_2$
- $s_6 = a_7 + a_6$   $s_7 = a_1 - a_{12}$   $s_8 = a_3 - a_{10}$   $s_9 = a_9 - a_4$   $s_{10} = a_8 - a_5$
- $s_{11} = a_{11} - a_2$   $s_{12} = a_7 - a_6$   $s_{13} = s_1 + s_4$   $s_{14} = a_2 + s_5$   $s_{15} = s_3 + s_6$
- $s_{16} = s_1 - s_4$   $s_{17} = s_2 - s_5$   $s_{18} = s_3 - s_6$   $s_{19} = s_7 + s_{10}$   $s_{20} = s_8 + s_{11}$
- $s_{21} = s_9 + s_{12}$   $s_{12} = s_{13} + s_{14}$   $s_{23} = s_{22} + s_{15}$   $s_{24} = s_{13} - s_{14}$   $s_{15} = s_{14} - s_{15}$
- $s_{20} = s_{15} - s_{13}$   $s_{17} = s_{16} + s_{17}$   $s_{28} = s_{27} + s_{18}$   $s_{24} = s_{16} - s_{17}$   $s_{30} = s_{17} - s_{18}$
- $s_{31} = s_{18} - s_{16}$   $s_{32} = s_7 + s_8$   $s_{33} = s_{32} + s_9$   $s_{34} = s_7 - s_8$   $s_{35} = s_8 - s_9$
- $s_{36} = s_9 - s_7$   $s_{37} = s_{19} + s_{20}$   $s_{38} = s_{37} + s_{21}$   $s_{39} = s_{19} - s_{20}$   $s_{40} = s_{20} - s_{21}$
- $s_{41} = s_{21} - s_{19}$   $s_{42} = s_{10} + s_{11}$   $s_{43} = s_{42} + s_{12}$   $s_{44} = s_{10} - s_{11}$   $s_{45} = s_{11} - s_{12}$
- $s_{46} = s_{12} - s_{10}$   $s_{47} = s_{23} + a_0$
- $c_0 = 1$ Coefficients $$c_1 = \frac{\cos u + \cos 2u + \cos 3u + \cos 4u + \cos 5u + \cos 6u}{6} - 1$$

$$c_2 = \frac{2\cos u - \cos 2u - \cos 3u - \cos 4u + 2\cos 5u - \cos 6u}{6}$$

$$c_3 = \frac{\cos u + \cos 2u + \cos 3u - 2\cos 4u + \cos 5u + 2\cos 6u}{6}$$

$$c_4 = \frac{\cos u - 2\cos 2u - 2\cos 3u + \cos 4u + \cos 5u + \cos 6u}{6}$$

$$c_5 = \frac{\cos u - \cos 2u + \cos 3u + \cos 4u - \cos 5u - \cos 6u}{6}$$

$$c_6 = \frac{2\cos u + \cos 2u + \cos 3u - \cos 4u - 2\cos 5u + \cos 6u}{6}$$

$$c_7 = \frac{\cos u - \cos 2u + \cos 3u - 2\cos 4u - \cos 5u + 2\cos 6u}{6}$$

$$c_8 = \frac{\cos u + 2\cos 2u - 2\cos 3u + \cos 4u - \cos 5u - \cos 6u}{6}$$

$$c_9 = i\frac{\sin u + \sin 2u + \sin 3u - \sin 4u + \sin 5u + \sin 6u}{3}$$

$$c_{10} = i\frac{2\sin u - \sin 2u - \sin 3u + \sin 4u + 2\sin 5u - \sin 6u}{3}$$

$$c_{11} = i\frac{\sin u + \sin 2u + \sin 3u + \sin 4u + \sin 5u - \sin 6u}{3}$$

$$c_{12} = i\frac{\sin u - 2\sin 2u - 2\sin 3u - \sin 4u + \sin 5u + \sin 6u}{3}$$

$$c_{13} = i\frac{\sin 2u + \sin 5u + \sin 6u}{3}$$

$$c_{14} = i\frac{-\sin 2u + 2\sin 5u - \sin 6u}{3}$$

$$c_{15} = i\frac{\sin 2u + \sin 5u - 2\sin 6u}{3}$$

$$c_{16} = i\frac{-2\sin 2u + \sin 5u + \sin 6}{3}$$

$$c_{17} = i\frac{\sin u - \sin 2u + \sin 3u - \sin 4u - \sin 5u - \sin 6u}{3}$$

$$c_{18} = i\frac{2\sin u + \sin 2u - \sin 3u + \sin 4u - 2\sin 5u + \sin 6u}{3}$$

$$c_{19} = i\frac{\sin u - \sin 2u + \sin 3u + 2\sin 4u - \sin 5u + 2\sin 6u}{3}$$

$$c_{20} = i\frac{\sin u + 2\sin 2u - 2\sin 3u - \sin 4u - \sin 5u - \sin 6u}{3}$$

where: $u = \frac{2\pi}{13}$

Multiplies
- $m_0 = 1 \cdot s_{47}$   $m_1 = c_1 \cdot s_{23}$   $m_2 = c_2$   $m_3 = c_3 \cdot s_{25}$   $m_4 = c_4 \cdot s_{26}$
- $m_5 = c_5 \cdot s_{28}$   $m_6 = c_6 \cdot s_{29}$   $m_7 = c_7 \cdot s_{30}$   $m_8 = c_8 \cdot s_{31}$   $m_9 = c_9 \cdot s_{33}$
- $m_{10} = c_{10} \cdot s_{34}$   $m_{11} = c_{11} \cdot s_{35}$   $m_{12} = c_{12} \cdot s_{36}$   $m_{13} = c_{13} \cdot s_{38}$   $m_{14} = c_{14} \cdot s_{39}$
- $m_{15} = c_{15} \cdot s_{40}$   $m_{16} = c_{16} \cdot s_{41}$   $m_{17} = c_{17} \cdot s_{43}$   $m_{18} = c_{18} \cdot s_{44}$   $m_{19} = c_{19} \cdot s_{45}$
- $m_{20} = c_{20} \cdot s_{46}$ -continued
TABLE OF OPERATIONS FOR SMALL n's Output Adds $s_{48}=m_0+m_1$    $s_{49}=s_{48}+m_2$    $s_{50}=s_{49}+m_3$    $s_{51}=s_{48}-m_3$    $s_{52}=s_{51}+m_4$
$s_{53}=s_{48}-m_2$    $s_{54}=s_{53}-m_4$    $s_{55}=m_5+m_6$    $s_{56}=s_{55}+m_7$    $s_{57}=m_5-m_7$
$s_{58}=s_{57}+m_8$    $s_{59}=m_5-m_6$    $s_{60}=s_{59}-m_8$    $s_{61}=m_9+m_{10}$    $s_{62}=s_{61}+m_{11}$
$s_{63}=m_9-m_{11}$    $s_{64}=s_{65}+m_{12}$    $s_{65}=m_9-m_{10}$    $s_{66}=s_{65}-m_{12}$    $s_{67}=m_{13}+m_{14}$
$s_{68}=s_{67}+m_{15}$    $s_{69}=m_{13}-m_{15}$    $s_{70}=s_{69}+m_{16}$    $s_{71}=m_{13}-m_{14}$    $s_{72}=s_{71}-m_{16}$
$s_{75}=m_{17}+m_{18}$    $s_{74}=s_{73}+m_{18}$    $s_{75}=m_{17}-m_{19}$    $s_{76}=s_{75}+m_{20}$    $s_{71}=m_{17}-m_{18}$
$s_{78}=s_{77}-m_{20}$    $s_{79}=s_{50}+s_{56}$    $s_{80}=s_{52}+s_{58}$    $s_{81}=s_{54}+s_{60}$    $s_{82}=s_{50}-s_{56}$
$s_{83}=s_{52}-s_{58}$    $s_{84}=s_{54}-s_{60}$    $s_{85}=s_{62}-s_{68}$    $s_{86}=s_{64}-s_{70}$    $s_{87}=s_{66}-s_{72}$
$s_{88}=s_{68}+s_{74}$    $s_{89}=s_{70}+s_{76}$    $s_{90}=s_{72}+s_{78}$    $s_{91}=s_{79}+s_{85}$    $s_{92}=s_{80}+s_{86}$
$s_{93}=s_{81}+s_{87}$    $s_{94}=s_{79}-s_{85}$    $s_{95}=s_{80}-s_{86}$    $s_{96}=s_{81}-s_{87}$    $s_{97}=s_{82}+s_{88}$
$s_{98}=s_{83}+s_{89}$    $s_{99}=s_{84}+s_{90}$    $s_{100}=s_{82}-s_{88}$    $s_{101}=s_{85}-s_{89}$    $s_{102}=s_{84}-s_{90}$ Output Vector
$A_0=m_0$    $A_1=s_{91}$    $A_2=s_{98}$    $A_3=s_{92}$    $A_4=s_{96}$    $A_5=s_{97}$
$A_6=s_{99}$    $A_7=s_{102}$    $A_8=s_{100}$    $A_9=s_{93}$    $A_{10}=s_{95}$    $A_{11}=s_{101}$
$A_{12}=s_{94}$
21 multiplies    102 Adds $$n=16$$

$$A_k = \sum_{j=0}^{15} w^{kj} a_j \qquad K=0,1,...,15 \qquad w=e^{\frac{2\pi i}{6}}$$

Input Adds
$[s_1=a_0+a_8$    $s_2=a_0-a_8$    $s_3=a_4+a_{12}$    $s_4=a_4-a_{12}$
$[s_5=a_2+a_{10}$    $s_6=a_2-a_{10}$    $s_7=a_6+a_{14}$    $s_8=a_6-a_{14}$
$[s_9=a_1+a_9$    $s_{10}=a_1-a_9$    $s_{11}=a_5+a_{13}$    $s_{12}=a_5-a_{13}$
$[s_{13}=a_3+a_{11}$    $s_{14}=a_3-a_{11}$    $s_{15}=a_7+a_{15}$    $s_{16}=a_7-a_{15}$
$[s_{17}=s_1+s_3$    $s_{18}=s_1-s_3$    $s_{19}=s_5+s_7$    $s_{20}=s_5-s_7$
$[s_{21}=s_9+s_{11}$    $s_{22}=s_9-s_{11}$    $s_{23}=s_{13}+s_{15}$    $s_{24}=s_{13}-s_{15}$
$[s_{25}=s_{17}+s_{19}$    $s_{26}=s_{17}-s_{19}$    $s_{27}=s_{21}+s_{23}$    $s_{28}=s_{21}-s_{23}$
$[s_{29}=s_{25}+s_{27}$    $s_{30}=s_{25}-s_{27}$    $s_{31}=s_{22}+s_{24}$    $s_{32}=s_{22}-s_{24}$
$[s_{33}=s_6+s_8$    $s_{34}=s_6-s_8$    $s_{35}=s_{10}+s_{16}$    $s_{36}=s_{10}-s_{16}$
$[s_{37}=s_{12}+s_{14}$    $s_{38}=s_{12}-s_{14}$    $s_{39}=s_{35}+s_{37}$    $s_{40}=s_{36}+s_{38}$ Multiplies
$m_0=(1)\cdot s_{29}$    $m_1=(1)\cdot s_{30}$    $m_2=(1)\cdot s_{26}$    $m_3=(i)\cdot s_{28}$
$m_4=(1)\cdot s_{18}$    $m_5=(i)\cdot s_{20}$    $m_6=(i\sin 2u)\cdot s_{31}$    $m_7=(\cos 2u)\cdot s_{32}$
$m_8=(1)\cdot s_2$    $m_9=(i)\cdot s_4$    $m_{10}=(i\sin 2u)\cdot s_{33}$    $m_{11}=(\cos 2u)\cdot s_{34}$
$m_{12}=(i\sin 3u)\cdot s_{39}$    $m_{13}=i(\sin u-\sin 3u)\cdot s_{35}$    $m_{14}=i(\sin u+\sin 3u)\cdot s_{37}$
$m_{15}=(\cos 3u)\cdot s_{40}$    $m_{16}=(\cos u+\cos 3u)\cdot s_{36}$    $m_{17}=(\cos 3u-\cos u)\cdot s_{38}$ where: $u=\frac{2\pi}{16}$ Output Adds
$s_{41}=m_3+m_4$    $s_{42}=m_3-m_4$    $s_{43}=m_5+m_7$    $s_{44}=m_5-m_7$
$s_{45}=m_6+m_8$    $s_{46}=m_6-m_8$    $s_{47}=s_{43}+s_{45}$    $s_{48}=s_{43}-s_{45}$
$s_{49}=s_{44}+s_{46}$    $s_{50}=s_{44}-s_{46}$    $s_{51}=m_9+m_{12}$    $s_{52}=m_9-m_{12}$
$s_{53}=m_{10}+m_{11}$    $s_{54}=m_{10}-m_{11}$    $s_{55}=m_{13}+m_{14}$    $s_{56}=m_{13}-m_{15}$
$s_{57}=m_{17}-m_{16}$    $s_{58}=m_{18}-m_{16}$    $s_{59}=s_{51}+s_{55}$    $s_{60}=s_{51}-s_{55}$
$s_{61}=s_{52}+s_{56}$    $s_{62}=s_{52}-s_{56}$    $s_{63}=s_{53}+s_{57}$    $s_{64}=s_{53}-s_{57}$
$s_{65}=s_{54}+s_{58}$    $s_{66}=s_{54}-s_{58}$    $s_{67}=s_{59}+s_{63}$    $s_{68}=s_{59}-s_{63}$
$s_{69}=s_{60}+s_{64}$    $s_{70}=s_{60}-s_{64}$    $s_{71}=s_{61}+s_{65}$    $s_{72}=s_{61}-s_{65}$
$s_{73}=s_{62}+s_{66}$    $s_{74}=s_{62}-s_{66}$ Output Vector
$A_0=m_1$    $A_1=s_{67}$    $A_2=s_{47}$    $A_3=s_{72}$    $A_4=s_{41}$    $A_5=s_{71}$
$A_6=s_{48}$    $A_7=s_{68}$    $A_8=m_2$    $A_9=s_{69}$    $A_{10}=s_{49}$    $A_{11}=s_{74}$
$A_{12}=s_{42}$    $A_{13}=s_{73}$    $A_{14}=s_{50}$    $A_{15}=s_{70}$

General Description of the Preferred Embodiment

The general system architecture of the present Fourier Transform Computer is shown in FIG. 1. It will be noted in examining the system architecture that the left-hand portion including the blocks 10, 12, 14, 16 and 18 comprise the central control hierarchy for the system. Box 10 labeled Controls, performs the four labeled functions, the first being to select a suitable value of N. The second is to state whether the input data are to be real or complex. Having made these two selections the system may either perform the initialization operations automatically or a separate 'start initialization' function can be provided. Similarly, the 'start evaluation' button or switch could require actuation each time a new set of input signals are to be processed or conversely system controls could easily be provided to cause the continuous processing of input vectors, assuming of course the same value of N, until some predetermined number of transforms have been performed or some other 'end of sequence' signal received.

The middle portion of FIG. 1 discloses the various working registers as well as the arithmetic and logic unit 20. It will be noted that the Input Registers are provided with labels 0 through 4. These registers are labeled Input Registers since they feed essentially into the Arithmetic Logic Unit 20. Output Registers labeled 0 through 6 may contain instructions, address information and/or data. The destination for each of these registers is apparent from an examination of FIG. 1.

Three system memories designated as the System Parameters ROM 22, the System RAM 24, and the Data RAM 26, perform different and distinct functions as will be apparent from the subsequent description. The system parameters ROM as the name indicates stores certain parameters related to the allowable factors of N which are precomputed and need never change. This memory must be accessed periodically each time a new value of N is chosen and contains such items as the 'small-n coefficient tables', 'Factors of N tables', etc. A read only memory is utilized for this purpose, both for speed of operation and the fact that these parameters are in essence fixed and, thus, need never be changed.

The following "Factors of N Table" is stored in appropriate machine readable form in the System Parameters ROM. It may be utilized merely as a data source for determining the number of loops and the actual factors for a given predetermined allowable value of N or a brief operational sequence can be prepared wherein an operator could test a desired value of N against this list and either get a successful or nonsuccessful compare after which the desired loop and factor data could be accessed.

The table is exhaustive and contains every possible factor of N utilizing all of the allowable small-n's disclosed herein, i.e., 2, 3, 4, 5, 7, 8, 9, 13 and 16. It should be noted in passing, of course, that in the case of the possible factors 2, 4, 8 and 16, only one of these can appear in any given value of N as they are not mutually prime. Similarly for the factors 3 and 9, only one can appear in a given value of N for the same reason. Thus, the column marked L indicates the numbers of loops involved which is the same as the number of factors and the columns marked $n_1$ through $n_5$ specify the specific factors and also their relative ordering. It is noted that $n_1$ is always the factor assigned to the innermost loop and $n_5$, if there were that many, would be assigned to the outermost loop.

The specific ordering shown in the table is used for the real data input case only. For the case of complex input data, the loop ordering sequence described subsequently relative to FIG. 5 must be utilized. It is noted however, that this sequence merely utilizes the precomputed values contained in the Table of Optimal Loop Ordering (for Complex Data) which immediately follows the Factors of N Table. For each of the factors a value $\alpha_i$ is derived for each of the factors according to the formula at the top of the table, and once this factor is established the loop is ordered according to decreasing values of $\alpha_i$. In other words, the factor with the largest value of $\alpha_i$ is always innermost.

FACTORS OF N TABLE
(Ordering for "Real" Data Only)

| N | L | $n_1$ | $n_2$ | $n_3$ | $n_4$ | $n_5$ |
|---|---|---|---|---|---|---|
| *2 | 1 | 2 | | | | |
| *3 | 1 | 3 | | | | |
| *4 | 1 | 4 | | | | |
| *5 | 1 | 5 | | | | |
| 6 | 2 | 3 | 2 | | | |
| *7 | 1 | 7 | | | | |
| *8 | 1 | 8 | | | | |
| *9 | 1 | 9 | | | | |
| 10 | 2 | 5 | 2 | | | |
| 12 | 2 | 3 | 4 | | | |
| *13 | 1 | 13 | | | | |
| 14 | 2 | 7 | 2 | | | |
| 15 | 2 | 5 | 3 | | | |
| *16 | 1 | 16 | | | | |
| 18 | 2 | 9 | 2 | | | |
| 20 | 2 | 5 | 4 | | | |
| 21 | 2 | 7 | 3 | | | |
| 24 | 2 | 13 | 2 | | | |
| 28 | 2 | 7 | 4 | | | |
| 30 | 3 | 5 | 2 | 3 | | |
| 35 | 2 | 7 | 5 | | | |
| 36 | 2 | 9 | 4 | | | |
| 39 | 2 | 13 | 3 | | | |
| 40 | 2 | 5 | 8 | | | |
| 42 | 3 | 7 | 2 | 3 | | |
| 45 | 2 | 9 | 5 | | | |
| 48 | 2 | 16 | 3 | | | |
| 52 | 2 | 13 | 4 | | | |
| 56 | 2 | 7 | 8 | | | |
| 60 | 3 | 5 | 4 | 3 | | |
| 63 | 2 | 9 | 7 | | | |
| 65 | 2 | 13 | 5 | | | |
| 70 | 3 | 7 | 5 | 2 | | |
| 72 | 2 | 9 | 8 | | | |
| 78 | 3 | 13 | 3 | 2 | | |
| 80 | 2 | 5 | 16 | | | |
| 90 | 3 | 9 | 5 | 2 | | |
| 91 | 2 | 13 | 7 | | | |
| 104 | 2 | 13 | 8 | | | |
| 105 | 3 | 7 | 5 | 3 | | |
| 112 | 2 | 7 | 16 | | | |
| 117 | 2 | 13 | 9 | | | |
| 120 | 3 | 5 | 8 | 3 | | |
| 126 | 3 | 9 | 7 | 2 | | |
| 130 | 3 | 13 | 5 | 2 | | |
| 140 | 3 | 7 | 5 | 4 | | |
| 144 | 2 | 9 | 16 | | | |
| 156 | 3 | 13 | 4 | 3 | | |
| 168 | 3 | 7 | 8 | 3 | | |
| 180 | 3 | 9 | 5 | 4 | | |
| 182 | 3 | 13 | 7 | 2 | | |
| 208 | 2 | 13 | 16 | | | |
| 210 | 4 | 7 | 5 | 2 | 3 | |
| 234 | 3 | 13 | 9 | 2 | | |
| 240 | 3 | 5 | 16 | 3 | | |
| 252 | 3 | 9 | 7 | 4 | | |
| 260 | 3 | 13 | 5 | 4 | | |
| 273 | 3 | 13 | 7 | 3 | | |
| 280 | 3 | 7 | 5 | 8 | | |
| 312 | 3 | 13 | 3 | 8 | | |
| 315 | 3 | 9 | 5 | 7 | | |
| 336 | 3 | 7 | 16 | 3 | | |
| 360 | 3 | 9 | 5 | 8 | | |
| 364 | 3 | 13 | 7 | 4 | | |
| 390 | 4 | 13 | 5 | 2 | 3 | |
| 420 | 4 | 7 | 5 | 3 | 4 | |
| 455 | 3 | 13 | 5 | 7 | | |
| 504 | 3 | 9 | 7 | 8 | | |
| 520 | 4 | 13 | 5 | 8 | 5 | |
| 546 | 4 | 13 | 7 | 2 | 3 | |
| 560 | 3 | 7 | 5 | 16 | | |
| 585 | 3 | 13 | 9 | 5 | | |
| 630 | 3 | 9 | 5 | 7 | 2 | |
| 720 | 3 | 9 | 5 | 16 | | |
| 728 | 3 | 13 | 7 | 8 | | |
| 780 | 4 | 13 | 5 | 3 | 4 | |
| 819 | 3 | 13 | 9 | 7 | | |
| 840 | 4 | 7 | 5 | 3 | 8 | |
| 910 | 4 | 13 | 5 | 7 | 2 | |
| 936 | 3 | 13 | 9 | 8 | | |
| 1008 | 3 | 9 | 7 | 16 | | |
| 1040 | 3 | 13 | 5 | 16 | | |
| 1092 | 4 | 13 | 7 | 4 | 3 | |
| 1170 | 4 | 13 | 9 | 5 | 2 | |
| 1260 | 4 | 9 | 5 | 7 | 4 | |
| 1365 | 4 | 13 | 5 | 7 | 3 | |
| 1456 | 3 | 13 | 7 | 16 | | |
| 1560 | 4 | 13 | 5 | 8 | 3 | |
| 1638 | 4 | 13 | 9 | 7 | 2 | |
| 1680 | 4 | 7 | 5 | 16 | 3 | |
| 1820 | 4 | 13 | 5 | 7 | 4 | |
| 1872 | 3 | 13 | 9 | 16 | | |
| 2184 | 4 | 13 | 7 | 8 | 3 | |
| 2340 | 4 | 13 | 9 | 5 | 4 | |
| 2520 | 4 | 9 | 5 | 7 | 8 | |
| 2730 | 5 | 13 | 5 | 7 | 2 | 3 |
| 3120 | 4 | 13 | 5 | 16 | 3 | |
| 3276 | 4 | 13 | 9 | 7 | 4 | |
| 3640 | 4 | 13 | 5 | 7 | 8 | |
| 4095 | 4 | 13 | 9 | 5 | 7 | |
| 4368 | 4 | 13 | 7 | 16 | 3 | |
| 4680 | 4 | 13 | 9 | 5 | 8 | |
| 5040 | 4 | 9 | 5 | 7 | 16 | |
| 5460 | 5 | 13 | 5 | 7 | 3 | 4 |

-continued

FACTORS OF N TABLE
(Ordering for "Real" Data Only)

| N | L | $n_1$ | $n_2$ | $n_3$ | $n_4$ | $n_5$ |
|---|---|---|---|---|---|---|
| 6552 | 4 | 13 | 9 | 7 | 8 | |
| 7280 | 4 | 13 | 5 | 7 | 16 | |
| 8190 | 5 | 13 | 9 | 5 | 7 | 2 |
| 9360 | 4 | 13 | 9 | 5 | 16 | |
| 10920 | 5 | 13 | 5 | 7 | 3 | 8 |
| 13104 | 4 | 13 | 9 | 7 | 16 | |
| 16380 | 5 | 13 | 9 | 5 | 7 | 4 |
| 32760 | 5 | 13 | 9 | 5 | 7 | 8 |
| 65520 | 5 | 13 | 9 | 5 | 7 | 16 |

*denotes non-composite N's

TABLE OF OPTIMAL LOOP ORDERING (for Complex Data)
Figure of Merit (formula)
Determines Optimal Ordering of Factors:

$$a_i \geq a_2 ... \geq a_L$$
$$a_i = \frac{Mn_i - n_i}{I_i + O_i}$$

Where $Mn_i$ = number of multiplies associated with factor $n_i$
$I_i$ = number of input adds associated with factor $n_i$
$O_i$ = number of output adds associated with factor $n_i$

| i | $a_i$ | |
|---|---|---|
| 9 | 1/11 | |
| 13 | 1/12.75 | |
| 5 | 1/17 | When used, the factors are ranked: |
| 7 | 1/18 | 9 always innermost to all factors, |
| | | 13 always innermost to all factors |
| 16 | 1/37 | except 9, ... |
| 2 | 0 | |
| 3 | 0 | |
| 4 | 0 | 2 ⎫ |
| 8 | 0 | 3 ⎬ equal ranking of 0 |
| | | 4 ⎭ |
| | | 8 |

The System RAM is utilized to store the calculated parameters for a particular transform operation having a fixed N. Parameters stored in this memory in a tabular form are utilized by the operational control sequences to compute the transform for a particular value of N, and a particular condition of "real" or "complex" of the input data vector.

The Data RAM 26 is utilized to store the input vector and the output vector, it being noted that the output vector is progressively generated as the evaluation phase of the system in turn progresses towards completion. Certain auxiliary storage areas are also provided in the Data RAM as working storage locations for the system during certain intermediate operations as will become apparent from the subsequent description. The System Control ROM 12 shown within the "structured state machine control system" or control portion of the system is a read only memory as is the System Parameters ROM 22, it being specifically noted that this section of the control machine has stored therein all of the essential operational sequences necessary to perform both the initialization and evaluation functions. During the initialization phase the control sequences are interconnected so that the entire initialization run is completed, one section at a time, until all of the necessary operations have been performed and the System RAM and the Data RAM provided with the necessary information and data pointers required for the operational or evaluation sequence to be performed on a specific input vector. Upon termination of the initialization phase, an indication will be provided to the control unit 10, at which point the evaluation phase may be started. The structure of the control sequences stored in the system control ROM 12, is of a high level such that they are fed to the State Machine Sequence Controller 14, which in effect performs a partial decoding of each of the operational sequences stored in the control ROM 12. This decoding in the Sequence Controller 14 causes a predetermined sequence of microcontrol sequences stored in the Microcontrol ROM 16, to be gated into the register 18, which includes requisite decoder means to perform the actual gating of the various elements of data from the three memories 22, 24 and 26 as well as the control of the flow of data within the input registers, output registers, and working registers. Finally, it controls the operation of both the buses and the arithmetic and logic unit 20. The detailed gating control circuits are not disclosed in the present embodiment, due to the fact that such controls would be routine for a person skilled in the art provided with the flow control sequence drawings and the detailed description of the operation of the system provided herein. As will be apparent, the return line 19 proceeding from the bottom of register 18 into Sequence Controller 14 indicates that a given operational sequence is complete and that the next sequence may be started.

The use of the input registers and the output registers is clear from the figure, it being noted that the input register positions 0 through 4 are connected to specific sources and the output registers are connected to specific destinations. The size of the working registers, i.e., numbers provided, will vary depending on the trade off between the cost of providing extra working registers as opposed to the time of accessing the data RAM 26 for intermediate storage purposes.

While the general architectural configuration of the system has been set forth, it will be understood that it is necessary to specifically refer to the subsequent descriptions of the various operations which occur within the system to fully appreciate the operation of the overall system hardware in performing a desired Fourier Transform.

The previous description of the mathematical concepts which lead to the development of the present Fast Fourier Transform Computer System architecture have been described previously, and should be referred to for a detailed understanding of the mathematical bases of the various operations which occur within the system.

To synopsize, the unique features of the present solution method, it will be remembered that the basis of the solution is a nested loop solution method, wherein all operations performed in the outer loops are vector operations, rather than scalar operations, and the fact that no actual multiplication occur in outer loops but only in the single inner loop. A further significant feature is that these scalar multiplications within the inner loop are not performed utilizing a single coefficient from a Discrete Fourier Transform Table, but utilize a composite coefficient, which is a function of the individual components of the Discrete Fourier Transforms for each of the outer loop factors as well as the inner loop for a given inward transition.

Figure 19:
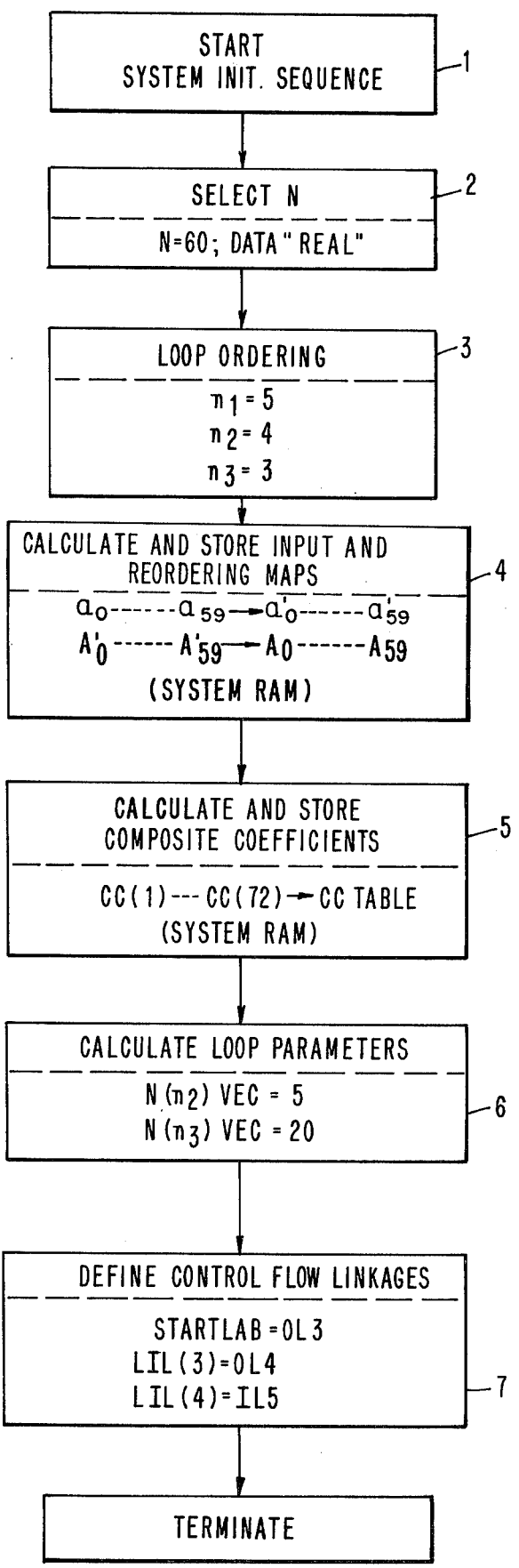
FIG. 19 comprises a parameterized system flow chart of the 'Initialization' function of the present system for the specific example of N=60 similar to FIG. 4.
Figure 20:
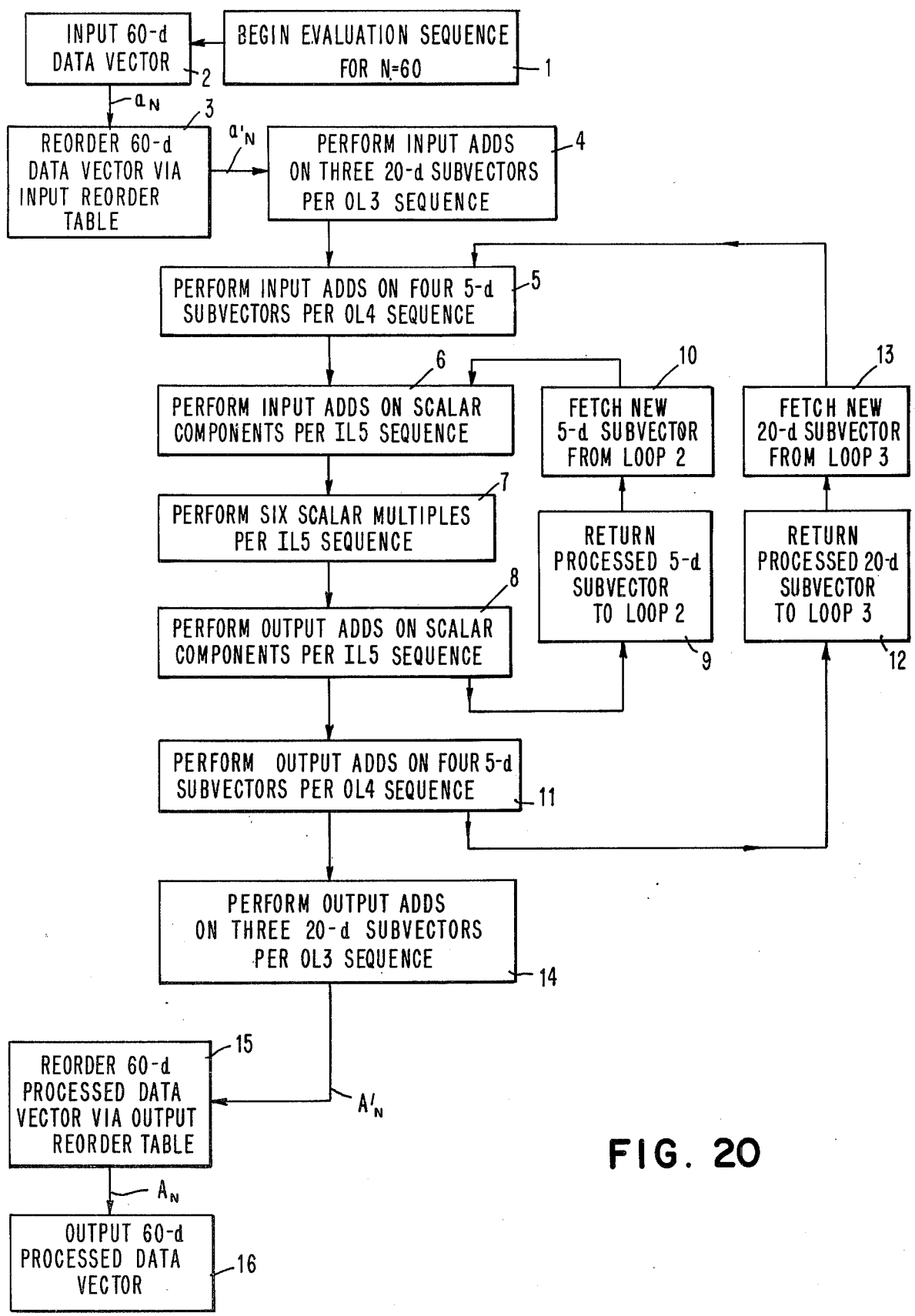
FIG. 20 comprises a parameterized detailed system flow chart of the 'Evaluation' function of the present system operation for the herein illustrated example of N=60 similar to FIG. 13.

As will be apparent, the control sequences, especially during the evaluation portion of the system operation, are quite complex and accordingly, both a general description of the evaluation operation is set forth subsequently with respect to the overall system control flow diagram of FIGS. 14A through D. Subsequently in the description there is presented an example for N=60. FIGS. 19-21 comprise parameterized flow charts, substantially identical to FIGS. 4, 13 and 14, but specifying the actual values which would be utilized for this specific example.

Figure 2:
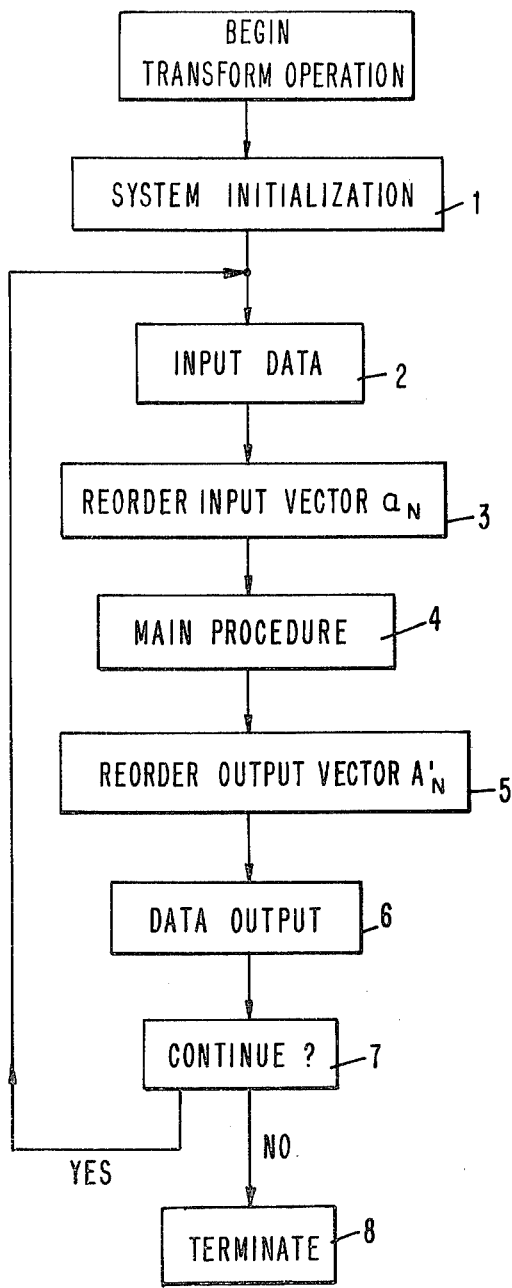
FIG. 2 comprises an overall system functional flow chart.

Referring now to FIG. 2, this comprises an overall flow chart of the transform operation around which the present system architecture is built.

Figure 4:
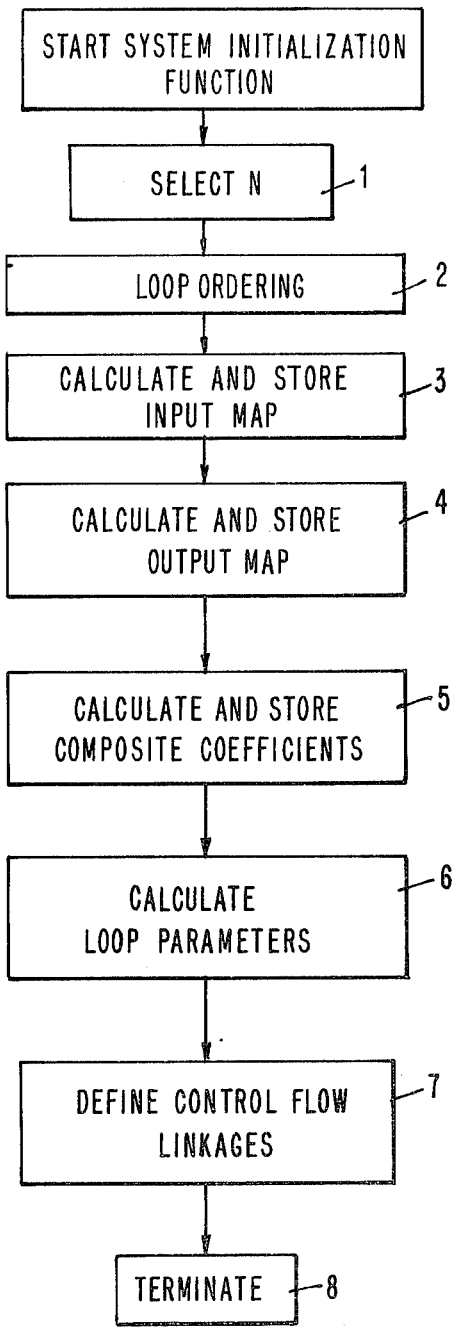
FIG. 4 comprises a system flow chart of the 'Initialization' function of the present system shown in FIG. 2.
Figure 3:
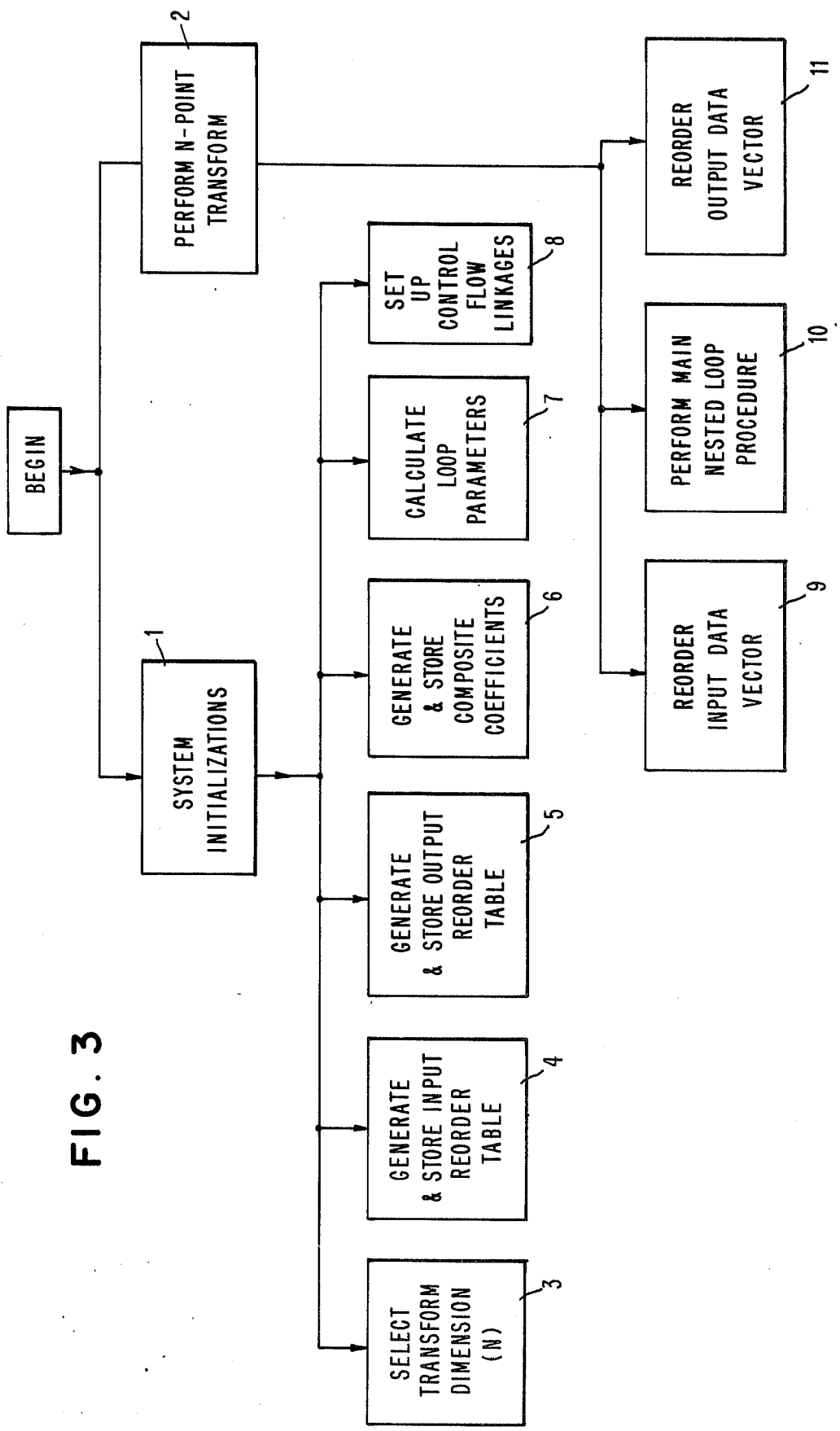
FIG. 3 comprises a non-sequential functional diagram which specifies the principal operations to be performed by the system to effect the desired fast Fourier transform.

Block 1 entitled System Initialization, is actually a multifaceted procedure, the individual steps of which are detailed further in FIGS. 3 and 4. It is necessary that all of the operations required of this block be completed prior to beginning an evaluation operation.

The actual evaluation phase begins with block 2, wherein an input data vector is entered into the system. Block 3 labeled "reorder input vector $a_N$" refers to the input reordering necessary for the present highly efficient a small-n DFT solution algorithms to be used. Once the input reordering operation is completed, the system is ready to begin "the main procedure" of block 4. This procedure, which will be described in much greater detail subsequently, involves the nested loop solution method described herein, where only vector additions and/or subtractions are performed in the outer loops and multiplications, which are scalar, are performed only in the innermost loop. This procedure utilizes the inner loop and outer loop operational sequences which are set forth in detail subsequently and which must be appropriately linked together and parameterized by the system initialization sequences. Subsequent to the completion of the main procedure transform operation an output vector is produced, referred to herein by $A_N'$. This vector must be converted to the proper output vector $A_N$ by the block 5, which performs the output reordering operation. The output vector is taken via the output bus in block 6 and finally in block 7 the system controls are interrogated to determine whether only one transform is to be performed or whether additional transforms are to be preformed on new input vectors $a_N$. If not, the system proceeds to block 8, which as indicated, states the system operation is terminated.

Referring now to FIG. 3 the overall operations which must be performed by the present system in accomplishing the desired Fourier Transform are set forth in a hierarchy chart format. This chart exhibits the various functional sequences performed by the system. It will be noted that the chart is broken into two separate sections, one branching out under block 1 entitled "system initializations" and the other branching out under block 2, which is the "evaluation" procedure.

The initialization portion of the system operation requires that only one of the enumerated operations be performed at a particular time. The first is the actual selection of the transform dimension N, which is performed in block 3. This selection allows access to the factors of N table from which the various members or factors of N will be available to the system for further calculations. This selection also implies the loop ordering determination upon which other sequences are dependent. The remaining operations, i.e., the generation and storing of the input and output reordering tables of blocks 4 and 5, the generation and storing of the composite coefficients of block 6, calculation of the loop parameters of block 7, and the establishing of the control flow linkages of block 8 may be performed in any desired order since the calculations performed in one do not depend upon the calculations performed in the other blocks. However, as stated previously, the control store mechanism which contains the operational sequences for these operations must contain a built in linkage system which will automatically cause the various operations to be performed in some desired predetermined order. A preferred ordering is shown in the flow chart of FIG. 4, which is a flow chart of the initialization routine and assumes the disclosed ordering for these operations. However, it is not necessary that this order be followed.

As stated previously, it is necessary that the input and output reordering tables be generated so that the input and output vectors may be suitably reordered, which allows the system to utilize the present small-n solution algorithms.

The composite coefficients generated in block 6, as was explained previously, are required for each of the scalar multiplies which are performed in the inner loop. Each inner loop multiply causes the particular specified scalar input vector component, after all the requisite outer loop and inner loop input adds (substracts) have been performed, to be multiplied by the proper composite coefficient for that particular operation. Each such coefficient is in turn a composite or product of the proper Discrete Fourier Transform matrix coeficient (of all loops). Also, as stated previously, these generated composite coefficients are stored in an appropriate table in the System RAM described briefly with reference to FIG. 1.

Block 8 refers to that initialization operation wherein the control flow linkages are determined and specified so that the various outer loop and inner loop sequences are able to function and interact to control the operation of the system during the actual nested loop main procedure evaluation. The proper loop transitions are made whenever a pseudo multiply is encountered in an outer loop. Through this operation, as will be apparent from the description of FIG. 14, pointers to the next inner loop must be placed in the outer loop procedures and similarly continuously updated return labels must be placed at the bottom or return portion of each of the loops so that the proper branch-back into the next outer loop may be made if such an outward loop transition becomes necessary. These labels are referred to respectively in the subsequent description as the loop inward label (LIL) and the loop outward label (LOL) respectively. In the header portion of FIGS. 14 and 21 these labels additionally carry a loop position specification, viz., 1 through L. It should be further noted that, for a given system initialization, the loop inward labels never change since, when an inward transition is made, the transfer of system control always goes to the very top of the next inward loop operational sequence. Conversely, when a loop outward transition is made, the return or branch-back point varies and must be continuously updated with each transition until the particular loop operation is completed.

It will be obvious that in order for the proper flow control linkages to be established it is, of course, necessary to know the loop ordering which may be either taken from the "factors of N tables" directly for the case of real input data or computed in a manner to be set forth subsequently for the case of complex input data.

Referring now to the evaluation portion of the operation which contains the three blocks 9, 10 and 11, it will be apparent from the previous description that in actuality it is necessary to perform the reordering of the input data vector depicted by block 9 before the main procedure is begun, and similarly subsequent to the main procedure it is necessary to reorder the output data vector to produce the proper final output transform $A_N$.

Referring now to FIG. 4, a sequential flow chart is shown for the initialization functions which have just been described with respect to FIG. 3. This chart illustrates a preferred order of operational sequences which occur in the architecture, certain items of which the order of execution are mandated, such as blocks 1 and 2, and the remainder of which are optional in sequence, namely blocks 3 through 7. As stated in the previous description of FIG. 3, it is first necessary to select the dimension N of the input vector $a_N$ before any other operations may be performed. At this point it should be noted that the person wishing to utilize the system would either have to try values of N against the system, and be given either an "accept" or "reject" signal from the machine, which could easily be set up by a person skilled in the art. Preferably the person wishing to utilize the system would merely have the list of acceptable values of N, from which he would make an appropriate choice. After this choice is made, the system then proceeds to the "factors of N tables" stored in the system ROM which provides the predetermined mutually prime factors, stored in this table and which are utilized in subsequent operations during the initialization phase. Built into this table is the preferred ordering of the factors for the case where the input values are real data. For the situation where the input data are to be complex a loop ordering sequence which is set forth in FIG. 5 must be entered and the proper loop ordering decisions made.

The calculation and storage of the input and output reordering maps designated by blocks 3 and 4 are performed next. It is noted that FIGS. 6 and 7, which will be described subsequently are the system flow charts which set forth the specific operations performed to determine the proper reordering maps or tables. Next the composite coefficients are calculated and stored in the System RAM in accordance with the operational sequences set forth in the system flow chart of FIG. 8 which will likewise be described subsequently.

Figure 9:
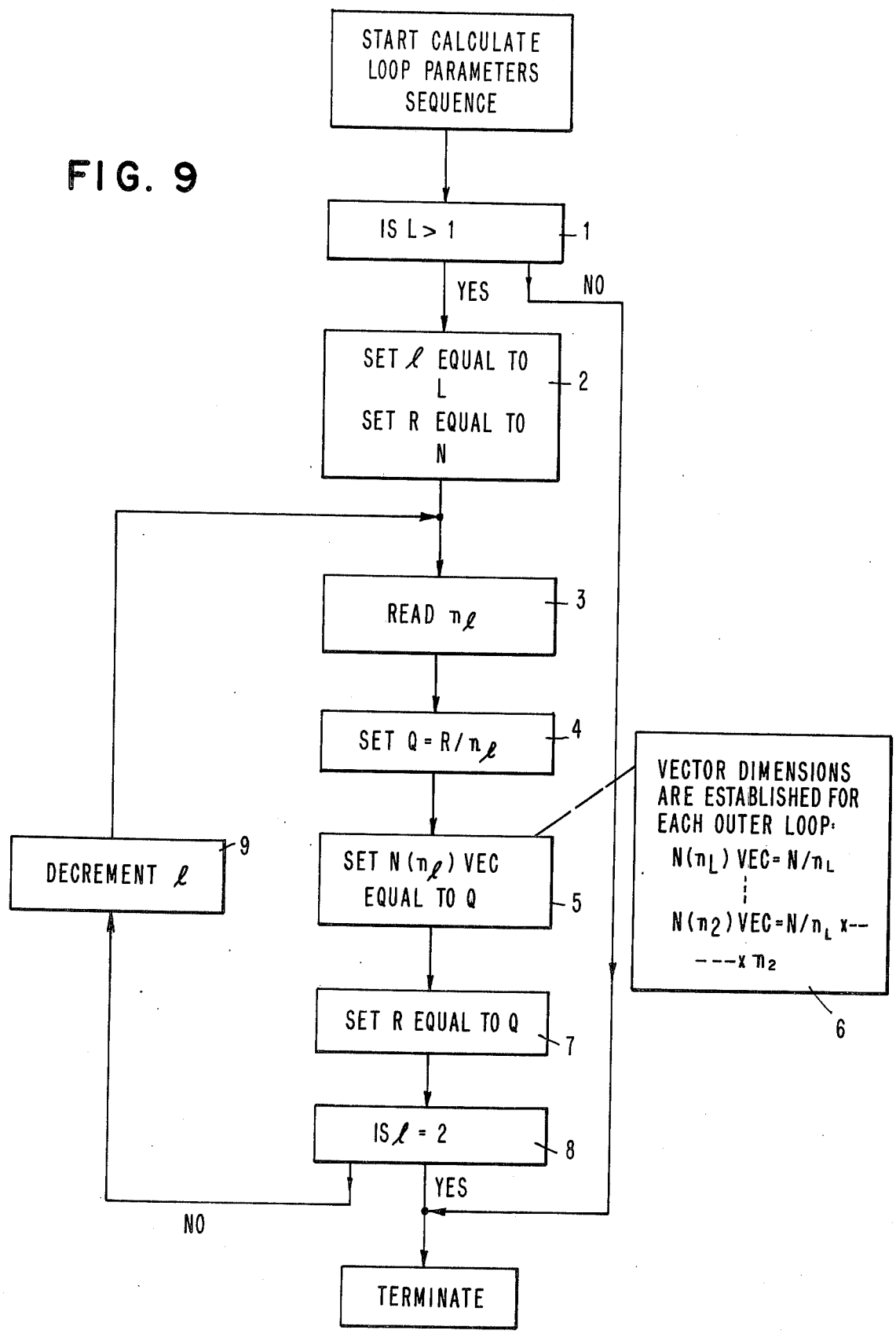
FIG. 9 comprises a system flow chart specifying the sequences required of the 'Calculate Loop Parameters' block (6) of FIG. 4.

The "calculate loop parameters" operation of block 6 must next be performed, it being noted that the specific operational sequences required of this operation are set forth in the system flow chart of FIG. 9. Basically this operation computes the size of the data vectors to be handled in each loop.

Finally, the computation of the control flow linkages as set forth in block 7 are performed. The specific operational sequences occurring during this computational phase are set forth in detail in FIG. 10. At this point the initialization function is completed and the required system parameters calculated and stored in the System RAM. The various outer loop and inner loop operational sequences stored in the System Control ROM have been specified and parameterized and the system is ready to begin the evaluation operation.

It is again to be understood, that at this point the system is prepared to perform as many evaluation operations or transforms as are desired, assuming one that the vector dimension N does not change and further that the form of the data, i.e., real or complex, does not change. The first condition is absolutely necessary. The second condition, i.e. the form of the data, could be changed without reentering the initialization phase, however, the optimal loop ordering sequences might or might not be present for any given value of the vector dimension N.

Figure 5:
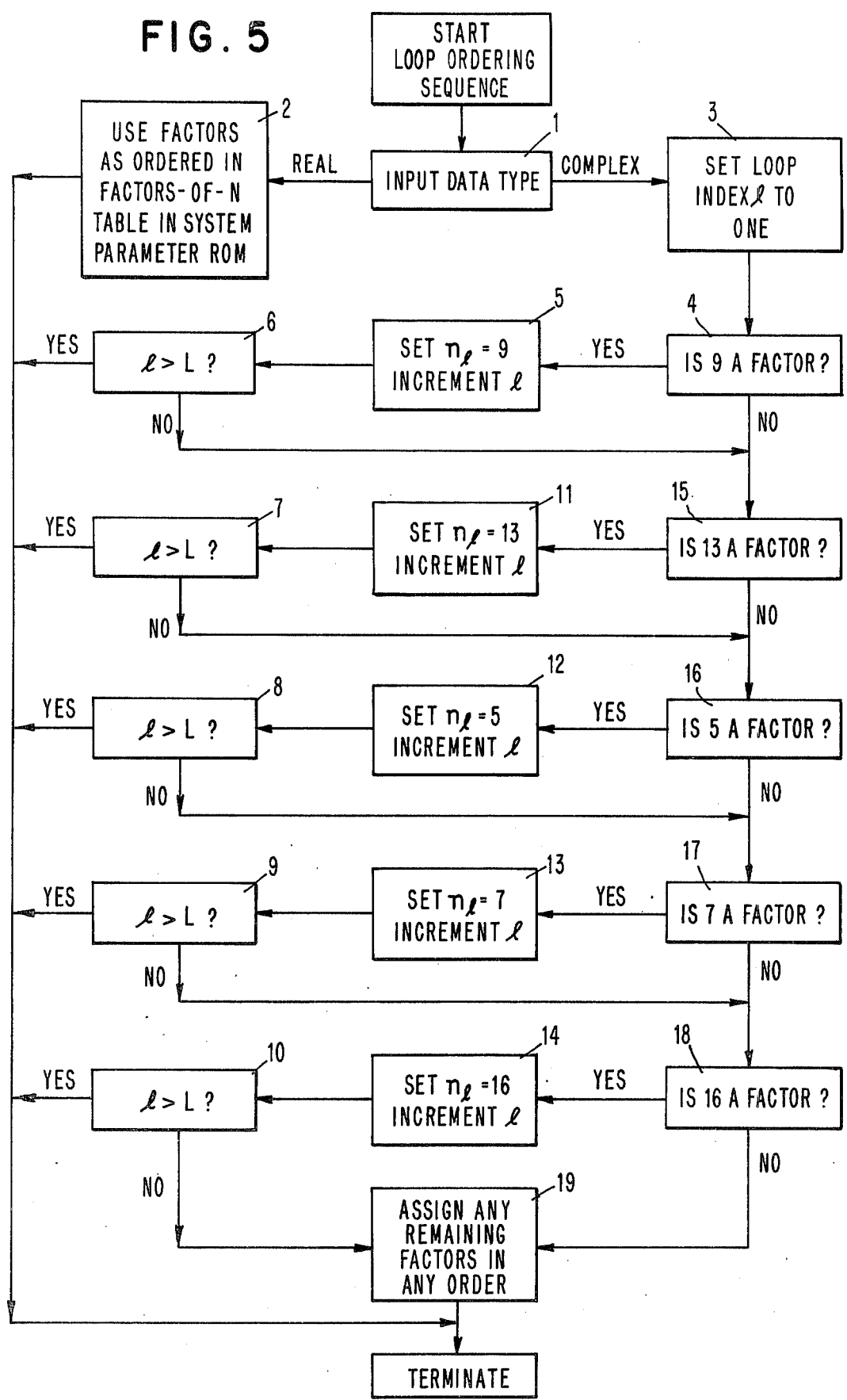
FIG. 5 comprises a system flow chart specifying the operations performed during the 'Loop Ordering Sequence' block (2) of FIG. 4.

Referring now to FIG. 5, operations required of the "loop ordering sequence block" of FIG. 4 will be described. Before beginning the description it should first be noted that the purpose of the loop ordering sequence is to determine the ordering of the factors to be used in each loop so as to minimize the total number of additions occurring during the overall transform operation. The numbers of multiplies are the same regardless of how the factors are assigned to loops; however, the total numbers of additions will vary depending upon the assignment of the factors. It is accordingly the purpose of this operation to optimize system operation by minimizing the number of total additions. In the case of real data, there is no readily available calculation which can be made, which will predict the optimal ordering sequence. Accordingly, the loop ordering for the real data case has been precomputed by exhaustively testing all possible combinations of factor arrangements to obtain the least number of additions. These orderings are placed in the factors N table, stored in the System ROM.

For the complex case it is possible by a relatively simple mathematical operation to determine a figure of merit $\alpha_i$ for each of the factors, wherein the larger the figure of merit of a factor, the further inward the factor should be placed in the assignment of factors to loops. The figures of merit for each of the allowable factors used in the present system, i.e., 2, 3, 4, 5, 7, 8, 9, 13 and 16, have been precomputed and have been utilized to construct the loop ordering operational sequence for the complex data case. The computation results show (see "Table of Optimal Loop Ordering") that, in order of descending figure of merit, the ranking of factors is as follows 9, 13, 5, 7, and 16. All of the other factors 2, 3, 4 and 8 have equal figures of merit, viz., 0, and when they occur as one of the factors for a particular value of N their relative order is irrelevant.

Thus, for the complex data case, a very simple procedure is involved in performing the loop ordering sequence and it has been determined that less storage is needed to compute the loop ordering for the complex case, rather than storing a complete set of precomputed ordering lists for each of the permissible values of N set forth in the factors of N table.

Proceeding now with description of FIG. 5, once the sequence is started the first decision which is made is in block 1 wherein it is determined whether the data to the input are real or complex. As stated previously, this is considered an input console function, and an appropriate key would be pressed on the console to indicate the form of the data. Assuming the "real" key were pressed, the system would proceed to block 2 and the value of N input to the system would be utilized as an address into the "factors of N table" and the appropriate loop ordering sequence would be extracted therefrom. If the "complex" key were pressed the system would proceed to block 3, and an appropriate loop index counter would be set to one. Loop index l=1 means that the first factor from the factors list to be selected by this program will be the innermost loop. The system then proceeds to block 4 wherein a simple comparison is made to see if 9 is one of the factors of N. The factor list is obtained from the factors of N table the same as with the "real" data case. However, in the case of complex data, the ordering from the factors of N table is not utilized. Assuming, for the sake of argument, that 9 is one of the factors, the system would proceed to block 5, and the factor 9 is assigned as the factor $n_1$ associated with the innermost loop. At the same time the loop index counter is incremented, in this case to a 2 and the next factor selected from the factors of N list for this particular value of N will be the factor $n_2$. After each successful test for a factor, a test is made to see if the current setting of the loop index l is greater than L which as will be remembered represents the total numbers of factors or loops for a particular value of N. If the test for this value is positive, the system proceeds to the termination point, which means that all of the factors have been assigned to loop positions. Similar blocks 7, 8, 9 and 10 are included for each successful testing of a given factor. Blocks similar to block 5, i.e., blocks 11, 12, 13 and 14 are provided for each of remaining factors 13, 5, 7 and 16, respectively, which will assign the proper loop ordering value for that factor and appropriately increment the loop index counter.

Assuming, however, that the test made in block 6 was negative, the system would proceed to block 15 where the factor 13 is tested against the factors of N. A similar test is made in blocks 16, 17 and 18 for the factors 5, 7 and 16. Assuming at this point, for the sake of explanation, that neither 13, 5 nor 7 is a factor, but that 16 is a factor, the system will then branch to block 14 where $n_2$ is assigned the factor 16, the loop index counter incremented and the test block 10 entered. Assuming that block 10 results in a negative test, the system will proceed to block 19 wherein any remaining factors of N, i.e., 2, 3, 4 and 8 are assigned arbitrarily to the remaining loop positions until the final loop factor $n_L$ is assigned. Once this is done the loop ordering sequence is completed and the system is ready to proceed to the next operation which in the flow chart of FIG. 4 is indicated to be block 3, "calculate and store input map". This operation is referred to elsewhere as the "generate input reordering table sequence".

Figure 6C:
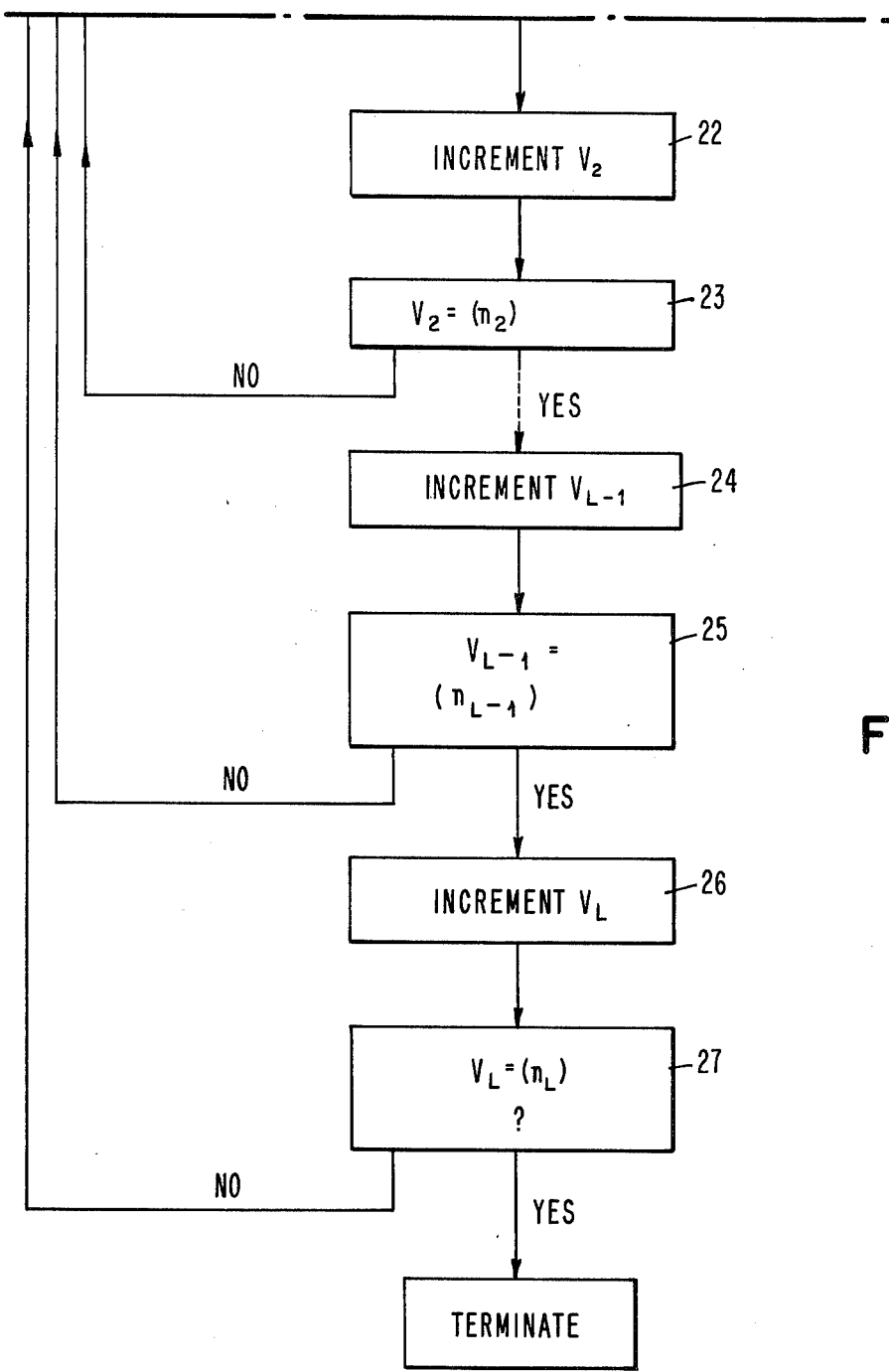
FIGS. 6A through 6C comprise a system flow chart specifying the operations required in the 'Output Reordering Sequence' block (4) of FIG. 4.
Figure 6:
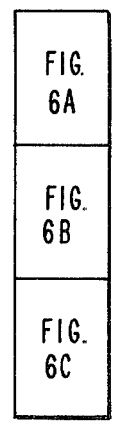
FIG. 6 comprises an organizational diagram for FIGS. 6A through 6C.
Figure 6A:
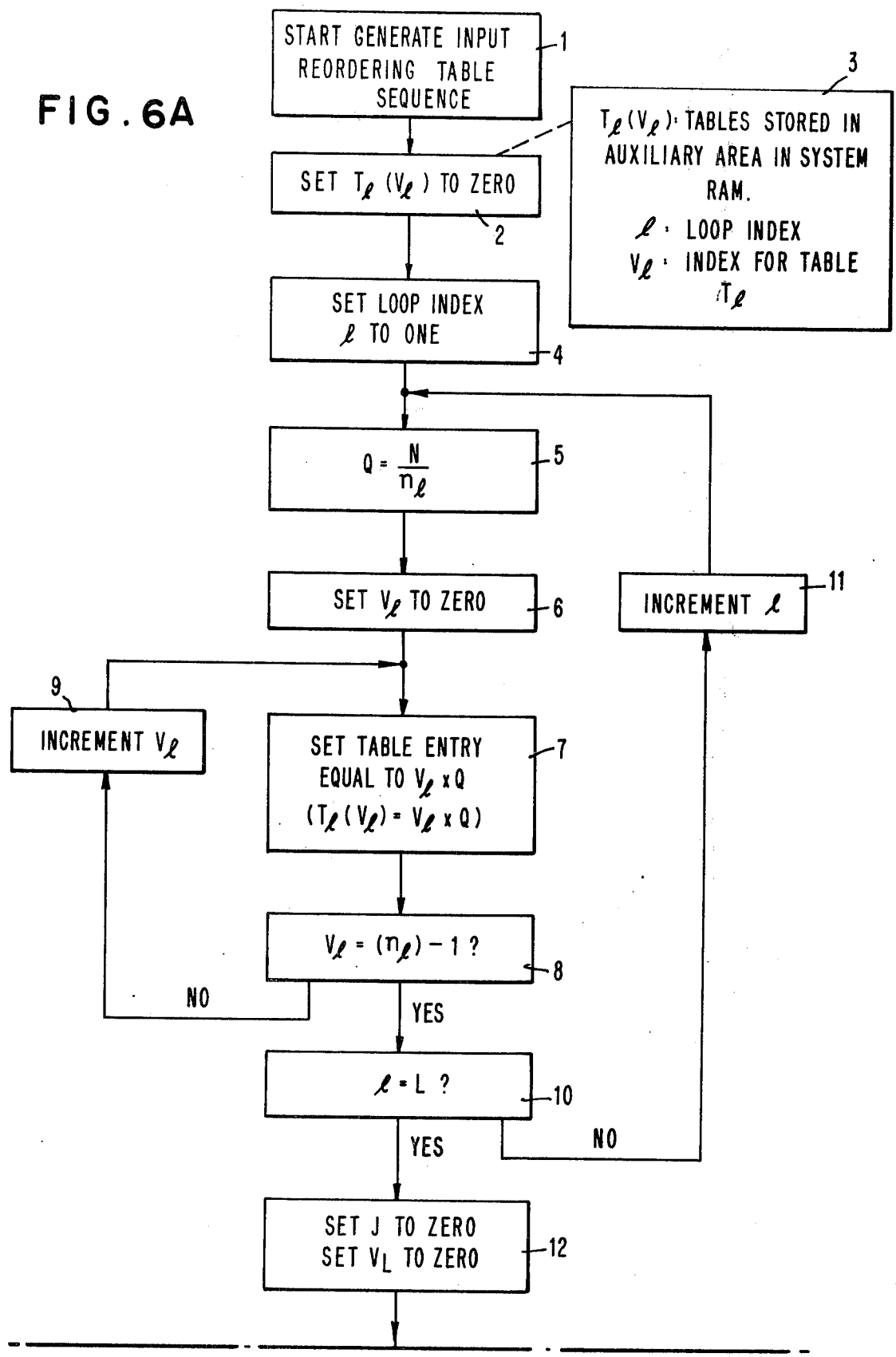
Figure 6B:
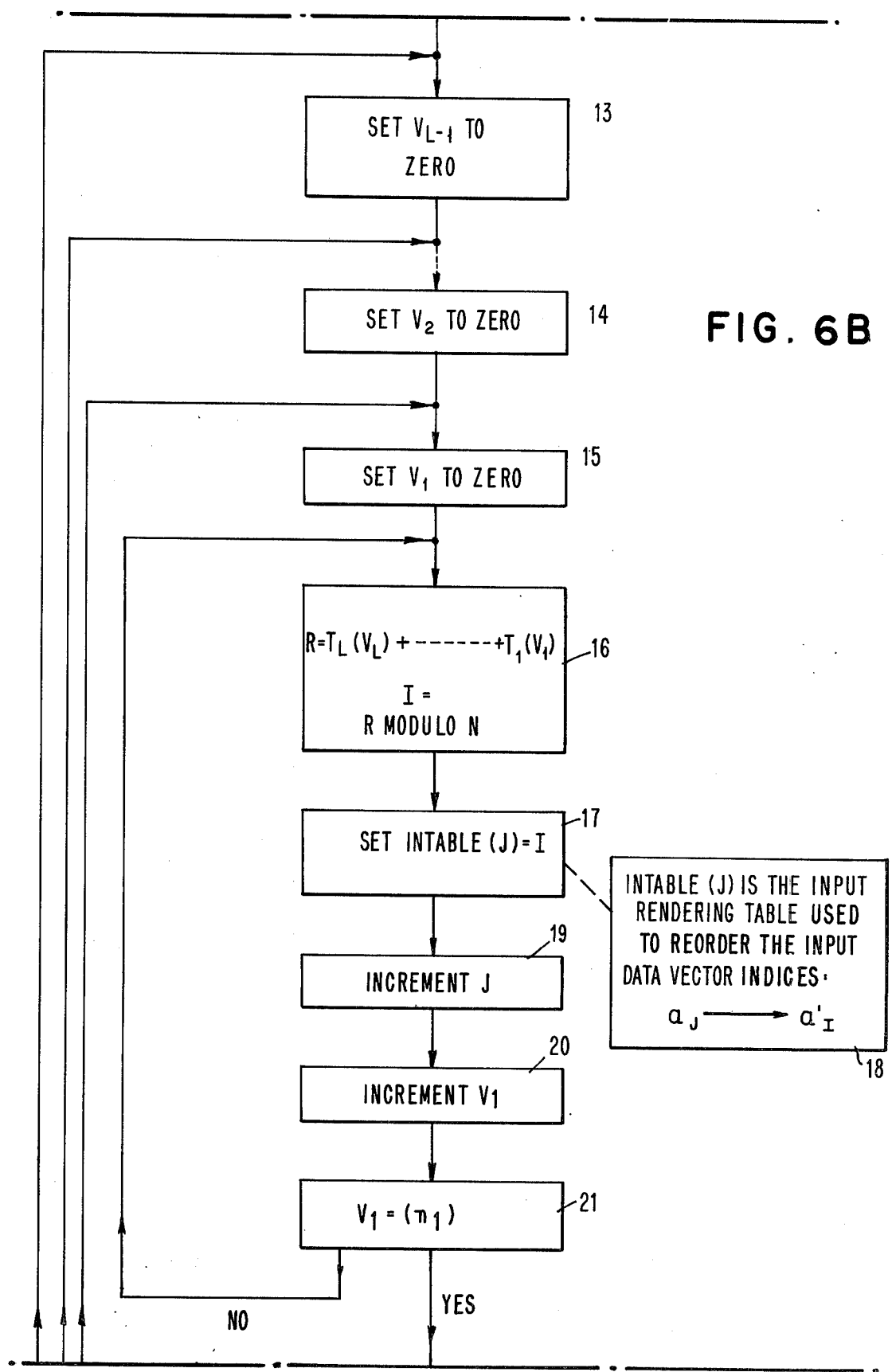
Figure 7A:
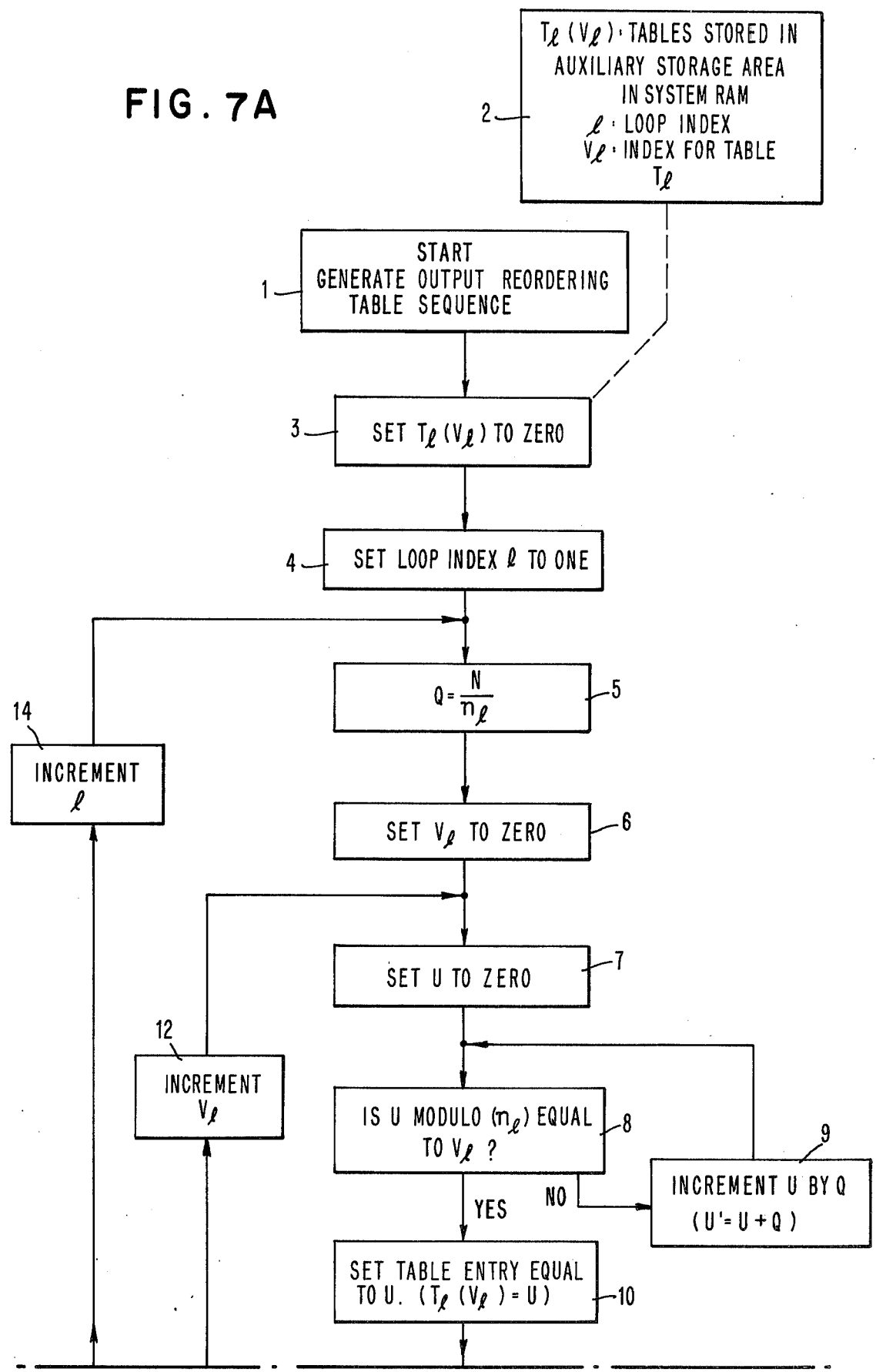
Figure 7B:
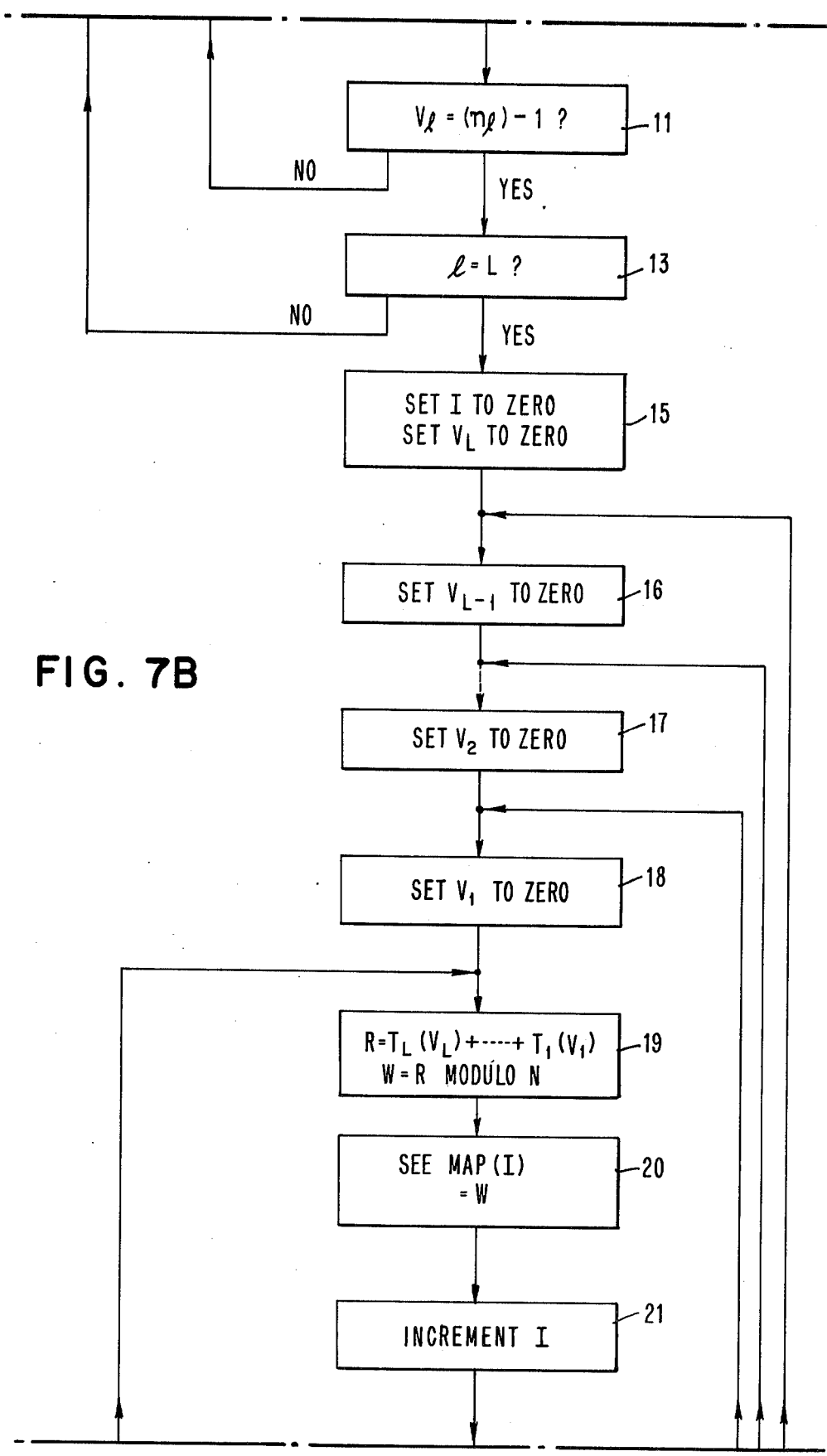

Referring now to FIGS. 6A through 6C whose composite organization is shown in FIG. 6, a description will follow of the "generate input reordering table sequence". As was explained previously, in the mathematical portion of the description of the present system, it is necessary that the input vectors be reordered in order for the described small-n algorithms to be used. As was explained in the mathematical portion, and also explained in the referenced article, which go into the mathematical background of the present Fourier transform more deeply, this reordering does not change or in any way effect the final results of the transform providing a separate and distinct output reordering follows at the end of the total transformation. The precise reasons and explanations for the particular reordering method will not be gone into in detail at this point, however, it is noted that the reordering table generated is dependent upon the particular value of the vector dimension N, the individual factors making up this vector, and also on the loop ordering.

It should be remembered that the present sequence produces the reordering table or map which is actually used in the input data vector reordering procedure; however, the present sequence does not perform the reordering per se.

Basically the reordering table generation sequence comprises two steps. The first is the generation of as many separate tables as there are factors in the particular transform being performed. There will be L factors and therefore, the same number of working tables. In the flow chart each table is represented by the symbol $T_l$ wherein the loop index, l, refers to the particular loop position for that factor. Referring to block 3 on FIG. 6A, this is an explanatory label, stating the definitions utilized subsequently. It will be noted that the expression $V_l$ is the index or address of a particular entry in the associated table $T_l$.

The sequence is started in block 1 and proceeds to block 2, wherein all of the tables and indices therefor are reset to 0. In block 4 the loop index counter is set to 1. The system then proceeds to block 5 wherein a value Q for the first or innermost loop is computed which is equal to the quotient of N divided $n_1$. This latter value is obtained from either the "factors of N table" in the case of real data, or from the computed loop ordering sequence. Next in block 6 the table-index register $V_l$ for table $T_l$, which in this first case is 1, is set to a 0. This will point to the first 0th position of table 1. In block 7 the previously computed value of Q is multiplied by the current value in the table-index register, $V_l$. This value is then placed in table 1 in the 0th storage position. On this first pass, since $V_l$ is set to a 0, the quantity entered will be 0 in this table and in all others, as will be obvious. Next in block 8 the setting of the table-index register $V_l$ is tested to see if it is yet equal to the value $n_1 - 1$. If not the system proceeds to block 9, wherein the table-index register $V_l$ is incremented and block 7, 8, and 9 are repeated until the affirmative path is taken out of block 8. What this last sequence of operations has done is to construct the table $T_1$ having as many entries (beginning with the 0th position) as the magnitude of the factor in the first loop ($n_1$).

In block 10 the setting of the loop index counter l is tested to see if it is equal to the value L which is the number of factors or loops in the particular transform. If not further table(s) must be generated and the system increments the loop index counter l in block 11 and returns to block 5, wherein a new computation of the value of Q for this additional table is made, this time utilizing the same value of N but a new value for the factor $n_l$. Also in block 6 the table-index register for the new table $T_l$ is reset to 0 and the procedures of blocks 7, 8 and 9 are repeated until this table is completed, at which point block 10 will again be entered and the test specified in block 10 is made. The sequences of operations between blocks 5 and 11 will continue until all L tables have been appropriately generated, at which point the system will continue to block 12.

In block 12 the counter J is reset to 0, as well as the table-index register $V_L$ for table $T_L$. The system then proceeds to block 13, where the table-index register $V_{L-1}$ for table $T_{L-1}$ is set to 0. Similarly the table-index registers for all of the tables are reset to 0 through blocks 14 and 15. It will be understood by the discontinuous line between blocks 13 and 14 that tables and associated table-index registers can vary in number, only four being explicitly referenced in this flow chart. Block 16 begins the actual computation of the input reordering table. The counter J which was reset to 0, in block 12, is utilized as the address index register for the reordering table. It will be understood that the size of this table (number of entries) is equal to the vector dimension N. Thus, as the reordering table generation sequence proceeds, the index register counter J will be progressively incremented from 0 to $N-1$.

To return to block 16, two computations are implied therein. The first is a computation of the value R, which comprises the addition of all of the entries in the L tables currently being pointed to by their respective table-index registers $V_l$. These entries are added to produce the sum R and this sum is taken modulo N to produce the quantity I which becomes the entry in the reorder table (INTABLE) at location J. This latter operation is performed in block 17. Block 18 is merely an explanatory legend, specifying the function of INTABLE. In block 19, the counter register J is incremented and in block 20 the register $V_1$ is incremented. In block 21 the current value of the register $V_1$ is tested to see if it equals $n_l$. The purpose of this test is to determine whether all positions in the table $T_1$ have been accessed in the current round of evaluations for the quantity I. If the test is negative, blocks 16, 17, 19, 20 and 21 are repeated until the test in block 21 is affirmative. At this point block 22 is entered, which causes counter $V_2$ to be incremented and block 23 tests the setting of the counter register $V_2$ to determine if it has been completely cycled. If not, the system reverts back to block 15, wherein the counter register $V_1$ is again set to 0 and the inner loop consisting of blocks 16, 17, 19, 20 and 21 is again completely cycled as before. And this operation continues until table $T_2$ has been completely utilized as described previously with respect to table $T_1$. Blocks 24 and 25 in turn cause a complete evaluation of table $T_{L-1}$ and blocks 26 and 27 allowed to complete the evaluation of table $T_L$, it being noted that an affirmative decision from block 27 signals that the sequence is over.

What will have been generated by this routine, as stated previously, is a complete reordering table having N entries therein. The processing of the input reordering routine is basically a lexical process similar to that utilized for the composite coefficient generation. However, the actual values extracted are utilized in the composite coefficients case to produce products, whereas in the present case they are utilized in combinations of additions and modulo division. Also in the case of the composite coefficients, the entries in each list or table equal the number of multiplies present in each loop whereas in the case of the reordering the number of entries in each table exactly equals the magnitude of the related factor $n_l$ for each loop.

The 'generate output reordering table sequence' is disclosed in the flow chart of FIGS. 7A through 7D. The way these sheets are connected together is set forth in the organizational drawing of FIG. 7. The manner in which the actual reordering table is generated is similar to the way in which the input reordering table is generated. However, as will be apparent from the description it is not merely an inverse map as, if this were the case, the input reordering table could be utilized in reverse order. In the present sequence a set of generating tables $T_l$ are established, one for each loop in the solution process and, having filled these tables as indicated in the following flow chart, a first table MAP(I) is generated by a lexical method similar to the one utilized for the 'input reordering sequence' and having generated all N entries for this table, it is in turn utilized in inverse direction to generate the actual output reordering table designated herein as OUTABLE(J).

As with the 'generate input reordering table sequence', each of the generating tables $T_l$ is computed and filled starting with the innermost loop ($n_1$). Then the next table is filled and so on until the table relating to the outermost loop $T_L$ is computed and filled.

Referring now to the figure, block 1 indicates the starting of the sequence, it being understood that certain of the other evaluation routines must precede this, especially the selection of the factors of N and also the loop ordering. Block 2 is an explanatory label as utilized in FIG. 6 explaining the the initial establishment of the set of temporary tables $T_l$ each one having a table-index register $V_l$ associated therewith, which may be suitably incremented as the need arises. It also specifies the existence of the loop index counter l utilized for control purposes in the sequence. Block 3 states that all of the L tables ($T_l$) are initially set to 0 at the beginning of this sequence. Block 4 causes the loop index counter to be intially set to 1. Block 5 establishes the value for Q as being equal to the vector dimension N divided by the loop 1 factor $n_1$. In block 6 the index register $V_l$ is set to 0. In this first pass l=1 and thus this register points to the 0th (first) storage location of the table $T_1$. Block 7 causes the working registers U to be set to 0. Block 8 performs a modulo division and comparison as stated. In this case the current setting of working register U is divided modulo $n_l$. This result is then compared to the current setting of the index register $V_l$, and if the stated test is met the system continues to block 10. If it is not met the system branches to block 9 wherein the value in working register U is incremented by the previously computed value of Q and again the two arithmetic operations of block 8 are performed. Assuming the affirmative branch is taken block 10 causes the table entry at the address specified by the index register $V_l$ to be set equal to the current value of the quantity stored in the working register counter U. In block 11 the current setting of the index register $V_l$ is tested to see if all of the required entries in the table $T_l$ have been filled. If not, the system branches-back through block 12 which causes the index register $V_l$ to be incremented and blocks 7, 8, 9, 10 and 11 are repeated. When the test in block 11 is affirmative the system proceeds to block 13 wherein the setting of the loop index counter l is tested to see if all of the tables have been filled. If not, the loop index counter l is incremented and a complete sequence including blocks 5 through 13 are repeated until all L tables are filled. At this point the system proceeds to block 15.

In block 15 a counter register I is set to 0. It should be understood that this register is essentially an address pointer utilized to address an intermediate table referred to herein as MAP(I). As will be apparent from the following discussion this table is ultimately generated and filled with a total of N entries wherein the generation scheme is virtually identical to that utilized in FIG. 6 for generating the input reordering table. It will of course be noted that the result of the mapping procedure will vary quite markedly due to the differing contents of the L tables $T_l$. The second half of block 15 causes the index register $V_L$ for table $T_L$ to be reset to 0. Similarly blocks 16, 17 and 18 cause the other index registers $V_{L-1}$, $V_2$ and $V_1$ for the respective tables to similarly be reset to 0. It will be noted that the broken line between blocks 16 and 17 indicate that there could be more factors and associated loops involved in a particular transform than specifically shown in this figure. The way that these controls would be inserted is thought to be obvious.

Block 19 begins the computational procedure for filling the intermediate mapping table MAP(I). Once R is derived in block 19, and this quantity is taken N and is referred to as the quantity W herein. In block 20 this quantity is stored in the MAP(I) table at the location currently pointed to by the counter register I. It should be noted that this operation is identical to that set forth in blocks 16 and 17 on FIG. 6B. Thus, it will be seen that in block 19 one entry is taken from each of the temporary tables $T_l$ through $T_1$. And as the generation sequence progresses one of the table entries will vary on each passage of the loop through block 19.

Upon entering block 21 the address register I is incremented and, in block 22, the index register $V_1$ for table $T_1$ is similarly incremented. In block 23 a test is made to see if the contents of table $T_1$ have been completely evaluated. This is done by testing the current setting of the next register $V_1$ against the value of the innermost factor $n_1$. In the case of a negative test the system branches-back through block 19, 20, 21, 22 and 23, until the test made in block 23 is affirmative, at which point the system proceeds to blocks 24 and 25, where index register $V_2$ for table $T_2$ is incremented and the setting of the register tested against the quantity $n_2$ to see if if this evaluation round is complete. If not the system branches-back this time to block 18 to begin a new round of table $T_1$ accessing.

The next stage of operations causes blocks 26 and 27 to increment and test the index register $V_{L-1}$ and test its setting appropriately as with blocks 24 and 25 above with the same result. In completely analogous fashion blocks 28 and 29 cause the outer loop table $T_L$ to be completely evaluated. Upon the completion of the block 29, the system proceeds to block 30. It should be noted that at this point the complete table MAP(I) has been filled with a total of N entries, it being noted that the table generation scheme from the L tables $T_l$ is the same lexical ordering (summation) as used with the 'input reordering table generation sequence'.

An additional operation must be performed now to convert the intermediate table MAP(I) into the final output reordering table referred to herein as OUTABLE(J). This operation may be explained most simply by the following example consisting of table A and table B. Table A represents the MAP(I) table, giving a table address I in the lefthand column and the mapping location MAP(I) in the righthand column. This is essentially the organization of the intermediate table MAP(I) generated on FIGS. 7A, 7B and 7C. It is desired to convert this table into the form of table B, which is an inversion of table MAP(I). Thus, as will be apparent, column J is essentially the reordered table MAP(I) and the actual table OUTABLE(J), consists of the values of I associated therewith from table A.

Figure 7D:
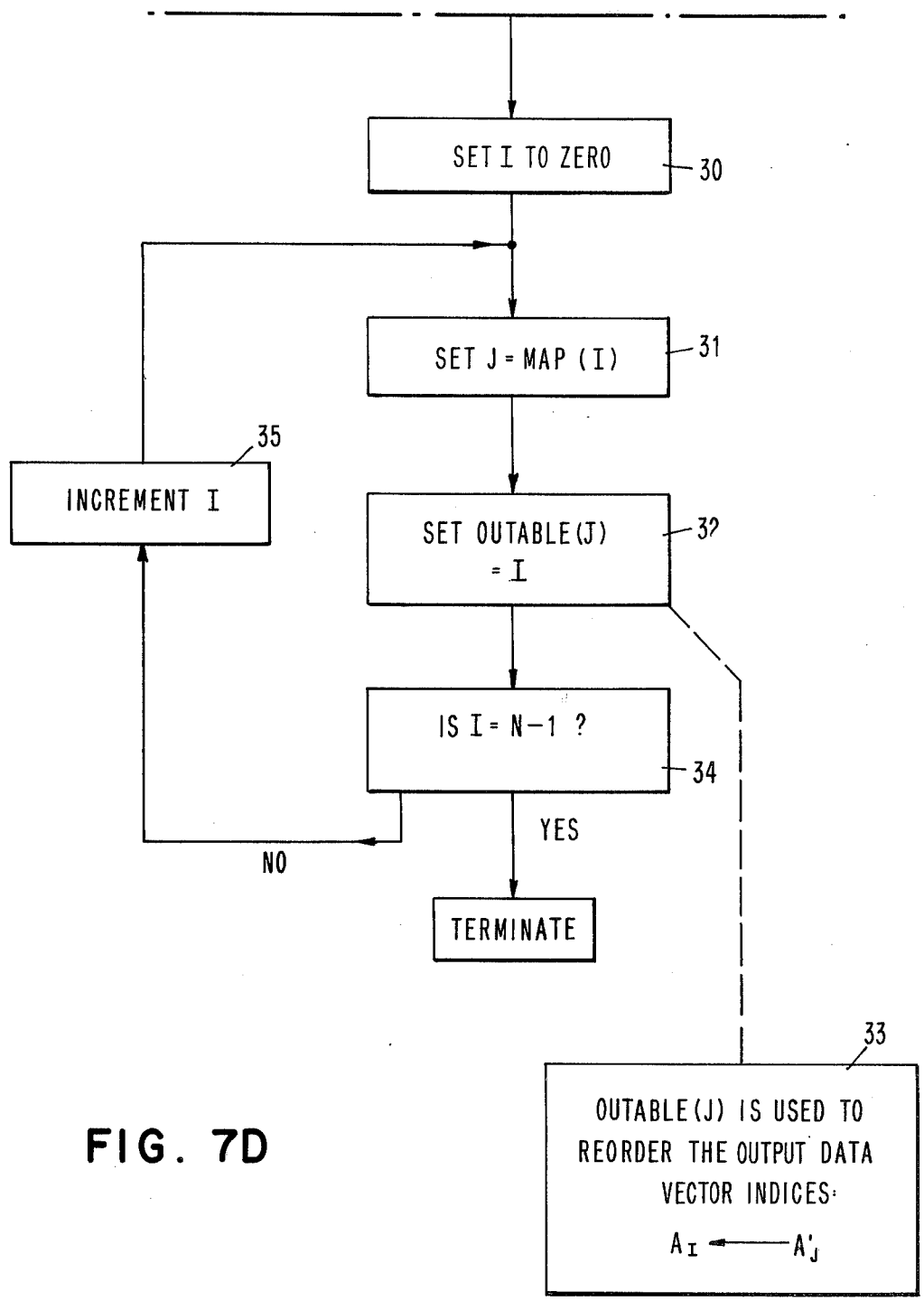

Referring now to that portion of the flow chart on FIG. 7D, beginning with block 30 in this block the index register I for the MAP(I) table is set to 0. The system then proceeds to block 31 wherein the index register J for the final output reordering table (OUTABLE J) is set to the value in the MAP(I) table at location I. Block 32 causes the OUTABLE location pointed to by index register J to be set to the value of I. Then in block 34 the current setting of the index register I is tested to see if all N entries in the MAP(I) table have been entered into the OUTABLE(J). If the answer is no, index register I is incremented in block 35 and the sequence of blocks 31, 32, 34 and 35 is repeated until the final OUTABLE(J) is constructed. Block 33 is merely an explanatory legend, indicating that it is the OUTABLE(J) which is the final product of this flow sequence utilized to reorder the output vector $A_J'$ into the desired vector $A_J$.

Thus, in this final step the OUTABLE(J) is constructed in piecemeal fashion as the system steps progressively through the MAP(I) table. The construction results are illustrated by the lines connecting the various entries in members A & B of the Inversion Table described previously. This completes the "generate output reordering table sequence" description.

| | | INVERSION TABLE | |
|---|---|---|---|
| I | MAP(I) | J | OUTABLE(J) |
| 0 | 3 | 0 | 4 |
| | | 1 | 2 |
| 1 | 4 | 2 | 3 |
| 2 | 1 | | |
| 3 | 2 | 3 | 0 |
| 4 | 0 | 4 | 1 |
| (A) | | | (B) |

Figures 8, 8A:
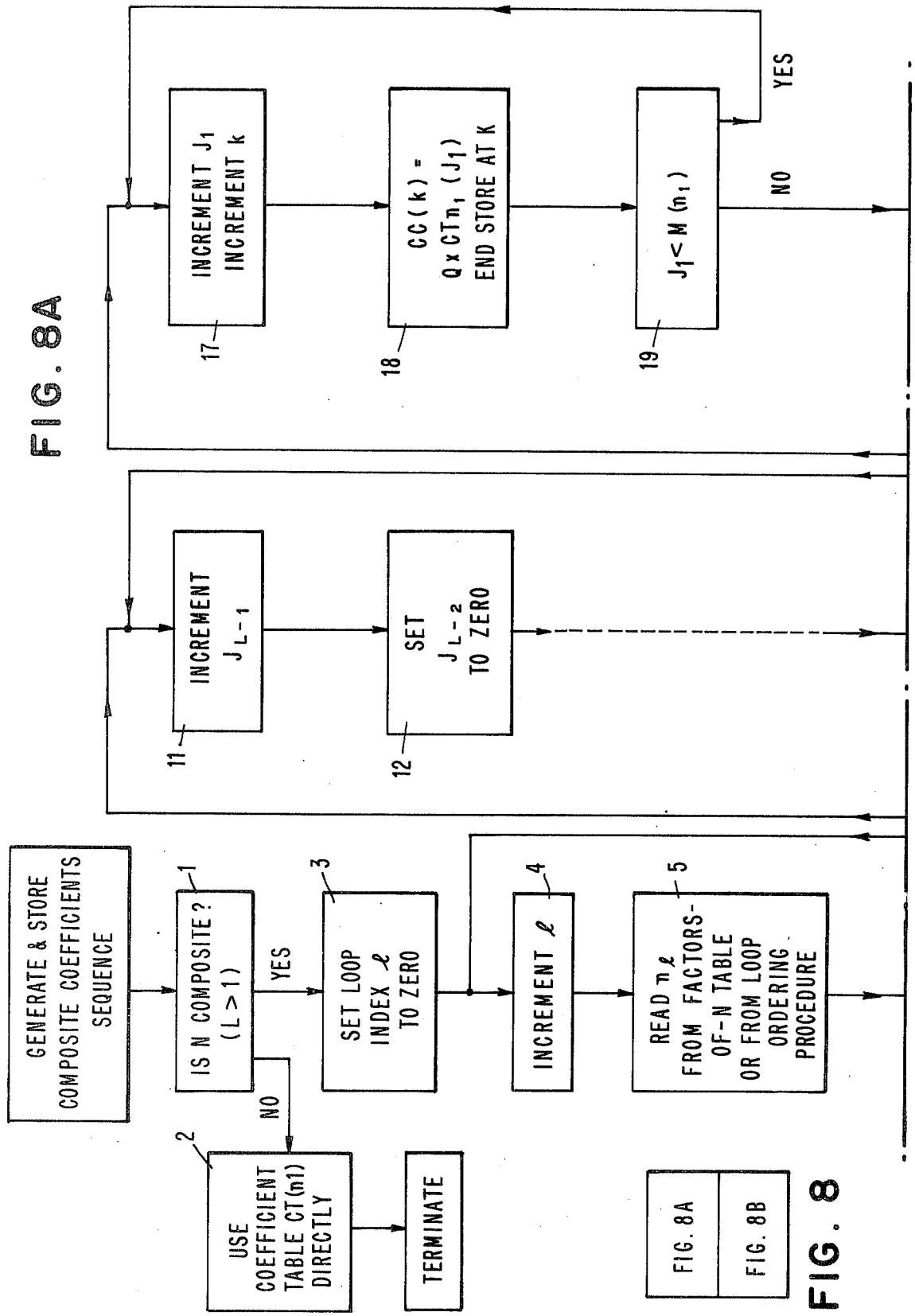
FIG. 8 comprises an organizational diagram for FIGS. 8A and 8B.
FIGS. 8A and 8B comprise a system flow chart illustrating the specific operations required in the 'Calculate and Store Composite Coefficients' block (5) of FIG. 4.
Figure 8B:
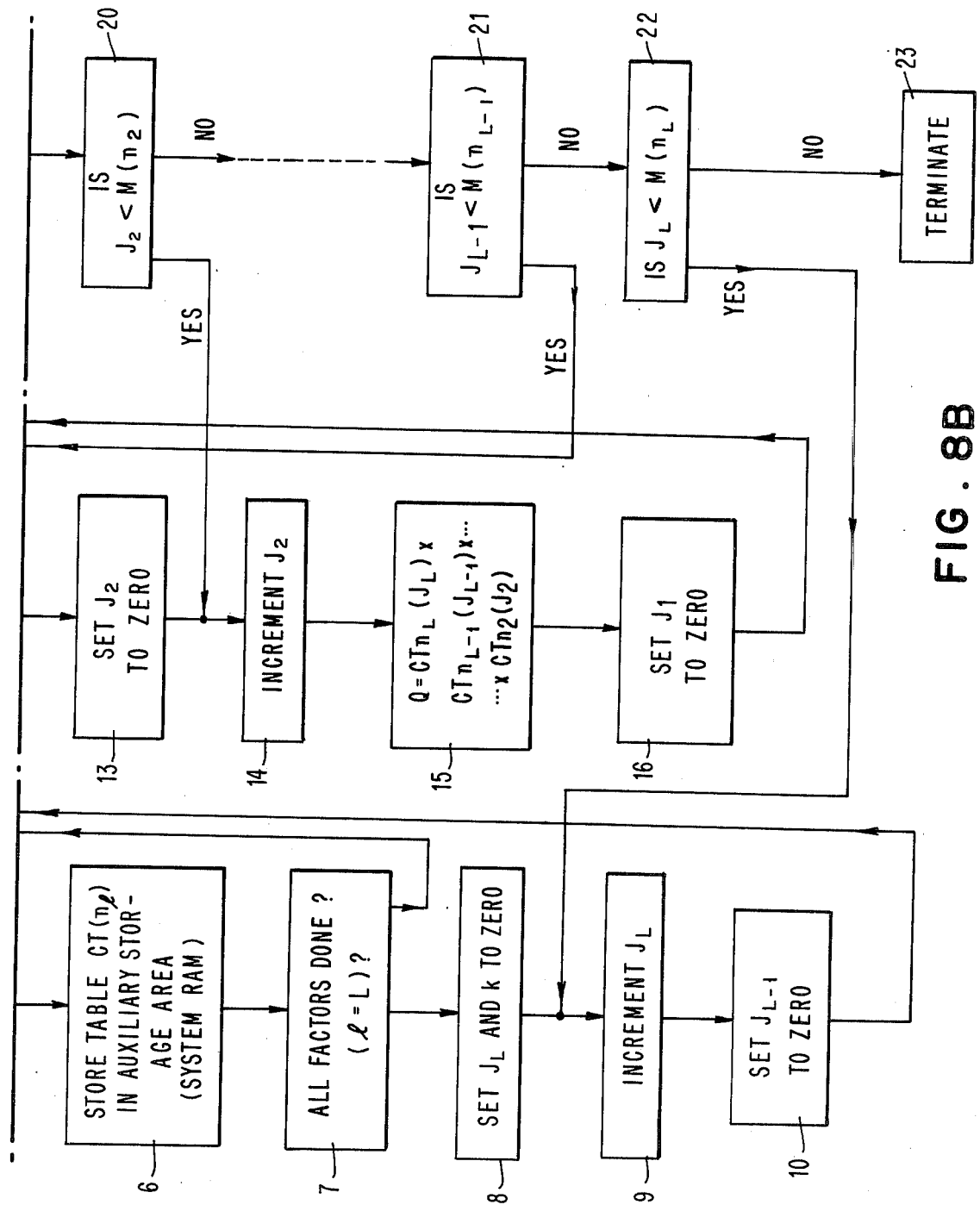

The FIGS. 8A and 8B comprise a flow chart specifying the operational sequences which must be performed in the present system to generate and store the composite coefficients. It will be remembered from the previous discussion that it is necessary to generate a composite coefficient for every real (scalar) multiply which occurs in the innermost loop. The total number of such multiplies is the product of the number of multiplies for each loop. This figure may be readily obtained by multiplying together the number of multiplies, $Mn_l$, $l = 1,2,\ldots,L$, which must be performed for each of the factors or loops making up the vector dimension N. In the outer loops, of course, these are merely pseudo multiplies,; however, their effect on the total number of multiplies remains the same. Thus, in the subsequent example for N=60 the outer loop (n=3) contains 3 pseudo multiplies, the outer loop (n=4) contains 4 pseudo multiplies, and the inner loop (n=5) contains 6 multiplies. Thus, multiplying these together one comes up with the figure 72, which is the number of composite coefficients which must be generated. The generation of the composite coefficients must be such that, as they are generated, they must be stored in memory in an orderly sequence so that they may be accessed serially as each new multiply operation in the inner loop is encountered. This is done conveniently by a lexical ordering or selection method coupled with multiplication whereby the coefficients for each of the loops is placed in a series of tables or lists, one member from each list or table will be involved in each composite coefficient generation operation until all combinations have been exhausted. This is the same selection method described in the input/output reordering table generation sequences described previously. Thus, for the initial operation, the first member of the first list, the first member of the second list and the first member of the third list are accessed and their product formed. For the second operation, the first member of the first list, the first member of the second list and the second member of the third list are multiplied. This process continues until all of the individual coefficients have been utilized in the multiplication scheme until the final multiplication involves the last member of the first list, the last member of second and the last member of the third list. This, as will be appreciated, provides the 72nd or last composite coefficient. It will also be remembered that the coefficient tables for each of the factors is stored in the coefficient table (CT) in the proper order. The resulting generated composite coefficients are stored in the System RAM and utilized during the evaluation operation to provide the desired transform multiplication coefficients.

Referring now specifically to the operational sequences as set forth in the figure this process proceeds as follows in the system. First a test is made in block 1 to see whether the value of N is composite. If it is not composite, i.e., only involves one factor, the coefficient table is quite simple and does not involve a composite coefficient generation and the appropriate table, $CT_n$, is transferred to the System RAM directly and the routine is terminated. This is done in block 2 of the figure. If on the other hand N is found to be composite, the system proceeds to block 3 where a loop index counter l is set to 0. In block 4 the system increments the loop index counter l by 1, which index is directly translated via the previously described loop ordering mechanism, to point to a particular factor, $n_l$, which operation is done in block 5.

The factor $n_l$ is utilized to address the coefficient table $CT_{n_l}$ in the System ROM and these coefficient values are placed in auxilary storage in the System RAM where they are utilized during subsequent operations. These operations are performed in block 6.

In block 7 a test is made to see if the coefficients for all factors have been evaluated. This is done by testing the setting of the loop index counter l against the value of the total number of loops involved in the evaluation (L). If the values are not equal, the system returns to block 4, where again the loop index counter is incremented and blocks 5, 6 and 7 are repeated until the coefficient tables for all factors have been stored appropriately into the auxilary storage area in the System RAM. Next the system proceeds to block 8.

In block 8 two counters are set to 0 which are utilized for accessing the coefficient table of the outermost loop and for storing the generated composite coefficients in the System RAM. These counters are designated as $J_L$ and k. As will be apparent, there are as many counters $J_l$ as there are loops. It is these counters which are used as address pointers together with the present system that allows the lexical stepping through the coefficient tables to produce the final list of composite coefficients. In block 9 counter $J_L$ is incremented and in block 10 counter $J_{L-1}$ is set to zero and it in turn is incremented in block 11. Blocks 11, 12, 13 and 14 similarly reset their respective counters to 0 and increment the same, down through counter $J_2$. The initial path through this section of operations comprises the initialization of the system which would be necessary to start the given composite coefficient generation sequence.

Block 15 generates a submultiple Q of all of the coefficients currently pointed to by the respective counters $J_l$ (except $J_1$). During this first or initialization phase, this product (Q) represents the product of the first member of each of the coefficient tables (CT). Next the system proceeds to the coefficient table for the inner loop $n_1$. To do this the counter for the addressing the coefficients of the inner loop ($J_1$) is set to 0 and the system then proceeds to block 17 where counter $J_1$ is incremented together with the composite coefficient index counter k. It will remembered at this point that this will be the first actual composite coefficient to be generated. The system then proceeds to block 18 where the multiplication of the coefficient pointed to by counter $J_1$ is performed with the previous quantity Q which was the subproduct or submultiple of the outer loop coefficients which was generated in block 15. The quantity so produced is stored in the composite coefficient table in the System RAM at the address pointed to by counter k. The system then proceeds to block 19 where a test of counter $J_1$ is made to see if all of the multiplies required of the inner loop (on this pass) have been performed. This is done by comparing the setting of the counter $J_1$ with the value $M(n_1)$, which is stored in the System ROM together with the coefficient tables for each of the permissible small-n factors. Depending upon the results of this test, the sequence of blocks 17, 18 and 19 is repeated until the inner loop is completed at which point the system will proceed to block 20. The test made in this block is essentially the same as that made in block 19 where the value of counter $J_2$ is compared against the value $M(n_2)$ which is the number of possible multiplies in the next to the innermost loop (l=2). Depending upon the results of this test, the system will proceed to block 21, or branch-back to block 14, which sequence includes blocks 14, 15 and 16, plus iterations of blocks 17, 18 and 19 which will cause the next to the innermost loop to be completely evaluated, and the appropriate composite coefficients generated. The broken line between blocks 20 and 21 and also 12 and 13 indicate that the structure and logic occurring within said blocks are essentially the same as for the block above and the block below and the details are left out for simplicity of explanation. In actuality the flow chart of FIG. 8 shows specific details for up to 4 loops. The dotted portion indicates that there could obviously be more following the same philosophy of operation. Blocks 21 and 22 perform essentially the same tasks, as blocks 19 and 20 and cause the system to branch-back and repeat their included loops until a successful negative test is made by the blocks. Finally with reference to block 22, when the setting of counter $J_L$ is no longer less than the value $M(n_L)$. This means that the complete coefficient table list for all loops has been processed and the requiste composite coefficients generated and the system branches to the terminate block 23.

In this way the complete set of composite coefficients is stored in the System RAM and is available for use during the evaluation or main procedure portion of the operation of the present system.

Referring now to FIG. 9, the operational sequences which occur within the system during the "calculate loop parameters" sequence will be set forth. It will be remembered that the function of this operational sequence is to compute the size of each of the outer loop vectors. The outer loop operational sequences must have this information as will be apparent in order to keep track of memory allocation and also the sequential accessing of vectors for the performance of the input and output adds (subtractions) as well as supplying the proper vectors on the inward loop transitions. Block 1 specifies that the first test which must be made is to determine if there is more than one loop in the current transform to be performed. If N comprises a single factor, the majority of the present system is non-functional, and the immediate inner loop solution for that particular factor is performed directly and the FIG. 9 operational sequence is bypassed.

Assume, however, that the value of L is some number greater than one, in this event the system proceeds to block 2, wherein a counter l is set equal to the value of L. L in this case is as stated above the number of loops to be performed in the transform. At the same time a counter R is set equal to the value of the vector dimension N. The system then proceeds to block 3. (more FIG. 9)

Block 3 causes the value for the particular loop designated by the current setting of the counter 1 to be utilized to access the loop ordering results from the loop ordering sequence stored in System RAM and the value of that particular factor is accessed. Proceeding to block 4 the arithmetic and logic unit is then caused to perform the division represented by the current reading of the counter R divided by the value of $n_l$ just accessed in block 3. Block 5 causes the results of block 4 to be stored in the System RAM as the vector dimension for the outer loop which has been designated herein as $N(n_L)$ VEC. Block 6 designates the mathematical relationship of the each of the vector dimensions arithmetically and shows how all of the vector dimensions are actually computed. It should be understood that this is merely an explanation and not an operational sequence as will be understood.

Block 7 causes the counter R to be set equal to the value of Q just obtained in block 4. The system then proceeds to block 8 where a test of the counter 1 is made. If it is currently set to a 2 it means that the innermost outer loop has been evaluated and since it is known that the innermost loop is scalar it is not necessary to compute the vectors for these inner loops and this causes the system to terminate. If on the other hand, 1 is not 2, (presumably some larger number,) the system will proceed to block 9 which causes the counter 1 to be decremented by 1. Blocks 3, 4, 5, 7 and 8, are sequentially repeated with the result that the vector value or dimensions of each of the outer loops is progressively computed until the next to the innermost loop has been evaluated, at which point the system will terminate. This data as explained previously is stored in the loop parameter's table, stored in the System RAM.

FIG. 10 is a flow chart of the operational sequences required to set up the control flow linkages of the system. This operational sequence selects a particular one or more outer loop control sequences, and the single inner loop sequence required and further sets up the link inward addresses ($LIL(n_2)$). The addresses of these respective operational sequences in the system control ROM of block 12 on FIG. 1 are extracted from a suitable table from the System Parameters ROM. These address values once selected are subsequently placed in the label table in the System RAM (FIG. 16) for use in the main procedure.

Figure 10A:
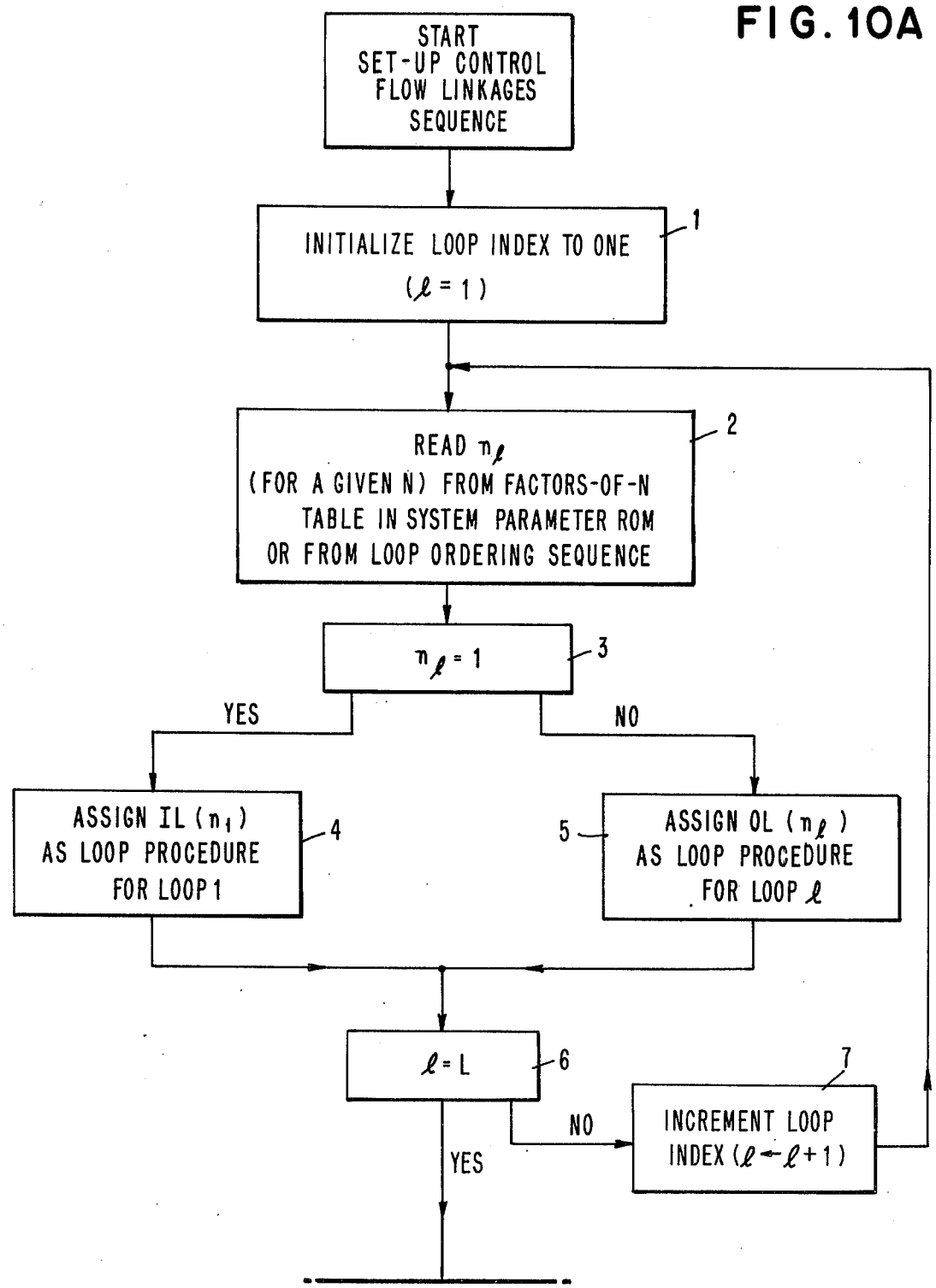

A portion of the flow chart on FIG. 10A relates to the sequences involved in obtaining the requisite outer loop and inner loop sequence addresses in the System Control ROM and that portion of the flow chart on FIG. 10B relates to those operations wherein the appropriate values are set in the label table for subsequent use in the main procedures portion.

Referring now to the flow chart, block 1, causes the loop index counter 1 to be set to a 1. Block 2 causes the value of the factor of loop 1 to be determined. In the case of real data this may be done from the factors of N table in the System Parameter ROM or in the case of complex data would be precomputed by the "loop ordering sequence" and this would be available in the System RAM. In block 3, a test of the setting of the loop index counter 1 is made. The current setting is 1, and this means that the innermost loop is being evaluated and accordingly the system branches to block 4 which in turn causes the address of the particular inner loop sequence for the just determined factor from block 2 to be placed in temporary store. If 1 had not been equal to 1, the system would have branched to block 5 wherein the starting address of the appropriate outer loop sequence ($OL(n_l)$) would be extracted for that particular loop and the system would continue to block 6, wherein a test is made to see if all loops have been evaluated. This is done by testing the current setting of the loop index counter L against the total value of L for the particular value of N. In case of a negative determination the system proceeds to block 7 which causes the loop index counter to be incremented and blocks 2, 3, 4, 5 and 6 are repeated until a positive result is obtained from block 6, at which point the system proceeds to block 8.

Block 8 causes the loop index counter to be again set to 1 and the system proceeds to block 9 (a determination is made to see if the current setting of the counter is 1). Again, this means that the inner loop is being evaluated. If this test is affirmative the system proceeds to block 10 and the previously obtained address for the inner loop sequence for the particular value of $n_1$ is stored in the System RAM as the link inward label ($LIL(n_2)$) for the loop $n_2$. The system automatically passes through block 11 which causes the loop index counter to be incremented and return to system to block 9 wherein the setting of this counter is again evaluated. This time assuming the negation, the system branches to block 12 where setting of the loop index counter is compared against the value L being evaluated. If this test is positive, the system proceeds to block 13, where the address of the outer loop procedure for the current setting of the loop index label 1 is stored as the loop inward label for the next outer loop, i.e., loop $n_{l+1}$. This procedure will then continue through blocks 11, 9, 12 and 13 until all of the lables are stored and a negative result is obtained in block 12. This will mean that the appropriate loop inward labels (LIL) have been derived and appropriately stored for the subsequent evaluation run. When this operation has been completed, the present sequence terminates and in the present embodiment the system is ready to proceed with the evaluation run.

To recapitulate the operations and the basic data flow which occurs during the "loop ordering sequences" and the "calculation of the composite coefficients." FIG. 11 is presented. This figure is a diagrammatic form of flow chart which shows not only the operational sequences but also the source and destination of data and other information used in said operational sequences. The left-most block (or column) specifies the initial source of data required in the various sequences. The middle column, block 2, represents the actual process steps occurring and their sequences and block 3 specifies where the data is stored in both intermediate or auxiliary storage and final storage in the System RAM.

When N is selected at the control panel, data are placed, for example, in working register WR0. Then proceeding to step two, the value N is stored in WR0 is used to address the Factors-of-N table in the System Parameters ROM. If the data are real, the actual ordering of these factors is placed in working registers WR1 through WRL or conversely, if complex data is involved, the system goes to the System Control ROM performs the loop ordering sequence stored therein, utilizing the value of N and the membership from the factors of N tables. The loop ordering so obtained is then placed in the working register WR1 through WRL in the computed order. These values of small-n are in turn utilized to address the small-n coefficient tables stored in the System Parmeters ROM and these are placed into auxilary storage in the System RAM as indicated in block 3. Next the system goes to the composite coefficient generation sequence stored in System Control ROM and utilizing the appropriately ranked coefficient table in auxilary storage in system RAM performs the "calculate table of composite coefficients" sequence and stores the resulting list composite coefficients in the composite coefficient table in the System RAM for subsequent use in the inner loop multiplication in the evaluation procedure.

While FIG. 11 is not complete for all of the initialization functions it clearly illustrates how the present system operates for a significant number of the initialization procedures insofar as clearly setting forth the storage areas where much of the data are stored, how these data are utilized, either as a pure addresses or as an address indices to access other data and, finally, how the final composite coefficients are calculated.

Immediately following are the complete set of operational sequence listings for each of the factors of N. It will be noted that the table is generally broken down into the outer loop operational sequences, abbreviated OL, and the inner loop operational sequences, abbreviated IL. It will be further noted that in the outer loop listings there is no OL sequences for the factor 9. This is because 9 will always be in the inner loop in any combination of factors for the reasons stated in the section describing the "loop ordering sequence".

It should also be noted that a specific operation sequence is not given for either the outer or inner loop for the factor 13 since this is the only factor which has not been exhaustively tested. However, it is believed that any one skilled in the art utilizing the teachings of the present invention as herein disclosed could easily prepare an operational sequence listing for the factor 13 by referring to the smaller algorithm for #13.

As a general observation it will be seen that the outer loop listings and the inner loop listings are quite similar and it will especially be noted that the operations are virtually identical for the input adds and the output adds. However, for the outer loop adds the subject of the adds are vectors rather than scalar quantities and certain address pointers must be set and utilized in performing the requisite adds on said vectors. In the inner loop listings these quantities are all scalars and only an initial pointer needs to be set which may be appropriately incremented to access the desired scalar quantities from the Data RAM.

Another general distinction between the inner loop and outer loop listings is the format of the multiplies. It will be remembered that in the outer loop listings, each multiply is considered a pseudo-multiply which is not a true multiply because it causes an inner loop transition. This requires that the pointer to the particular inner loop to which the system control is to transfer must be given. Pointers must be set to the proper data subvector to be transferred inwardly and the return point in the current loop must be indicated when the inner loop transition causes a branch-back into the particular outer loop operational sequence being performed.

Referring to the column marked Label, these are addresses in the ROM relating to the particular instruction in the sequences whose addresses are utilized for access proposed in subsequent operations. Again, in the inner loop sequences the only label or address utilized is the beginning address of the operational sequence whereas for the outer loop sequences not only the beginning label is shown but also the labels of all but the first pseudo-multiply. This allows return labels to be set so that the proper branch-back sequence may be followed as the system repeatedly branches outwardly.

```
SYSTEM CONTROL ROM LISTING: OL(2) PROCEDURE

STEP       LABEL       OPERATION

1          OL(2):      SET LOL(2)=RTNLAB

2                      PTR(X20)=PTR(A)
3                      PTR(X21)=PTR(A) +    N(2)VEC

4                      PTR(Y20)=PTR(B)
5                      PTR(Y21)=PTR(B) +    N(2)VEC

6                      SET INDEX J=0

7                      XX1(J)=X20(J) + X21(J)
8                      X21(J)=X20(J) - X21(J)
9                      X20(J)=XX1(J)

10                     IF J=N(2)VEC-1, GO TO STEP 11
11                     IF J<N(2)VEC-1, GO TO STEP 7

12                     POINT TO X20,Y20
13                     SET RTNLAB=L20 (STEP 15)
14                     GO TO LIL(2)

15         L20:        POINT TO X21,Y21
16                     SET RTNLAB=L21 (STEP 18)
17                     GO TO LIL(2)

18         L21:        GO TO LOL(2)
```

SYSTEM CONTROL ROM LISTING: OL(3) PROCEDURE

| STEP | LABEL | OPERATION |
|------|-------|-----------|
| 1 | OL(3): | SET LOL(3)=RTNLAB |
| 2 | | PTR(X30)=PTR(A) |
| 3 | | PTR(X31)=PTR(A) +   N(3)VEC |
| 4 | | PTR(X32)=PTR(A) + 2xN(3)VEC |
| 5 | | PTR(Y30)=PTR(B) |
| 6 | | PTR(Y31)=PTR(B) +   N(3)VEC |
| 7 | | PTR(Y32)=PTR(B) + 2xN(3)VEC |
| 8 | | SET INDEX J=0 |
| 9 | | XX1(J)=X31(J) + X32(J) |
| 10 | | X32(J)=X31(J) - X32(J) |
| 11 | | X31(J)=XX1(J) |
| 12 | | X30(J)=XX1(J) + X30(J) |
| 13 | | IF J=N(3)VEC-1, GO TO STEP 14 |
| | | IF J<N(3)VEC-1, GO TO STEP 9 |
| 14 | | POINT TO X30,Y30 |
| 15 | | SET RTNLAB=L30 (STEP 17) |
| 14 | | GO TO LIL(3) |
| 15 | L30: | POINT TO X31,Y31 |
| 16 | | SET RTNLAB=L31 (STEP 18) |
| 17 | | GO TO LIL(3) |
| 18 | L31: | POINT TO X32,Y32 |
| 19 | | SET RTNLAB=L32 (STEP 21) |
| 20 | | GO TO LIL(3) |
| 21 | L32: | SET INDEX J=0 |
| 22 | | YY1(J)=Y30(J) + Y31(J) |
| 23 | | Y31(J)=YY1(J) + Y32(J) |
| 25 | | Y32(J)=YY1(J) - Y32(J) |
| 26 | | IF J=N(3)VEC-1, GO TO STEP 27 |
| | | IF J<N(3)VEC-1, GO TO STEP 22 |
| 27 | | GO TO LOL(3) |

SYSTEM CONTROL ROM LISTING: OL(4) PROCEDURE

| STEP | LABEL | OPERATION |
|------|-------|-----------|
| 1 | OL(4): | SET LOL(4)=RTNLAB |
| 2 | | PTR(X40)=PTR(A) |
| 3 | | PTR(X41)=PTR(A) +   N(4)VEC |
| 4 | | PTR(X42)=PTR(A) + 2xN(4)VEC |
| 5 | | PTR(X43)=PTR(A) + 3xN(4)VEC |
| 6 | | PTR(Y40)=PTR(B) |
| 7 | | PTR(Y41)=PTR(B) +   N(4)VEC |
| 8 | | PTR(Y42)=PTR(B) + 2xN(4)VEC |
| 9 | | PTR(Y43)=PTR(B) + 3xN(4)VEC |
| 10 | | SET INDEX J=0 |
| 11 | | XX1(J)=X40(J) + X42(J) |
| 12 | | XX2(J)=X41(J) + X43(J) |
| 13 | | XX3(J)=X40(J) - X42(J) |
| 14 | | XX4(J)=X41(J) - X43(J) |
| 15 | | X40(J)=XX1(J) + XX2(J) |
| 16 | | X42(J)=XX1(J) - XX2(J) |
| 17 | | X41(J)=XX3(J) |
| 18 | | X43(J)=XX4(J) |

```
19              IF J=N(4)VEC-1, GO TO STEP 20
                IF J<N(4)VEC-1, GO TO STEP 11
20              POINT TO X40,Y40
21              SET RTNLAB=L40 (STEP 23)
22              GO TO LIL(4)

23     L40:     POINT TO X41,Y41
24              SET RTNLAB=L41 (STEP 26)
25              GO TO LIL(4)

26     L41:     POINT TO X42,Y42
27              SET RTNLAB=L42 (STEP 29)
28              GO TO LIL(4)

29     L42:     POINT TO X43,Y43
30              SET RTNLAB=L43 (STEP 32)
31              GO TO LIL(4)

32     L43:     SET INDEX J=0

33              YY1(J)=Y41(J) + Y43(J)
34              YY1(J)=Y41(J) - Y43(J)
35              Y41(J)=YY1(J)

36              IF J=N(4)VEC-1, GO TO STEP 37
                IF J<N(4)VEC-1, GO TO STEP 33

37              GO TO LOL(4)
```

SYSTEM CONTROL ROM LISTING: OL(5) PROCEDURE

```
STEP    LABEL    OPERATION

1       OL(5):   SET LOL(5)=RTNLAB

2                PTR(X50)=PTR(A)
3                PTR(X51)=PTR(A) +   N(5)VEC
4                PTR(X52)=PTR(A) + 2xN(5)VEC
5                PTR(X53)=PTR(A) + 3xN(5)VEC
6                PTR(X54)=PTR(A) + 4xN(5)VEC
7                PTR(X55)=PTR(A) + 5xN(5)VEC

8                PTR(Y50)=PTR(B)
9                PTR(Y51)=PTR(B) +   N(5)VEC
10               PTR(Y52)=PTR(B) + 2xN(5)VEC
11               PTR(Y53)=PTR(B) + 3xN(5)VEC
12               PTR(Y54)=PTR(B) + 4xN(5)VEC
13               PTR(Y55)=PTR(B) + 5xN(5)VEC

14               SET INDEX J=0

15               XX1(J)=X51(J) + X54(J)
16               XX2(J)=X51(J) + X53(J)
17               XX3(J)=X51(J) - X54(J)
18               XX4(J)=X53(J) - X52(J)
19               X51(J)=XX1(J) + XX2(J)
20               X52(J)=XX1(J) - XX2(J)
21               X50(J)=X50(J) + X51(J)
22               X53(J)=XX3(J) + XX4(J)
23               X54(J)=XX4(J)
24               X55(J)=XX3(J)

25               IF J=N(5)VEC-1, GO TO STEP 26
                 IF J<N(5)VEC-1, GO TO STEP 15

26               POINT TO X50,Y50
27               SET RTNLAB=L50 (STEP 29)
28               GO TO LIL(5)

29      L50:     POINT TO X51,Y51
30               SET RTNLAB=L51 (STEP 32)
31               GO TO LIL(5)
```

```
32      L51:    POINT TO X52,Y52
33              SET RTNLAB=L52 (STEP 35)
34              GO TO LIL(5)

35      L52:    POINT TO X53,Y53
36              SET RTNLAB=L53 (STEP 38)
37              GO TO LIL(5)

38      L53:    POINT TO X54,Y54
39              SET RTNLAB=L54 (STEP 41)
40              GO TO LIL(5)

41      L54:    POINT TO X55,Y55
42              SET RTNLAB=L55 (STEP 44)
43              GO TO LIL(5)

44      L55:    SET INDEX J=0

45              Y50(J)=X50(J)
46              YY1(J)=X50(J) + X51(J)
47              YY2(J)=YY1(J) + X52(J)
48              YY4(J)=YY1(J) - X52(J)
49              YY3(J)=X53(J) - X54(J)
50              YY5(J)=X53(J) + X55(J)
51              Y51(J)=YY2(J) + YY3(J)
52              Y54(J)=YY2(J) - YY3(J)
53              Y52(J)=YY4(J) + YY5(J)
54              Y53(J)=YY4(J) - YY5(J)

55              IF J=N(5)VEC-1, GO TO STEP 56
                IF J<N(5)VEC-1, GO TO STEP 45

56              GO TO LOL(5)
```

SYSTEM CONTROL ROM LISTING: OL(7) PROCEDURE

```
STEP    LABEL   OPERATION

1       OL(7):  SET LOL(7)=RTNLAB

2               PTR(X70)=PTR(A)
3               PTR(X71)=PTR(A) +   N(7)VEC
4               PTR(X72)=PTR(A) + 2xN(7)VEC
5               PTR(X73)=PTR(A) + 3xN(7)VEC
6               PTR(X74)=PTR(A) + 4xN(7)VEC
7               PTR(X75)=PTR(A) + 5xN(7)VEC
8               PTR(X76)=PTR(A) + 6xN(7)VEC
9               PTR(X77)=PTR(A) + 7xN(7)VEC
10              PTR(X78)=PTR(A) + 8xN(7)VEC

11              PTR(Y70)=PTR(B)
12              PTR(Y71)=PTR(B) +   N(7)VEC
13              PTR(Y72)=PTR(B) + 2xN(7)VEC
14              PTR(Y73)=PTR(B) + 3xN(7)VEC
15              PTR(Y74)=PTR(B) + 4xN(7)VEC
16              PTR(Y75)=PTR(B) + 5xN(7)VEC
17              PTR(Y76)=PTR(B) + 6xN(7)VEC
18              PTR(Y77)=PTR(B) + 7xN(7)VEC
19              PTR(Y78)=PTR(B) + 8xN(7)VEC

20              SET INDEX J=0

21              XX1(J)=X71(J) + X76(J)
22              XX2(J)=X72(J) + X75(J)
23              XX3(J)=X73(J) + X74(J)
24              XX4(J)=X71(J) - X76(J)
25              XX5(J)=X72(J) - X75(J)
26              XX6(J)=X74(J) - X73(J)
27              X71(J)=XX1(J) + XX2(J) + XX3(J)
28              X70(J)=X70(J) + X71(J)
29              X72(J)=XX1(J) - XX3(J)
30              X73(J)=XX3(J) - XX2(J)
31              X74(J)=XX2(J) - XX1(J)
```

| | | |
|---|---|---|
| 32 | | X75(J)=XX4(J) + XX5(J) + XX6(J) |
| 33 | | X76(J)=XX4(J) - XX6(J) |
| 34 | | X77(J)=XX6(J) - XX5(J) |
| 35 | | X78(J)=XX5(J) - XX4(J) |
| 36 | | IF J=N(7)VEC-1, GO TO STEP 37 |
| | | IF J<N(7)VEC-1, GO TO STEP 21 |
| 37 | | POINT TO X70,Y70 |
| 38 | | SET RTNLAB=L70 (STEP 40) |
| 39 | | GO TO LIL(7) |
| 40 | L70: | POINT TO X71,Y71 |
| 41 | | SET RTNLAB=L71 (STEP 43) |
| 42 | | GO TO LIL(7) |
| 43 | L71: | POINT TO X72,Y72 |
| 44 | | SET RTNLAB=L72 (STEP 46) |
| 45 | | GO TO LIL(7) |
| 46 | L72: | POINT TO X73,Y73 |
| 47 | | SET RTNLAB=L73 (STEP 49) |
| 48 | | GO TO LIL(7) |
| 49 | L73: | POINT TO X74,Y74 |
| 50 | | SET RTNLAB=L74 (STEP 52) |
| 51 | | GO TO LIL(7) |
| 52 | L74: | POINT TO X75,Y75 |
| 53 | | SET RTNLAB=L75 (STEP 55) |
| 54 | | GO TO LIL(7) |
| 55 | L75: | POINT TO X76,Y76 |
| 56 | | SET RTNLAB=L76 (STEP 58) |
| 57 | | GO TO LIL(7) |
| 58 | L76: | POINT TO X77,Y77 |
| 59 | | SET RTNLAB=L77 (STEP 61) |
| 60 | | GO TO LIL(7) |
| 61 | L77: | POINT TO X78,Y78 |
| 62 | | SET RTNLAB=L78 (STEP 64) |
| 63 | | GO TO LIL(7) |
| 64 | L78: | SET INDEX J=0 |
| 65 | | YY1(J)=Y70(J) + Y71(J) |
| 66 | | YY2(J)=YY1(J) + Y72(J) + Y73(J) |
| 67 | | YY3(J)=YY1(J) - Y72(J) - Y74(J) |
| 68 | | YY4(J)=YY1(J) - Y73(J) + Y74(J) |
| 69 | | YY5(J)=Y75(J) + Y76(J) + Y77(J) |
| 70 | | YY6(J)=Y75(J) - Y76(J) - Y78(J) |
| 71 | | YY7(J)=Y75(J) - Y77(J) + Y78(J) |
| 72 | | Y71(J)=YY2(J) + YY5(J) |
| 73 | | Y72(J)=YY3(J) + YY6J) |
| 74 | | Y73(J)=YY4(J) - YY7(J) |
| 75 | | Y74(J)=YY4(J) + YY7(J) |
| 76 | | Y75(J)=YY3(J) - YY6(J) |
| 77 | | Y76(J)=YY2(J) - YY5(J) |
| 78 | | IF J=N(7)VEC-1, GO TO STEP 79 |
| | | IF J<N(7)VEC-1, GO TO STEP 65 |
| 79 | | GO TO LOL(7) |

SYSTEM CONTROL ROM LISTING: OL(8) PROCEDURE

| STEP | LABEL | OPERATION |
|---|---|---|
| 1 | OL(8): | SET LOL(8)=RTNLAB |
| 2 | | PTR(X80)=PTR(A) |
| 3 | | PTR(X81)=PTR(A) +   N(8)VEC |

```
4       PTR(X82)=PTR(A) + 2xN(8)VEC
5       PTR(X83)=PTR(A) + 3xN(8)VEC
6       PTR(X84)=PTR(A) + 4xN(8)VEC
7       PTR(X85)=PTR(A) + 5xN(8)VEC
8       PTR(X86)=PTR(A) + 6xN(8)VEC
9       PTR(X87)=PTR(A) + 7xN(8)VEC

10      PTR(Y80)=PTR(B)
11      PTR(Y81)=PTR(B) +   N(8)VEC
12      PTR(Y82)=PTR(B) + 2xN(8)VEC
13      PTR(Y83)=PTR(B) + 3xN(8)VEC
14      PTR(Y84)=PTR(B) + 4xN(8)VEC
15      PTR(Y85)=PTR(B) + 5xN(8)VEC
16      PTR(Y86)=PTR(B) + 6xN(8)VEC
17      PTR(Y87)=PTR(B) + 7xN(8)VEC

18      SET INDEX J=0

19      XX1(J)=X80(J) + X84(J)
20      XX2(J)=X82(J) + X86(J)
21      XX3(J)=X81(J) + X85(J)
22      XX4(J)=X81(J) - X85(J)
23      XX5(J)=X83(J) + X87(J)
24      XX6(J)=X83(J) - X87(J)
25      XX7(J)=XX1(J) + XX2(J)
26      XX8(J)=XX31(J) + XX5(J)
27      X83(J)=X80(J) - X84(J)
28      X86(J)=X82(J) - X86(J)
29      X80(J)=XX7(J) + XX8(J)
30      X81(J)=XX7(J) - XX8(J)
31      X82(J)=XX1(J) - XX2(J)
32      X84(J)=XX4(J) - XX6(J)
33      X85(J)=XX3(J) - XX5(J)
34      X87(J)=XX4(J) + XX6(J)

35      IF J=N(8)VEC-1, GO TO STEP 36
        IF J N(8)VEC-1, GO TO STEP 19

36      POINT TO X80,Y80
37      SET RTNLAB=L80 (STEP 39)
38      GO TO LIL(8)

39  L80:    POINT TO X81,Y81
40          SET RTNLAB=L81 (STEP 42)
41          GO TO LIL(8)

42  L81:    POINT TO X82,Y82
43          SET RTNLAB=L82 (STEP 45)
44          GO TO LIL(8)

45  L82:    POINT TO X83,Y83
46          SET RTNLAB=L83 (STEP 48)
47          GO TO LIL(8)

48  L83:    POINT TO X84,Y84
49          SET RTNLAB=L84 (STEP 51)
50          GO TO LIL(8)

51  L84:    POINT TO X85,Y85
52          SET RTNLAB=L85 (STEP 54)
53          GO TO LIL(8)

54  L85:    POINT TO X86,Y86
55          SET RTNLAB=L86 (STEP 57)
56          GO TO LIL(8)

57  L86:    POINT TO X87,Y87
58          SET RTNLAB=L87 (STEP 60)
59          GO TO LIL(8)

60  L87:    POINT TO X88,Y88
61          SET RTNLAB=L88 (STEP 65)
64          GO TO LIL(8)

65  L88:    SET INDEX J=0
```

| | | |
|---|---|---|
| 66 | | YY1(J)=Y83(J) + Y84(J) |
| 67 | | YY2(J)=Y83(J) - Y84(J) |
| 68 | | YY3(J)=Y86(J) + Y87(J) |
| 69 | | YY4(J)=Y86(J) - Y87(J) |
| 70 | | Y84(J)=Y81(J) |
| 71 | | YY5(J)=Y82(J) |
| 72 | | Y82(J)=YY5(J) + Y85(J) |
| 73 | | Y86(J)=YY5(J) - Y85(J) |
| 74 | | Y81(J)=YY1(J) + YY3(J) |
| 75 | | Y83(J)=YY2(J) - YY4(J) |
| 76 | | Y85(J)=YY2(J) + YY4(J) |
| 77 | | Y87(J)=YY1(J) - YY3(J) |
| 78 | | IF J=N(8)VEC-1, GO TO STEP 79 |
| | | IF J<N(8)VEC-1, GO TO STEP 66 |
| 79 | | GO TO LOL(8) |

SYSTEM CONTROL ROM LISTING: OL(16) PROCEDURE

| STEP | LABEL | OPERATION |
|---|---|---|
| 1 | OL(16): | SET LOL(16)=RTNLAB |
| 2 | | PTR(X160)=PTR(A) |
| 3 | | PTR(X161)=PTR(A) +  N(16)VEC |
| 4 | | PTR(X162)=PTR(A) + 2xN(16)VEC |
| 5 | | PTR(X163)=PTR(A) + 3xN(16)VEC |
| 6 | | PTR(X164)=PTR(A) + 4xN(16)VEC |
| 7 | | PTR(X165)=PTR(A) + 5xN(16)VEC |
| 8 | | PTR(X166)=PTR(A) + 6xN(16)VEC |
| 9 | | PTR(X167)=PTR(A) + 7xN(16)VEC |
| 10 | | PTR(X168)=PTR(A) + 8xN(16)VEC |
| 11 | | PTR(X169)=PTR(A) + 9xN(16)VEC |
| 12 | | PTR(X1610)=PTR(A) + 10xN(16)VEC |
| 13 | | PTR(X1611)=PTR(A) + 11xN(16)VEC |
| 14 | | PTR(X1612)=PTR(A) + 12xN(16)VEC |
| 15 | | PTR(X1613)=PTR(A) + 13xN(16)VEC |
| 16 | | PTR(X1614)=PTR(A) + 14xN(16)VEC |
| 17 | | PTR(X1615)=PTR(A) + 15xN(16)VEC |
| 18 | | PTR(X1616)=PTR(A) + 16xN(16)VEC |
| 19 | | PTR(X1617)=PTR(A) + 17xN(16)VEC |
| 20 | | PTR(Y160)=PTR(B) |
| 21 | | PTR(Y161)=PTR(B) +  N(16)VEC |
| 22 | | PTR(Y162)=PTR(B) + 2xN(16)VEC |
| 23 | | PTR(Y163)=PTR(B) + 3xN(16)VEC |
| 24 | | PTR(Y164)=PTR(B) + 4xN(16)VEC |
| 25 | | PTR(Y165)=PTR(B) + 5xN(16)VEC |
| 26 | | PTR(Y166)=PTR(B) + 6xN(16)VEC |
| 27 | | PTR(Y167)=PTR(B) + 7xN(16)VEC |
| 28 | | PTR(Y168)=PTR(B) + 8xN(16)VEC |
| 29 | | PTR(Y169)=PTR(B) + 9xN(16)VEC |
| 30 | | PTR(Y1610)=PTR(B) + 10xN(16)VEC |
| 31 | | PTR(Y1611)=PTR(B) + 11xN(16)VEC |
| 32 | | PTR(Y1612)=PTR(B) + 12xN(16)VEC |
| 33 | | PTR(Y1613)=PTR(B) + 13xN(16)VEC |
| 34 | | PTR(Y1614)=PTR(B) + 14xN(16)VEC |
| 35 | | PTR(Y1615)=PTR(B) + 15xN(16)VEC |
| 36 | | PTR(Y1616)=PTR(B) + 16xN(16)VEC |
| 37 | | PTR(Y1617)=PTR(B) + 17xN(16)VEC |
| 38 | | SET INDEX J=0 |
| 39 | | XX1(J)=X160(J) + X168(J) |
| 40 | | XX2(J)=X164(J) + X1612(J) |
| 41 | | XX3(J)=X162(J) + X1610(J) |
| 42 | | XX4(J)=X162(J) - X1610(J) |
| 43 | | XX5(J)=X166(J) + X1614(J) |
| 44 | | XX6(J)=X166(J) - X1614(J) |
| 45 | | XX7(J)=X161(J) + X169(J) |
| 46 | | XX8(J)=X161(J) - X169(J) |

```
47            XX9(J)=X163(J) + X1611(J)
48            XX10(J)=X163(J) - X1611(J)
49            XX11(J)=X165(J) + X1613(J)
50            XX12(J)=X165(J) - X1613(J)
51            XX13(J)=X167(J) + X1615(J)
52            XX14(J)=X167(J) - X1615(J)
53            XX15(J)=XX1(J) + XX2(J)
54            XX16(J)=XX3(J) + XX5(J)
55            XX17(J)=XX15(J) + XX16(J)
56            XX18(J)=XX7(J) + XX11(J)
57            XX19(J)=XX7(J) - XX11(J)
58            XX20(J)=XX9(J) + XX13(J)
59            XX21(J)=XX9(J) - XX13(J)
60            XX22(J)=XX18(J) + XX20(J)
61            XX23(J)=XX8(J) + XX14(J)
62            XX24(J)=XX8(J) - XX14(J)
63            XX25(J)=XX12(J) + XX10(J)
64            XX26(J)=XX12(J) - XX10(J)
65            X165(J)=X160(J) - X168(J)
66            X1613(J)=X164(J) - X1612(J)
67            X160(J)=XX17(J) + XX22(J)
68            X161(J)=XX17(J) - XX22(J)
69            X162(J)=XX15(J) - XX16(J)
70            X163(J)=XX1(J) - XX2(J)
71            X164(J)=XX19(J) - XX21(J)
72            X166(J)=XX4(J) - XX6(J)
73            X167(J)=XX24(J) - XX26(J)
74            X168(J)=XX24(J)
75            X169(J)=XX26(J)
76            X1610(J)=XX18(J) - XX20(J)
77            X1611(J)=XX3(J) - XX5(J)
78            X1612(J)=XX19(J) - XX21(J)
79            X1614(J)=XX4(J) + XX6(J)
80            X1615(J)=XX23(J) + XX25(J)
81            X1616(J)=XX23(J)
82            X1617(J)=XX25(J)

83            IF J=N(16)VEC-1, GO TO STEP 84
              IF J<N(16)VEC-1, GO TO STEP 39

84            POINT TO X160,Y160
85            SET RTNLAB=L160 (STEP 87)
86            GO TO LIL(16)

87    L160:   POINT TO X161,Y161
88            SET RTNLAB=L161 (STEP 90)
89            GO TO LIL(16)

90    L161:   POINT TO X162,Y162
91            SET RTNLAB=L162 (STEP 93)
92            GO TO LIL(16)

93    L162:   POINT TO X163,Y163
94            SET RTNLAB=L163 (STEP 96)
94            GO TO LIL(16)

96    L163:   POINT TO X164,Y164
97            SET RTNLAB=L164 (STEP 99)
98            GO TO LIL(16)

99    L164:   POINT TO X165,Y165
100           SET RTNLAB=L165 (STEP 102)
101           GO TO LIL(16)

102   L165:   POINT TO X166,Y166
103           SET RTNLAB=L166 (STEP 105)
104           GO TO LIL(16)

105   L166:   POINT TO X167,Y167
106           SET RTNLAB=L167 (STEP 108)
107           GO TO LIL(16)

108   L167:   POINT TO X168,Y168
109           SET RTNLAB=L168 (STEP 111)
110           GO TO LIL(16)
```

| | | |
|---|---|---|
| 111 | L168: | POINT TO X169,Y169 |
| 112 | | SET RTNLAB=L169 (STEP 114) |
| 113 | | GO TO LIL(16) |
| 114 | L169: | POINT TO X1610,Y1610 |
| 115 | | SET RTNLAB=L1610 (STEP 117) |
| 116 | | GO TO LIL(16) |
| 117 | L1610: | POINT TO X1611,Y1611 |
| 118 | | SET RTNLAB=L1611 (STEP 120) |
| 119 | | GO TO LIL(16) |
| 120 | L1611: | POINT TO X1612,Y1612 |
| 121 | | SET RTNLAB=L1612 (STEP 123) |
| 122 | | GO TO LIL(16) |
| 123 | L1612: | POINT TO X1613,Y1613 |
| 124 | | SET RTNLAB=L1613 (STEP 126) |
| 125 | | GO TO LIL(16) |
| 126 | L1613: | POINT TO X1614,Y1614 |
| 127 | | SET RTNLAB=L1614 (STEP 129) |
| 128 | | GO TO LIL(16) |
| 129 | L1614: | POINT TO X1615,Y1615 |
| 130 | | SET RTNLAB=L1615 (STEP 132) |
| 131 | | GO TO IIL(16) |
| 132 | L1615: | POINT TO X1616,Y1616 |
| 133 | | SET RTNLAB=L1616 (STEP 135) |
| 134 | | GO TO LIL(16) |
| 135 | L1616: | POINT TO X1617,Y1617 |
| 136 | | SET RTNLAB=L1617 (STEP 138) |
| 137 | | GO TO LIL(16) |
| 138 | L1617: | SET INDEX J=0 |
| 139 | | YY1(J)=Y163(J) + Y164(J) |
| 140 | | YY2(J)=Y163(J) - Y164(J) |
| 141 | | YY3(J)=Y1611(J) + Y1612(J) |
| 142 | | YY4(J)=Y1612(J) - Y1611(J) |
| 143 | | YY5(J)=Y165(J) + Y166(J) |
| 144 | | YY6(J)=Y165(J) - Y166(J) |
| 145 | | YY7(J)=Y168(J) - Y167(J) |
| 146 | | YY8(J)=Y169(J) - Y167(J) |
| 147 | | YY9(J)=YY5(J) +   7(J) |
| 148 | | YY10(J)=YY5(J) - YY7(J) |
| 149 | | YY11(J)=YY6(J) + YY8(J) |
| 150 | | YY12(J)=YY6(J) - YY8(J) |
| 151 | | YY13(J)=Y1613(J) + Y1614(J) |
| 152 | | YY14(J)=Y1613(J) - Y1614(J) |
| 153 | | YY15(J)-Y1615(J) + Y1616(J) |
| 154 | | YY16(J)=Y1615(J) - Y1616(J) |
| 155 | | YY17(J)=YY13(J) + YY15(J) |
| 156 | | YY18(J)=YY13(J) - YY15(J) |
| 157 | | YY19(J)=YY14(J) + YY16(J) |
| 158 | | YY20(J)=YY14(J) - YY16(J) |
| 159 | | Y164(J)=Y162(J) + Y1610(J) |
| 160 | | Y168(J)=Y161(J) |
| 161 | | Y1612(J)=Y162(J) - Y1610(J) |
| 162 | | Y161(J)-YY9(J) + YY17(J) |
| 163 | | Y162(J)=YY1(J) + YY3(J) |
| 164 | | Y163(J)=YY12(J) - YY20(J) |
| 165 | | Y165(J)=Y 11(J) + YY19(J) |
| 166 | | Y166(J)=YY2(J) + YY4(J) |
| 167 | | Y167(J)=YY10(J) - YY18(J) |
| 168 | | Y169(J)=YY10(J) + YY18(J) |
| 169 | | Y1610(J)=YY2(J) - YY4(J) |
| 170 | | Y1611(J)=YY11(J) - YY19(J) |
| 171 | | Y1613(J)=YY12(J) + YY20(J) |
| 172 | | Y1614(J)=YY1(J) - YY3(J) |
| 173 | | Y1615(J)=YY9(J) - YY17(J) |
| 174 | | IF J=N(16)VEC-1, GO TO STEP 175 |
| | | IF J<N(16)VEC-1, GO TO STEP 139 |
| 175 | | GO TO LOL(16) |

SYSTEM CONTROL ROM LISTING: IL(2) PROCEDURE

| STEP | LABEL | OPERATION |
|---|---|---|
| 1 | IL(2): | PTR(X20)=PTR(A) |
| 2 | | PTR(X21)=PTR(A) + 1 |
| 3 | | PTR(Y20)=PTR(B) |
| 4 | | PTR(Y21)=PTR(B) + 1 |
| 5 | | F(0)=X20 + X21 |
| 6 | | F(1)=X20 - X21 |
| 7 | | P(0)=CC(k)xF(0) |
| 8 | | INCREMENT k |
| 9 | | P(1)=CC(k)xF(1) |
| 10 | | INCREMENT k |
| 11 | | Y20=P(0) |
| 12 | | Y21=P(1) |
| 13 | | GO TO RTNLAB |

SYSTEM CONTROL ROM LISTING: IL(3) PROCEDURE

| STEP | LABEL | OPERATION |
|---|---|---|
| 1 | IL(3): | PTR(X30)=PTR(A) |
| 2 | | PTR(X31)=PTR(A) + 1 |
| 3 | | PTR(X32)=PTR(A) + 2 |
| 4 | | PTR(Y30)=PTR(B) |
| 5 | | PTR(Y31)=PTR(B) + 1 |
| 6 | | PTR(Y32)=PTR(B) + 2 |
| 7 | | F(1)=X31 + X32 |
| 8 | | F(0)=X30 + F(1) |
| 9 | | F(2)=X31 - X32 |
| 10 | | SET INDEX J=0 |
| 11 | | P(J)=CC(k)xF(J) |
| 12 | | INCREMENT k |
| 13 | | INCREMENT J |
| 14 | | IF J<3, GO TO STEP 11 |
| | | IF J=3, GO TO STEP 15 |
| 15 | | YY1=P(0) + P(1) |
| 16 | | Y30=P(0) |
| 17 | | Y31=YY1 + P(2) |
| 18 | | Y33=P(2) - P(3) |
| 19 | | GO TO RTNLAB |

SYSTEM CONTROL ROM LISTING: IL(4) PROCEDURE

| STEP | LABEL | OPERATION |
|---|---|---|
| 1 | IL(4): | PTR(X40)=PTR(A) |
| 2 | | PTR(X41)=PTR(A) + 1 |
| 3 | | PTR(X42)=PTR(A) + 2 |
| 4 | | PTR(X43)=PTR(A) + 3 |

| STEP | LABEL | OPERATION |
|---|---|---|
| 5 | | PTR(Y40)=PTR(B) |
| 6 | | PTR(Y41)=PTR(B) + 1 |
| 7 | | PTR(Y42)=PTR(B) + 2 |
| 8 | | PTR(Y43)=PTR(B) + 3 |
| 9 | | XX1=X40 + X42 |
| 10 | | XX2=X41 + X43 |
| 11 | | F(0)=XX1 + XX2 |
| 12 | | F(1)=XX1 - XX2 |
| 13 | | F(2)=X40 - X42 |
| 14 | | F(3)=X41 - X43 |
| 15 | | SET INDEX J=0 |
| 16 | | P(J)=CC(k)xF(J) |
| 17 | | INCREMENT k |
| 18 | | INCREMENT J |
| 19 | | IF J<4, GO TO STEP 16 |
| | | IF J=4, GO TO STEP 20 |
| 20 | | Y40=P(0) |
| 21 | | Y41=P(2) +P(3) |
| 22 | | Y42=P(1) |
| 23 | | Y43=P(2) - P(3) |
| 24 | | GO TO RTNLAB |

SYSTEM CONTROL ROM LISTING: IL(5) PROCEDURE

| STEP | LABEL | OPERATION |
|---|---|---|
| 1 | | PTR(X50)=PTR(A) |
| 2 | | PTR(X51)=PTR(A) + 1 |
| 3 | | PTR(X52)=PTR(A) + 2 |
| 4 | | PTR(X53)=PTR(A) + 3 |
| 5 | | PTR(X54)=PTR(A) + 4 |
| 6 | | PTR(Y50)=PTR(B) |
| 7 | | PTR(Y51)=PTR(B) + 1 |
| 8 | | PTR(Y52)=PTR(B) + 2 |
| 9 | | PTR(Y53)=PTR(B) + 3 |
| 10 | | PTR(Y54)=PTR(B) + 4 |
| 11 | | XX1=X51 + X54 |
| 12 | | XX2=X52 + X53 |
| 13 | | F(5)=X51 - X54 |
| 14 | | F(4)=X53 - X52 |
| 15 | | F(1)=XX1 + XX2 |
| 16 | | F(0)=X50 + F(1) |
| 17 | | F(2)=XX1 - XX2 |
| 18 | | F(3)=F(5) + F(4) |
| 19 | | SET INDEX J=0 |
| 20 | | P(J)=CC(k)xF(J) |
| 21 | | INCREMENT k |
| 22 | | INCREMENT J |
| 23 | | IF J<6, GO TO STEP 20 |
| | | IF J=6, GO TO STEP 24 |
| 24 | | YY1=P(0) + P(1) |
| 25 | | YY2=YY1 + P(2) |
| 26 | | YY3=P(3) - P(2) |
| 27 | | YY4=YY1 - P(2) |

| | | |
|---|---|---|
| 28 | | YY5=P(3) + P(5) |
| 29 | | Y50=P(0) |
| 30 | | Y51=YY2 + YY3 |
| 31 | | Y52=YY4 + YY5 |
| 32 | | Y53=YY4 - YY5 |
| 33 | | Y54=YY2 - YY3 |
| 34 | | GO TO RTNLAB |

SYSTEM CONTROL ROM LISTING: IL(7) PROCEDURE

| STEP | LABEL | OPERATION |
|---|---|---|
| 1 | IL(7): | PTR(X70)=PTR(A) |
| 2 | | PTR(X71)=PTR(A) + 1 |
| 3 | | PTR(X72)=PTR(A) + 2 |
| 4 | | PTR(X73)=PTR(A) + 3 |
| 5 | | PTR(X74)=PTR(A) + 4 |
| 6 | | PTR(X75)=PTR(A) + 5 |
| 7 | | PTR(X76)=PTR(A) + 6 |
| 8 | | PTR(Y70)=PTR(B) |
| 9 | | PTR(Y71)=PTR(B) + 1 |
| 10 | | PTR(Y72)=PTR(B) + 2 |
| 11 | | PTR(Y73)=PTR(B) + 3 |
| 12 | | PTR(Y74)=PTR(B) + 4 |
| 13 | | PTR(Y75)=PTR(B) + 5 |
| 14 | | PTR(Y76)=PTR(B) + 6 |
| 15 | | XX1=X71 + X76 |
| 16 | | XX2=X72 + X75 |
| 17 | | XX3=X73 + X74 |
| 18 | | F(1)=XX1 + XX2 + XX3 |
| 19 | | XX5=X71 - X76 |
| 20 | | XX6=X72 - X75 |
| 21 | | XX7=X74 - X73 |
| 22 | | F(0)=X70 + F(1) |
| 23 | | F(2)=XX1 - XX3 |
| 24 | | F(3)=XX3 - XX2 |
| 25 | | F(4)=XX2 - XX1 |
| 26 | | F(5)=XX5 + XX6 + XX7 |
| 27 | | F(6)=XX5 - XX7 |
| 28 | | F(7)=XX7 - XX6 |
| 29 | | F(8)=XX6 - XX5 |
| 30 | | SET INDEX J=0 |
| 31 | | P(J)=CC(k)xF(J) |
| 32 | | INCREMENT k |
| 33 | | INCREMENT J |
| 34 | | IF J<9, GO TO STEP 31 |
| | | IF J=9, GO TO STEP 35 |
| 35 | | YY1=P(0) + P(1) |
| 36 | | YY2=YY1 + P(2) + P(3) |
| 37 | | YY3=YY1 - P(2) - P(4) |
| 38 | | YY4=YY1 - P(3) + P(4) |
| 39 | | YY5=P(5) + P(6) + P(7) |
| 40 | | YY6=P(5) - P(6) - P(8) |
| 41 | | YY7=P(5) - P(7) + P(8) |
| 42 | | Y70=P(0) |
| 43 | | Y71=YY2 + YY5 |
| 44 | | Y72=YY3 + YY6 |
| 45 | | Y73=YY4 - YY7 |
| 46 | | Y74=YY4 + YY7 |
| 47 | | Y75=YY3 - YY6 |
| 48 | | Y76=YY2 - YY5 |
| 49 | | GO TO RTNLAB |

SYSTEM CONTROL ROM LISTING: IL(8) PROCEDURE

| STEP | LABEL | OPERATION |
|------|-------|-----------|
| 1 | IL(8): | PTR(X80)=PTR(A) |
| 2 | | PTR(X81)=PTR(A) + 1 |
| 3 | | PTR(X82)=PTR(A) + 2 |
| 4 | | PTR(X83)=PTR(A) + 3 |
| 5 | | PTR(X84)=PTR(A) + 4 |
| 6 | | PTR(X85)=PTR(A) + 5 |
| 7 | | PTR(X86)=PTR(A) + 6 |
| 8 | | PTR(X87)=PTR(A) + 7 |
| 9 | | PTR(Y80)=PTR(B) |
| 10 | | PTR(Y81)=PTR(B) + 1 |
| 11 | | PTR(Y82)=PTR(B) + 2 |
| 12 | | PTR(Y83)=PTR(B) + 3 |
| 13 | | PTR(Y84)=PTR(B) + 4 |
| 14 | | PTR(Y85)=PTR(B) + 5 |
| 15 | | PTR(Y86)=PTR(B) + 6 |
| 16 | | PTR(Y87)=PTR(B) + 7 |
| 17 | | XX1=X80 + X84 |
| 18 | | XX2=X82 + X86 |
| 19 | | XX3=X81 + X85 |
| 20 | | XX4=X81 - X85 |
| 21 | | XX5=X83 + X87 |
| 22 | | XX6=X83 - X87 |
| 23 | | XX7=XX1 + XX2 |
| 24 | | XX8=XX3 + XX5 |
| 25 | | SET INDEX J=0 |
| 26 | | P(J)=CC(k)xF(J) |
| 27 | | INCREMENT k |
| 28 | | INCREMENT J |
| 29 | | IF J<8, GO TO STEP 26 |
| | | IF J=8, GO TO STEP 30 |
| 30 | | YY1=P(3) + P(4) |
| 31 | | YY2=P(3) - P(4) |
| 32 | | YY3=P(6) + P(7) |
| 33 | | YY4=P(6) - P(7) |
| 34 | | Y80=P(0) |
| 35 | | Y81=YY1 + YY3 |
| 36 | | Y82=P(2) + P(3) |
| 37 | | Y83=YY2 - YY4 |
| 38 | | Y84=P(1) |
| 39 | | Y85=YY2 + YY4 |
| 40 | | Y86=P(2) - P(5) |
| 41 | | Y87=YY1 - YY3 |
| 42 | | GO TO RTNLAB |

SYSTEM CONTROL ROM LISTING: IL(9) PROCEDURE

| STEP | LABEL | OPERATION |
|------|-------|-----------|
| 1 | IL(9): | PTR(X90)=PTR(A) |
| 2 | | PTR(X91)=PTR(A) + 1 |
| 3 | | PTR(X92)=PTR(A) + 2 |
| 4 | | PTR(X93)=PTR(A) + 3 |
| 5 | | PTR(X94)=PTR(A) + 4 |
| 6 | | PTR(X95)=PTR(A) + 5 |
| 7 | | PTR(X96)=PTR(A) + 6 |
| 8 | | PTR(X97)=PTR(A) + 7 |
| 9 | | PTR(X98)=PTR(A) + 8 |
| 10 | | PTR(Y90)=PTR(B) |
| 11 | | PTR(Y91)=PTR(B) + 1 |

| | | |
|---|---|---|
| 12 | | PTR(Y92)=PTR(B) + 2 |
| 13 | | PTR(Y93)=PTR(B) + 3 |
| 14 | | PTR(Y94)=PTR(B) + 4 |
| 15 | | PTR(Y95)=PTR(B) + 5 |
| 16 | | PTR(Y96)=PTR(B) + 6 |
| 17 | | PTR(Y97)=PTR(B) + 7 |
| 18 | | PTR(Y98)=PTR(B) + 8 |
| | | |
| 19 | | XX1=X91 + X98 |
| 20 | | XX2=X92 + X97 |
| 21 | | F(2)=X93 + X96 |
| 22 | | XX4=X94 + X95 |
| 23 | | F(1)=F(3)=XX1 + XX2 + XX4 |
| 24 | | XX6=X91 - X98 |
| 25 | | XX7=X97 - X92 |
| 26 | | F(8)=X93 - X96 |
| 27 | | XX9=X94 - X95 |
| 28 | | F(7)=F(9)=XX6 + XX7 + XX9 |
| 29 | | F(0)=X90 + F(2) + F(3) |
| 30 | | F(4)=XX1 - XX2 |
| 31 | | F(5)=XX2 - XX4 |
| 32 | | F(6)=XX4 - XX1 |
| 33 | | F(10)=XX6 - XX7 |
| 34 | | F(11)=XX7 - XX9 |
| 35 | | F(12)=XX9 - XX6 |
| | | |
| 36 | | SET INDEX J=0 |
| | | |
| 37 | | P(J)=CC(k)xF(J) |
| 38 | | INCREMENT k |
| 39 | | INCREMENT J |
| | | |
| 40 | | IF J<13, GO TO STEP 37 |
| | | IF J=13, GO TO STEP 41 |
| | | |
| 41 | | YY1=P(0) + P(2) + P(3) |
| 42 | | YY2=P(0) + P(1) |
| 43 | | YY3=P(4) + P(5) + YY1 |
| 44 | | YY4=P(6) - P(5) + YY1 |
| 45 | | YY5=YY1 - P(4) - P(6) |
| 46 | | YY6=P(8) + P(9) |
| 47 | | YY7=P(10) + P(11) + YY6 |
| 48 | | YY8=P(12) - P(11) + YY6 |
| 49 | | YY9=YY6 - P(10) - P(12) |
| 50 | | Y90=P(0) |
| 51 | | Y91=YY3 + YY7 |
| 52 | | Y92=YY4 - YY8 |
| 53 | | Y93=YY2 + P(7) |
| 54 | | Y94=YY5 + YY9 |
| 55 | | Y95=YY5 - YY9 |
| 56 | | Y96=YY2 - P(7) |
| 57 | | Y97=YY4 + YY8 |
| 58 | | Y98=YY3 - YY7 |
| | | |
| 59 | | GO TO RTNLAB |

SYSTEM CONTROL ROM LISTING: IL(16) PROCEDURE

| STEP | LABEL | OPERATION |
|---|---|---|
| 1 | | PTR(X160)=PTR(A) |
| 2 | | PTR(X161)=PTR(A) + 1 |
| 3 | | PTR(X162)=PTR(A) + 2 |
| 4 | | PTR(X163)=PTR(A) + 3 |
| 5 | | PTR(X164)=PTR(A) + 4 |
| 6 | | PTR(X165)=PTR(A) + 5 |
| 7 | | PTR(X166)=PTR(A) + 6 |

| | |
|---|---|
| 8 | PTR(X167)=PTR(A) + 7 |
| 9 | PTR(X168)=PTR(A) + 8 |
| 10 | PTR(X169)=PTR(A) + 9 |
| 11 | PTR(X1610)=PTR(A) + 10 |
| 12 | PTR(X1611)=PTR(A) + 11 |
| 13 | PTR(X1612)=PTR(A) + 12 |
| 14 | PTR(X1613)=PTR(A) + 13 |
| 15 | PTR(X1614)=PTR(A) + 14 |
| 16 | PTR(X1615)=PTR(A) + 15 |
| 17 | PTR(Y160)=PTR(B) |
| 18 | PTR(Y161)=PTR(B) + 1 |
| 19 | PTR(Y162)=PTR(B) + 2 |
| 20 | PTR(Y163)=PTR(B) + 3 |
| 21 | PTR(Y164)=PTR(B) + 4 |
| 22 | PTR(Y165)=PTR(B) + 5 |
| 23 | PTR(Y166)=PTR(B) + 6 |
| 24 | PTR(Y167)=PTR(B) + 7 |
| 25 | PTR(Y168)=PTR(B) + 8 |
| 26 | PTR(Y169)=PTR(B) + 9 |
| 27 | PTR(Y1610)=PTR(B) + 10 |
| 28 | PTR(Y1611)=PTR(B) + 11 |
| 29 | PTR(Y1612)=PTR(B) + 12 |
| 30 | PTR(Y1613)=PTR(B) + 13 |
| 31 | PTR(Y1614)=PTR(B) + 14 |
| 32 | PTR(Y1615)=PTR(B) + 15 |
| 33 | XX1=X160 + X168 |
| 34 | XX2=X164 + X1612 |
| 35 | XX3=X162 + X1610 |
| 36 | XX4=X162 - X1610 |
| 37 | XX5=X166 + X1614 |
| 38 | XX6=X166 - X1614 |
| 39 | XX7=X161 + X169 |
| 40 | XX8=X161 - X169 |
| 41 | XX9=X163 + X1611 |
| 42 | XX10=X163 - X1611 |
| 43 | XX11=X165 + X1613 |
| 44 | XX12=X165 - X1613 |
| 45 | XX13=X167 + X1615 |
| 46 | XX14=X167 - X1615 |
| 47 | XX15=XX1 + XX2 |
| 48 | XX16=XX3 + XX5 |
| 49 | XX17=XX15 + XX16 |
| 50 | XX18=XX7 + XX11 |
| 51 | XX19=XX7 - XX11 |
| 52 | XX20=XX9 + XX13 |
| 53 | XX21=XX9 - XX13 |
| 54 | XX22=XX18 + XX20 |
| 55 | F(16)=XX8 + XX14 |
| 56 | F(8)=XX8 - XX14 |
| 57 | F(17)=XX12 + XX10 |
| 58 | F(9)=XX12 - XX10 |
| 59 | F(0)=XX17 + XX22 |
| 60 | F(1)=XX17 - XX22 |
| 61 | F(2)=XX15 - XX16 |
| 62 | F(3)=XX1 - XX2 |
| 63 | F(4)=XX19 - XX21 |
| 64 | F(5)=X160 - X168 |
| 65 | F(6)=XX4 - XX6 |
| 66 | F(7)=F(8) + F(9) |
| 69 | F(10)=XX18 - XX20 |
| 70 | F(11)=XX3 - XX5 |
| 71 | F(12)=XX19 + XX21 |
| 72 | F(13)=X164 - X1612 |
| 73 | F(14)=XX4 + XX6 |
| 74 | F(15)=F(16) + F(17) |
| 75 | SET INDEX J=0 |
| 76 | P(J)=CC(k)xF(J) |
| 77 | INCREMENT k |

| | |
|---|---|
| 78 | INCREMENT J |
| 79 | IF J<18, GO TO STEP 76 |
| | IF J=18, GO TO STEP 80 |
| 80 | YY1=P(3) + P(5) |
| 81 | YY2=P(3) - P(5) |
| 82 | YY3=P(13) + P(11) |
| 83 | YY4=P(13) - P(11) |
| 84 | YY5=P(4) + P(6) |
| 85 | YY6=P(4) - P(6) |
| 87 | YY7=P(8) + P(7) |
| 88 | YY8=P(9) - P(7) |
| 89 | YY9=YY5 + YY7 |
| 90 | YY10=YY5 - YY7 |
| 91 | YY11=YY6 + YY8 |
| 92 | YY12=YY6 - YY8 |
| 93 | YY13=P(12) + P(14) |
| 94 | YY14=P(12) - P(14) |
| 95 | YY15=P(15) + P(16) |
| 96 | YY16=P(15) - P(17) |
| 97 | YY17=YY13 + YY15 |
| 98 | YY18=YY13 - YY15 |
| 99 | YY19=YY14 + YY16 |
| 100 | YY20=YY14 - YY16 |
| 101 | Y160=P(0) |
| 102 | Y161=YY9 + YY17 |
| 103 | Y162=YY1 + YY3 |
| 104 | Y163=YY12 - YY20 |
| 104 | Y164=P(2) + P(10) |
| 105 | Y165=YY11 + YY19 |
| 106 | Y166=YY2 + YY4 |
| 107 | Y167=YY10 - YY18 |
| 108 | Y168=P(1) |
| 109 | Y169=YY10 + YY18 |
| 110 | Y1610=YY4 - YY4 |
| 111 | Y1611=YY11 - YY19 |
| 112 | Y1612=P(2) - P(10) |
| 113 | Y1613=YY12 + YY20 |
| 114 | Y1614=YY1 - YY3 |
| 115 | Y1615=YY9 - YY17 |
| 116 | GO TO RTNLAB |

Figure 12:
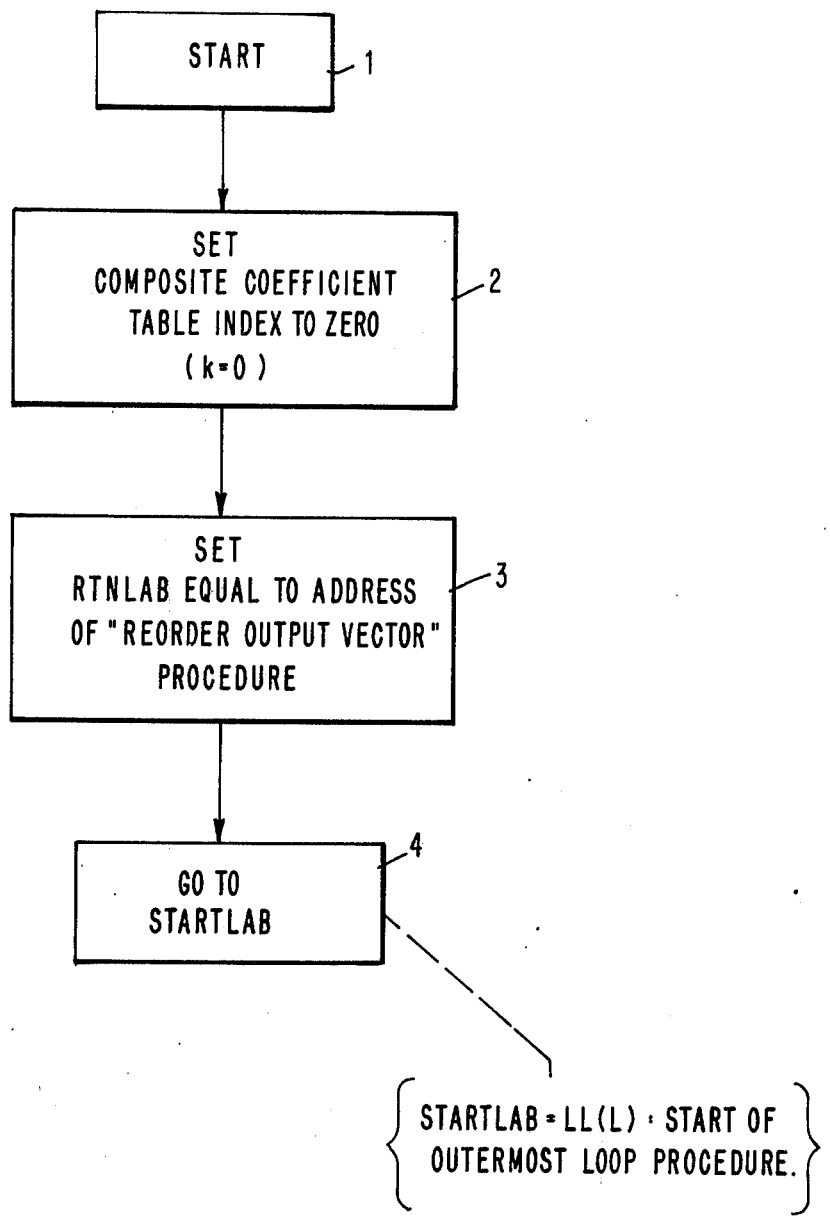
FIG. 12 comprises a system flow chart illustrating the sequences required in the 'Main Procedure Sequence' block 4 of FIG. 2.

Referring now to FIG. 12 this is a very brief flow chart of the operational sequences which occur in the system during the "main procedures portion of the evaluation run". In essence this flow chart comprises block 4 of FIG. 2. It should of course be understood that the majority of operational control for the "main procedure" portion are actually performed by the outer loop procedures and the inner loop procedures. Thus block 4 of FIG. 12 entitled "go to start lab" causes the sytem to branch to the starting address specified by "start lab" which as stated previously is stored in the label table portion of System RAM and is the initial address of the outermost loop procedure to be utilized in the current evaluation run. At this point the appropriately linked outer and inner loop procedures will control the operation of the system during this main procedure portion of the transform.

Referring now specifically to the flow chart, block 1 merely indicates that the main procedure is starting and causes block 2 to be entered. Block 2 causes the coefficients table index counter k to be reset to 0. It will be remembered that this counter would in all probability currently be pointing to the last entry in the composite coefficient table at any given time due either to a previous transform run or the initialization routine. It must of course be reset to 0 when a new run is to begin.

Proceeding to block 3, this block causes the return label register which would eventually be one of the working registers set forth in FIG. 1 to be set equal to the address of the "reorder output vector" procedure. Thus, when the last outer loop procedure is completed, the transform has been essentially completed and the system will have converted the original input vector $a_N$ into the transformed output vector $A_N'$. It is the output reordering procedure which will convert this latter vector into the desired output vector $A_N$.

As stated previously, the "reorder input/output vector procedures" comprise the use of an appropriate mapping tables which were generated as described previously with respect to FIGS. 6 and 7. The specific reordering procedures have not been specifically set forth as they would be notoriously well known to persons skilled in the art. The mapping table would essentially state, for example, that the first member of generated output vector $A_N'$ should be in some specified position of the reordered output vector, and that the second member of the generated output vector should be in another specified position of the final output vector and so on. In summary, block 3 sets up the return function subsequent to the main transform procedure so that the final output reordering can be performed, at which point a particular transform will be complete. The completion of the operation of block 3 carries the system to block 4, which as stated previously causes the system to actually enter the main transform procedure which is controlled by the now fully parameterized inner and outer loop operational sequences.

Figure 13:
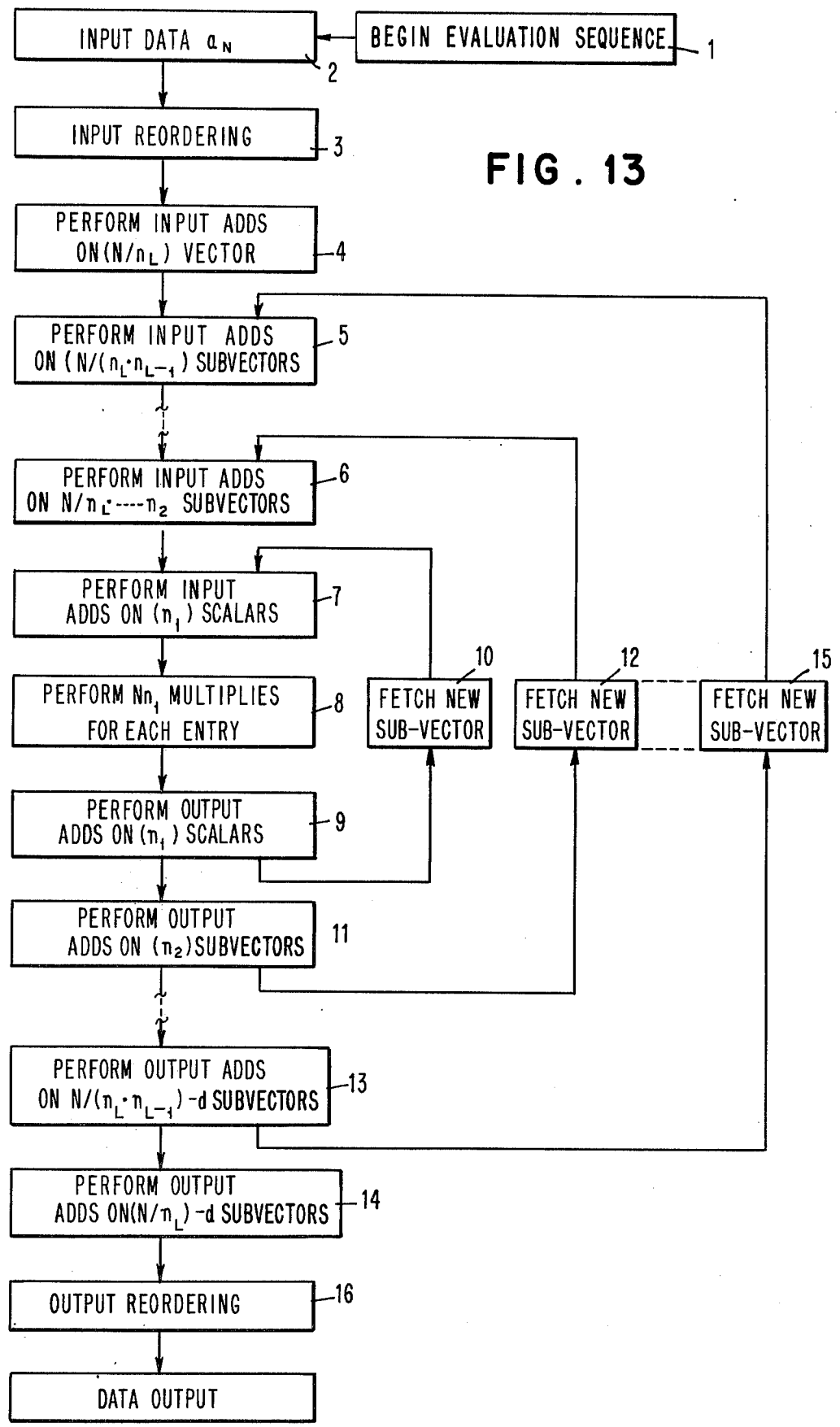
FIG. 13 comprises a detailed system flow chart of the 'Evaluation' function of the present system operation including blocks 2 through 6 of FIG. 2.
Figure 14A:
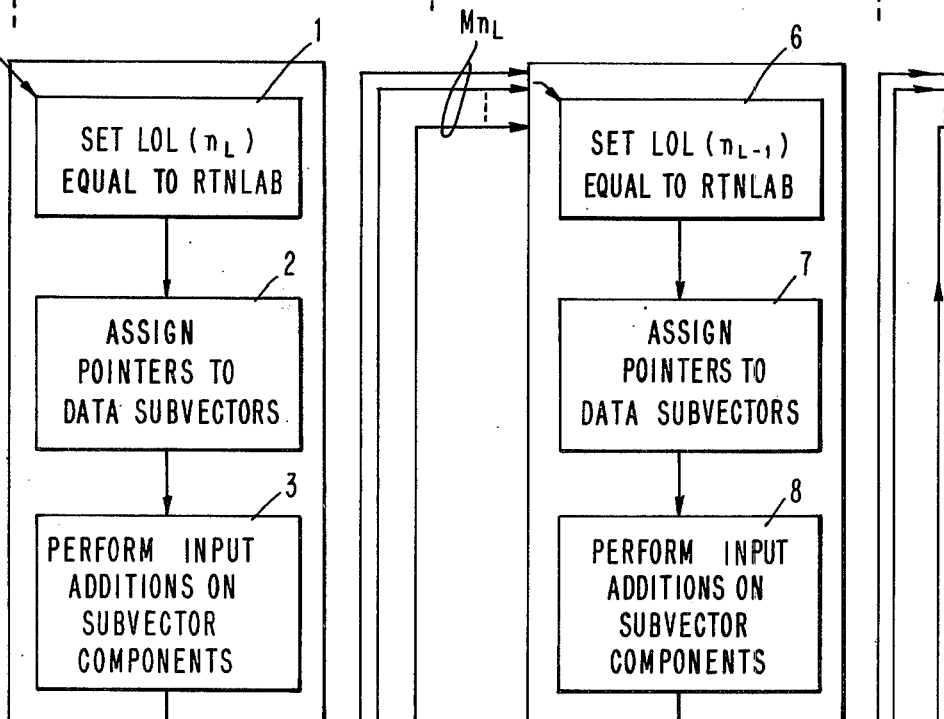
FIGS. 14A through 14D comprise an overall system control flow diagram illustrating the sequences of actual transform operations performed by the present system during the 'Main Procedure' portion of the 'Evaluation' phase of the system operation specifically illustrating loop transitions.
Figure 14B:
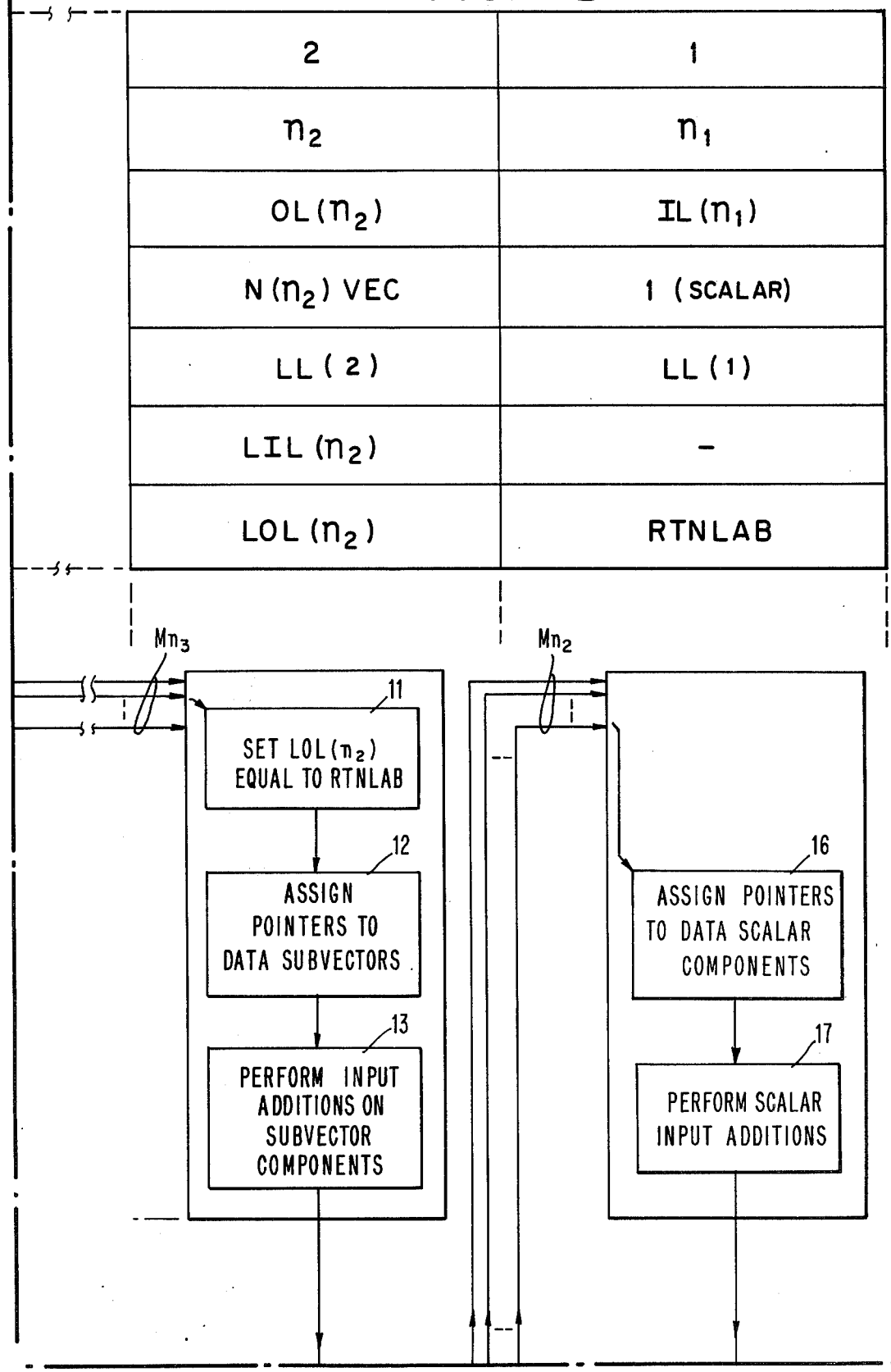
Figure 14C:
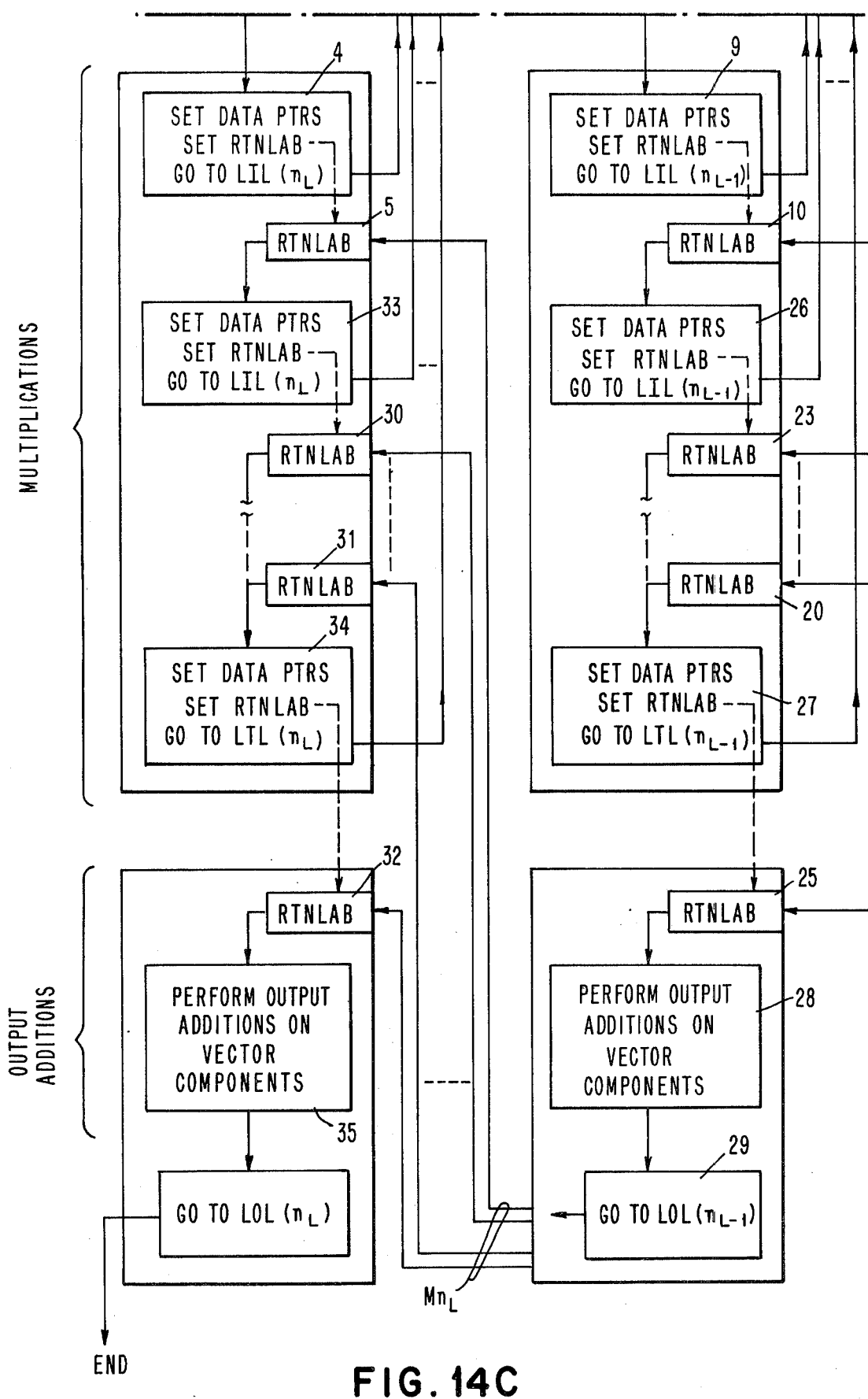
Figure 14D:
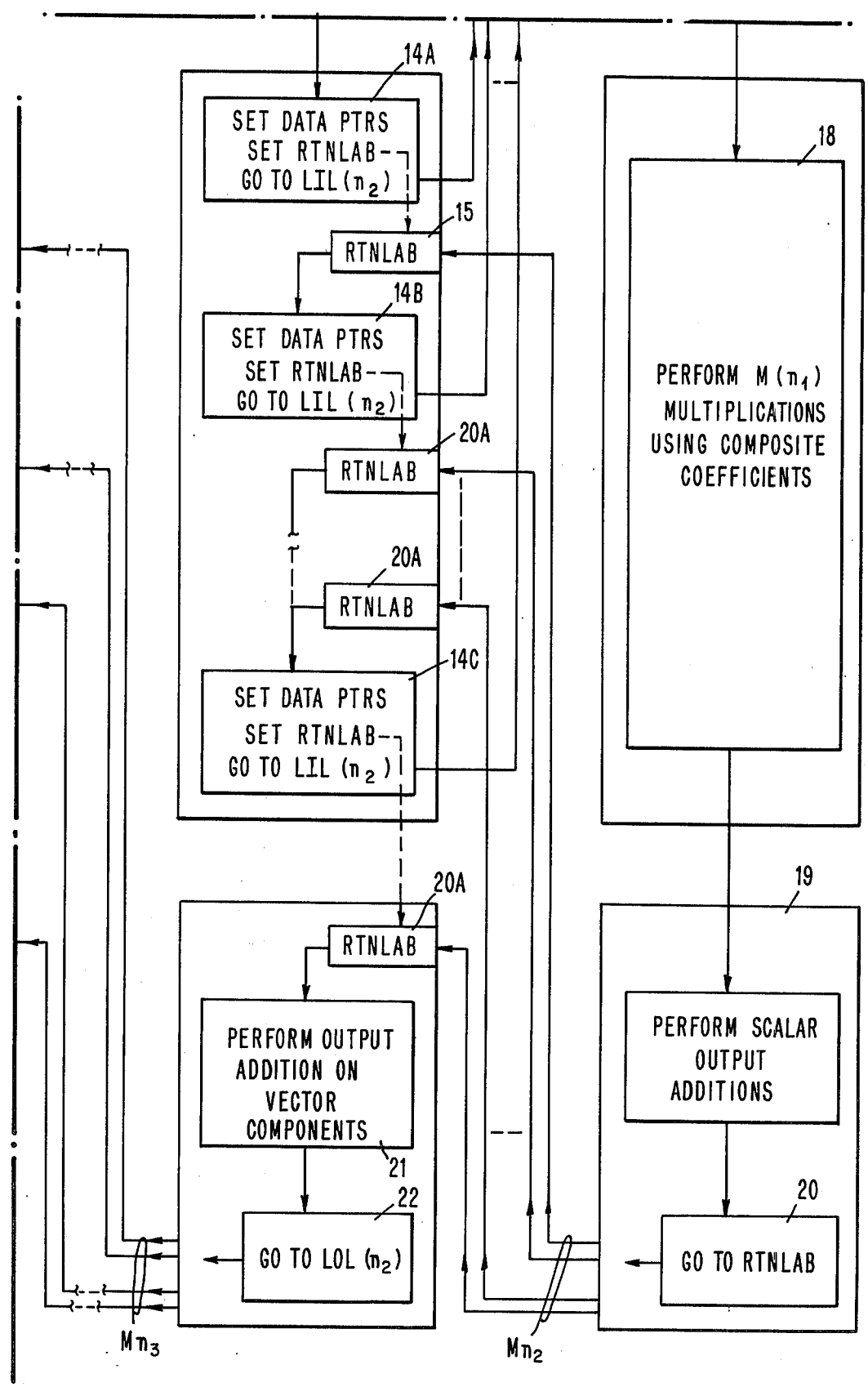

FIG. 13 illustrates in detailed flow chart form the complete evaluation sequence performed in the present system. It will be noted that in the righthand portion of this figure that there are 3 loop operations which refer clearly to the nested loop procedures which are inherent in the present system. FIG. 13 is in essence a detailed version of blocks 2 through 6 of FIG. 2.

Referring now specifically to FIG. 13, block 1 merely indicates that the evaluation sequence button is being initiated such as by the console operator's command. It is of course assumed that all of the previously described initialization functions have been completed and all the required data is stored in System RAM. As indicated in block 2, the input data vector $a_N$ is stored in the Data RAM. The system proceeds to block 3 where the complete input vector $a_N$ is reordered into a new vector $a_N'$. With block 4 the system enters the outermost loop and input adds are performed on the appropriate vectors as specified in the outer loop sequence. As will be remembered, all of the outer loop and inner loop sequences are tailored after the small-n algorithms which were described previously and essentially comprise three sections, input adds, multiplications and output adds. The primary difference between outer loop and inner loop operations is that all of the additions (or subtractions) are performed on vectors in the outer loops and the multiplies become pseudo multiplies in the outer loops which cause inward branches while in the inner loops all operations are on scalar quantities and the multiplies are actually performed, utilizing the aforementioned composite coefficients.

Referring back to block 4 the size of the vector utilized in this the outer loop is determined by the relationship $N/n_L$. And each of these specified additions in the outer loop sequence applying to the outermost loop comprises an addition performed on a vector having the stated dimensions. It is to be noted that this dimension was calculated in the "calculate loop parameters" flow chart of FIG. 9.

It should be noted at this point that FIG. 13 is a simplification of the present system operation it being noted that FIG. 14 discloses the loop transitions much more clearly than the higher level flow chart of FIG. 13. After completion of the operations of block 4 the system proceeds to block 5. What has happened here is that a first pseudo multiply has been encountered in the outermost loop which causes the next loop to be entered which, it is assumed, is similarly an outer loop operation. Here again a series of input adds are performed on subvectors having a predetermined dimension as stated in the parenthetical notation. The system control leaves block 5 again because a pseudo multiply has been encountered causing a branch inward to the next loop. The broken line between blocks 5 and 6 indicate that there could be more possible loops in this area, but they are essentially the same as the others. Assuming that the system arrives at block 6, again the series of input adds are performed on a subvector of a dimension determined by the mathematical formula in the parentheses, which as stated previously is precomputed during the "calculate loop parameters" operational sequence. Again, assuming a pseudo multiply is encountered, the system proceeds to block 7, which is the innermost loop. This time the input adds are performed on scalar quantities and when the multiply operations are encountered in the inner loop operational sequences, they are actually performed on the scalars as specified in the operational sequence listing utilizing sequentially the composite coefficient generated previously and stored in the System RAM. These are accessed under control of the composite coefficient address counter k, referred to in both the flow charts of FIG. 8 and FIG. 12. When all of the specified multiplies are completed the system proceeds to block 9, where the output adds on the scalar quantities are performed.

Upon termination of block 9, each of the inner loop sequences contain a branch-back instruction, which in this case takes the system back into the next adjacent outer loop at which point the next instruction in said outer loop is examined, and if another pseudo mutliply is encountered the system will fetch a new subvector, which is specified by the outer loop operational sequence and will again return to the inner loop and perform blocks 7, 8 and 9. This transitional sequence will continue until all of the pseudo multiplies in the next outer loop have been completed by the operations of inward transition and branch-back. At this point the system will proceed to block 11, which will cause the output adds to be performed on the subvectors formed by the previous transition inwardly. On the completion of these additions, the system will then go back to its next outer loop and, depending upon whether or not the branch-back point contained more pseudo multiplies, a new subvector would be fetched in block 12 and the system would proceed back through block 6 with the new subvectors and all of the nested loop operations of blocks 6, 7, 8, 9 and 11 would be formed until the branch controls cause the system to enter block 13, which is the next to the outermost loop. This block is similar functionally to block 11, in that a series of output adds is performed on the new subvectors which were formed by all of the adjacent inner loop transitions. When this output add is completed the system returns to the outer loop in block 14 and assuming there are still pseudo multiplies encountered in the outermost loop, the system will fetch a new subvector as specified in block 15, and the whole series of nested operations including blocks 5, 6, 7, 8, 9, 10, 11, 12 and 13 will continue until all of the pseudo multiplies in the outermost loop have been evaluated.

At this point the system is ready to perform the output adds as specified in the outermost outer loop sequence and, as in blocks 9, 11 and 13, these output adds are performed on the new subvector quantities generated by all of the previous operations. Upon completion of block 14, the modified output vector $A_n'$ is sitting in the Data RAM and at this point the output reordering operations occurs via block 15 and the output of block 15 is the rearranged data output vector $A_N$ which is a desired transform.

From the preceding description of FIG. 13 the nested loop operations of the present system will be quite apparent. Four separate loops are specifically illustrated in the figure with more being implied by the dotted lines between blocks 5 and 6, 11 and 13, and 12 and 15. The nested structure of these operations is apparent since each time a transition is made from an outer loop to an inner loop, a whole tree structure of further inner loop transitions occurs before the system returns to the originating outer loop at which time still further transition sequences occur. The subsequent description of FIG. 14 which essentially discloses the operations of blocks 4 through 14 of FIG. 13 will describe the disclosed nested loop operations in even greater details. Again, FIG. 14 is general in nature and specifically illustrates the two outermost loops and two innermost loops. However, in the event there were more than 4 loops, the operation would proceed in the identical fashion and it is believed that one skilled in the art would have no trouble extrapolating the present description into the slightly different fact situation for 5 nested loops.

FIGS. 14A through D form a single composite figure as shown in the organizational diagram of FIG. 14 and subsequent references to FIG. 14 refer to particular numbered blocks in said composite figure. FIG. 14 comprises a high level, generalized system control flow diagram, illustrating the sequences of transform operations performed by the present system during the evaluation phase of system operation and especially the control transitions between the nested loops. At the top of the figure, the header contains information about parameters and characteristics pertinent to each loop. The specific entries in the header are Loop Index, Loop Factor, Loop Procedure, Vector Dimension, Loop Entry Label, Loop Inward Label and Loop Outward Label. Four explicit columns with respective loop indices L, L-1, 2, and 1 are shown in the diagram. The characteristics and parameters associated with a given loop are listed in the column numbered by that loop index. Specifically shown in said numbered columns are the sequences of operations to be performed when the control is located in the particular loop to which each column is related. Loop operations fall into three major categories, namely, input additions, multiplications, and output additions. These are shown by the brackets at the left of FIGS. 14A and 14C. Other operations performed upon entering a given loop, such as setting the loop outward label to a new value and assigning pointers to data subvectors or scalars, are also shown. Upon completing major operations within a given loop, (i.e. reaching the bottom of said loop) the transfer of control to the appropriate point in the overall sequence is accomplished by performing a 'go to loop outward label' operation. The address of the next appropriate point in the overall loop sequence, will have been previously assigned to the given loop outward label during the previously described operation "set loop outward label equal to return label" (Set LOL $(n_l)$=RTNLAB).

It is believed that the control flow diagram of FIG. 14, is the clearest method for explaining the actual control flow of the present nested loop solution for the Fourier Transform as disclosed herein. As is apparent, the directional lines connecting the various columns of the diagram represent loop transitions, both inward and outward. It will be noted that at the top of each of the columns the arrows represent inward transition. The labeling on these lines ($Mn_l$) indicate that there are as many inward transitions as there are total multiplies (pseudo multiplies) in the next outward loop. Specifically referring to the next to the outermost loop that the inward transitions are labeled $Mn_3$ in this specifically illustrated example this would be $Mn_{L-1}$. It will also be noted at the bottom of FIG. 14 that the outward transitions are similarly labeled and that there are obviously as many returns from the given loop as there are inward transition. As an overall comment, it should be clearly understood, that each time a given outer loop is entered, the whole loop will of necessity have to be evaluated, i.e., all pseudo multiplies performed, thus causing further inward transitions, before an outward transition will occur. Thus, looking at any of these loops, the total number of times the loop operations will be performed is equal to the product of the number of pseudo multiplies in all of the loops to the left thereof.

In the following description each block of the drawing will be specifically referenced only once, however, in many cases, specifically the inner loops, it will be understood, that these loops are entered many times in a given transform operation. Referring now to block 1 in the column having the loop index L, that causes the loop outward label for this outer loop procedure to be set equal to a value stored in one of the working registers labelled herein as the return label (RTNLAB). Since this is the outermost loop, this label will be equal to the beginning of the output reordering procedure, as was explained previously when describing the "set up control flow linkages" and the "main procedure" flow charts. In block 2 index pointers are assigned utilizing the vector dimension ($N(n_L)$ VEC) computed in the "calculate loop parameters" flow sequence. As will be apparent this allows the particular vectors to be accessed in memory for the performance of the various input additions which are to be carried out in block 3. The results of these additions are also appropriately stored in the auxilary storage area of the Data RAM. In block 4 the particular outer loop sequence encounters the first pseudo multiply which causes the pointers to be set so that the proper vector is taken in to the next adjacent inner loop on the loop transition. Next the return label is set with the address shown just below block 4, shown diagramatically as block 5. This address is, as will be apparent to those skilled in the art, the address of the next instruction in the outer loop sequence. Finally block 4 causes loop transition control to go to the address specified by the loop inward label ($LIL(n_L)$) for the outermost loop which will always be the address of the first instruction in the adjacent inner loop, in this case the loop with index L-1.

This takes the control system into block 6 where this time the loop outward label for this loop is set equal to the current value of the return label, which as just stated is the address of the next instruction to be accessed in the outer loop, designated by the reference 5. Block 7 causes data pointers to be assigned to the subvector in effect brought in from the outer loop which will be manipulated during this particular transition. Again, the particular subvector pointers are determined by the value of the vector dimension $N(n_{L-1})$ VEC which has been previously computed for this loop. The system then continues to block 8 where specified additions in the particular outer loop table are performed on the designated subvector components. The system then continues to block 9 where the first pseudo multiply is encountered for this particular loop. Block 9 performs exactly the same operation as block 4 in the outermost loop. The data pointers are set utilizing the vector dimension which were computed during the "calculate loop parameters" sequence. The return label register is set to the address implied by block 10 and the system control accesses the loop inward label which was computed during the "set up control flow linkages" sequence, this in control then proceeds to block 11 in loop 2 (assuming only 4 loops are present).

It is again noted that the broken lines in the header and also in the loop transition arrows between loops L-1 and 2 imply that there could be several more loops inserted herein, but that their organization would be exactly the same as shown in FIG. 14. All of the header information would be computed by initializing procedures and the actual loop transitions and operations performed would be identical to those shown for the specifically illustrated loops. Block 11 performs essentially the same operations as block 6 setting the loop outward label for this particular transition, equal to the current contents of the register designated, RTNLAB, which as was just explained is currently the address designated by block 10 in the next outer loop. The system then proceeds to block 12 which is virtually identical in function to block 7, and utilizes the vector dimension computed for this particular loop. Having computed the pointers for the data subvectors carried in during this transition the system proceeds to block 13, where the additions designated by the outer loop sequence for this block are performed. Subsequent thereto, the system proceeds to block 14A, which is a pseudo multiply and requires the setting of the data pointers for the next inward transition, return label to the address implied by block 15 and accessing the loop inward label $LIL(n_2)$ to allow the system to proceed to block 16. It will be noted that there is no block in the innermost loop equivalent to blocks 6 and 11. This is because the setting of the return label need not be changed by the system controls and therefore its contents may be utilized directly to return the system control back to a required branch-back point in loop 2.

Block 16 assigns pointers to the scalar data components, which means pointing literally to the first member of the subvector taken into the inner loop on this transition. In block 17 the input additions required by the particular inner loop sequence are performed and the system proceeds to block 18, which causes closes all of the required $Mn_1$ multiplications to be performed and stored in the auxilary storage locations of the Data RAM. After the multiplications are completed the system proceeds to block 19.

Block 19 causes the specified scalar output additions to be performed on the output of block 18 and having completed these additions, the system proceeds to block 20, where the address stored in the working register designated RTNLAB is accessed and the loop transitions will return to the appropriate return address in loop 2. This is designated by blocks 20A in loop 2. Just which of the blocks 20A (or 15) are used in a given instance depends of course on how many inward transitions have been made. Similarly blocks 14B and 14C are just like block 14A procedurally, however, each points to different vector of data of dimension $N(n_2)$ VEC to be taken inward on its particular transition.

Assuming for purposes of further explanation that the return label is set to the bottom block 20A, the system will proceed to execute block 21. In block 21 the output additions specified by outer loop sequence $OL(n_2)$ will be performed on the vectors generated by the just preceding inner loop operations, and upon the completion of these additions, the system goes to block 22, which will cause another outer loop transition specified by the loop outward label $LOL(n_2)$ which was loaded in block 11. Depending upon the origin of the last inward transition, the system will return back into loop L-1 at one of the return labels deisgnated by 23, 24 or 25.

It will be assumed that all of the previous inner loop transitions caused by the pseudo multiplies which would have been detected in blocks 26 and 27, have been completed. The loop transition control will cause the system to return to block 25 and output additions will be performed in loop L-1, as specified by block 28. Upon completion of the output adds for this block the system proceeds to block 29 where the loop outward label $LOL(n_L)$ which was set in block 6 of this loop, will take the control back into loop L at one of the three specified addresses 30, 31 or 32. This as should be clear at this point will be determined from the point at which the system last branched inward. Assuming, as with loop L-1 that the remaining pseudo multiplies specified by blocks 33 and 34 have been completed and the system would return to loop L at the address specified by block 32.

Block 35 causes the final set of output additions to be performed and stored in the Data RAM and the system proceeds to block 36 where the loop outward label for this outermost loop causes the system control to return to the first instruction for the output reordering procedure as was explained previously.

The above completes the description of FIG. 14, it being noted that FIG. 14 is actually an extension and a more graphic representation of the overall control flow processes used during the evaluation operation, which were described in a somewhat different form in FIG. 13. It should also be understood that FIG. 14 is purposely generic, i.e., it is not parameterized for any particular vector dimensions or subvector dimensions, nor are any particular values of N chosen for the various loops. Thus, especially in the multiplication sections, it will be noted that all of the series of pseudo multiplies contain broken lines which merely indicate that there may be more pseudo multiplies than those shown. It will of course be appreciated that there could conceivably be fewer multiplies than those shown. The form of the flow chart of FIG. 14 is thus very general in nature and could be utilized to understand the flow controls which would be set up for any acceptable value of N having the requisite numbers of loops L, regardless of the number.

It will be specifically noted that in the subsequent description of FIG. 21, a flow chart substantially identical to that of FIG. 14 is shown, however, the headings, are parameterized wherever possible and as many pseudo multiplies and other loops are shown as actually would exist for the example $N=60$.

Before proceeding with the specific example, there will follow a description of the contents of the four primary storage areas of the present system. FIGS. 15, 16, 17 and 18 are in essence allocation diagrams of the System Parameters ROM, System RAM, Data RAM, and the system Control ROM respectively.

It is believed that a description of the contents of these various memory elements, together with the description of the various operational sequences utilized in the present system, will readily enable those skilled in the art to utilize the concepts of the present invention as disclosed herein, to perform the unique Fast Fourier Transform developed by the inventor on a machine having the general architectural configurations disclosed and described herein.

FIG. 15 comprises an allocation diagram of the contents of the System Parameters ROM. Due to the nature of the contents of this memory, the read only memory structure may be utilized as these contents need never change and also due to the fact that due to the speed of a ROM certain of the memory accessing functions are considerably enhanced.

There are basically three significant pieces of data in the System Parameters ROM. The first are the small-n coefficients tables (CT) which are utilized during the 'calculate and store composite coefficients' operational sequence. The actual arithmetic values are shown in the preceding table of small-n algorithms. The coefficients relating to each of the values of n are derived from the trigonometric coefficients dictated by the DFT matrix relating to the respective multiplies in each of these algorithms. They are stored herein in tabular form for ease of access in the composite coefficients generating sequence.

The second portion of the table comprises a Multiplies/Factor table which is a listing of the number of multiplies associated with each factor. This table is included as a control convenience and is utilized in the composite coefficients generating sequence to set the system control counters to simplify the sequence.

The third segment of the data stored in this memory is the Factors of N table. This table which was set forth previously provides a good deal of the initializing information necessary for initializing the system for performing the transform on a particular value of N. It should be noted in passing, that it is assumed that the system operator would have a list of acceptable values of N which meet the criteria of: (1) all of the small-n factors being mutually prime and (2) selected from the values for small-n consisting of 2, 3, 4, 5, 7, 8, 9, 13 and 16.

Figure 16:
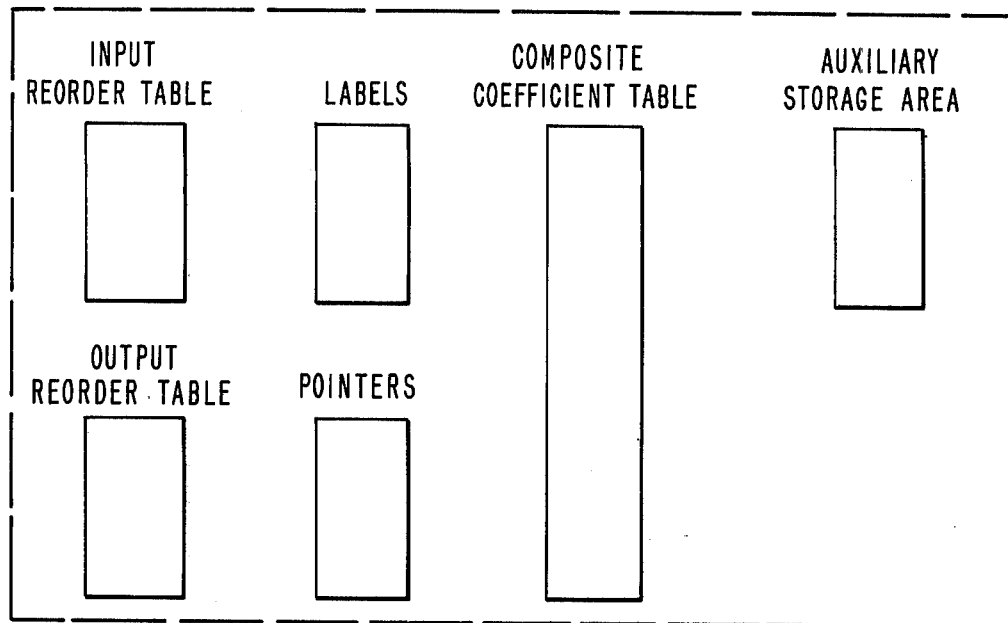
FIG. 16 comprises an allocation diagram of the System RAM of FIG. 1.

FIG. 16 is an allocation diagram for the System RAM. The System RAM and the Data RAM are functionally separate in that the System RAM contains data and/or control information specifically tied into the operational sequences performed by the machine, insofar as controlling the various operations, whereas the information stored in the Data RAM is data in the usual sense of the word. In this case representing the magnitude of electrical signals being utilized in the actual Fourier Transform Operation.

The Input Reorder Table and the Output Reorder Table are the mapping tables which were developed utilizing the operational sequences set forth and explained with respect to FIGS. 6 and 7. The two tables marked Labels and Pointers, comprise the system sequence addresses and also the data address pointers devloped during the "set up control flow linkages" and the "calculate loop parameters" sequences set forth with respect to FIGS. 10 and 9 respectively. The Composite Coefficient Table is the actual list of composite coefficients generated and stored during the "calculate and store composite coefficients" sequence set forth and described with respect to the flow chart of FIG. 8. The auxilary storage area comprises memory space utilized during the generation of certain of the tables stored in this section of memory, such as the input and output reordering table generation sequences and also in the composite coefficient table generation sequence.

Figure 17:
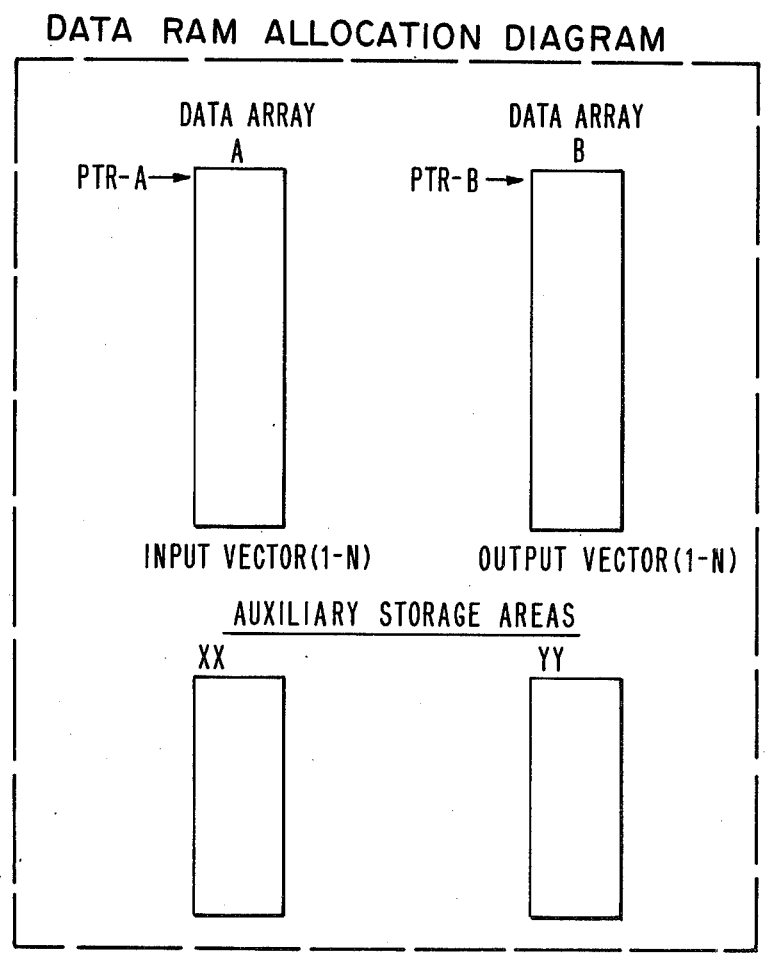
FIG. 17 comprises a diagram illustrating the contents of the DATA RAM of FIG. 1.

FIG. 17 is an allocation diagram for the Data RAM. As indicated in the figure, the data array A and the data array B are for the storage of the N dimension input vector and the N dimension output vector. The auxilary storage areas XX and YY are utilized to hold certain of the intermediate results as specifically set forth in the OL and IL operational sequences. Whenever the pointer A or pointer B are specified in these operational sequences, it is intended that the data be accessed from or stored in the data arrays A or B. Similarly when XX and YY addresses are called for the intermediate results referred to are to be stored in the auxilary storage area.

Figure 18:
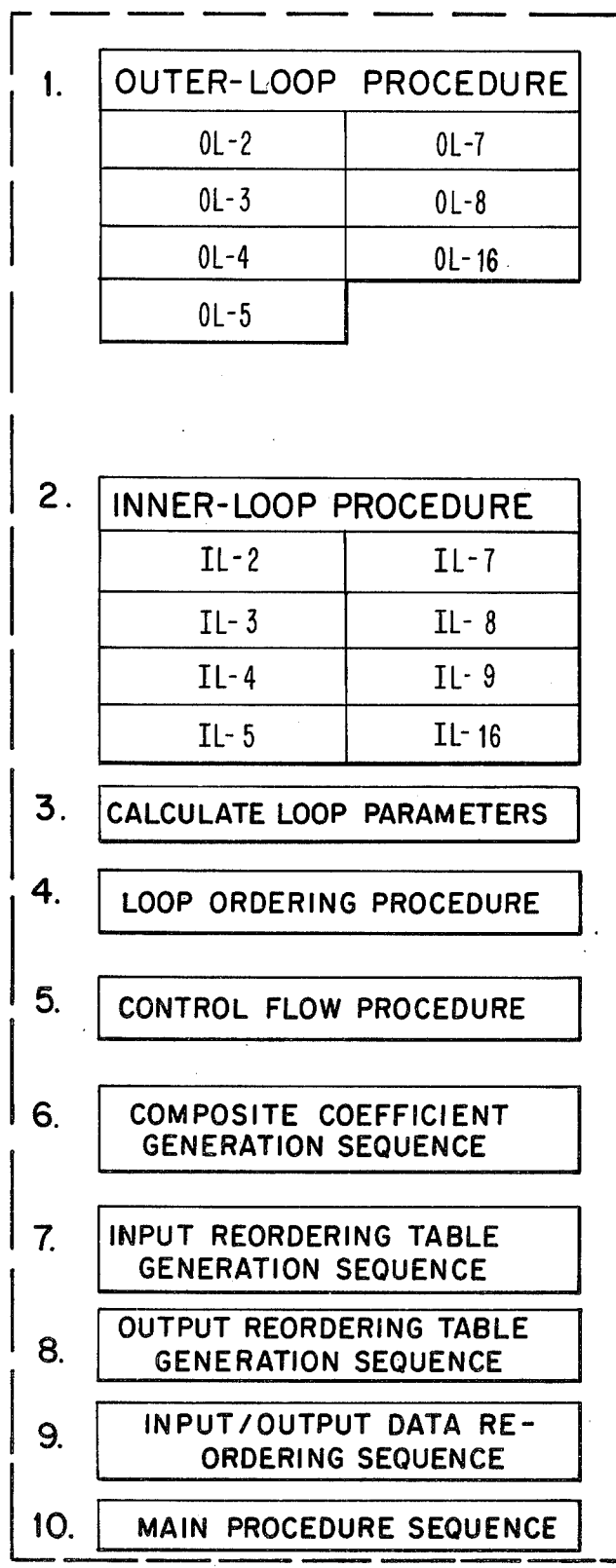
FIG. 18 is a diagram which specifies all of the functional control sequences stored in the System Control ROM of FIG. 1.

FIG. 18 comprises an allocation diagram of all the operational sequences stored in the System Control ROM which operational sequences control the operational function of the present system architecture. There are ten separate operational sequences stored in the control ROM. The inner and outer loop procedures set forth in detail previously comprise the procedures for each of the small-n factors, all of which are stored in the system but only a relatively small number of which will be utilized for any given evaluation. It is specifically noted that of course only one inner loop procedure would be utilized in any evaluation run. The sequences designated by the numerals 3, 4, 5, 6, 7 and 8 as is apparent, control the system initialization functions. The operations labelled 9 and 10 together with the inner and outer loop procedures, control the actual evaluation runs.

EXAMPLE: N=60

Having generally described the operation of the present system in terms of a general value N and a somewhat generalized selection of the small factors of N, the following example for a value of N=60 will be briefly described to completely parameterize the operation of the present system. For this operation of the system it will be presumed that the data is "real" and accordingly the loop odering included with the factors N table will be utilized in selecting the loop ordering for the transform.

FIGS. 19, 20 and 21 are in essence parameterized versions of FIGS. 4, 13 and 14 which were described previously for the general case.

Referring to the Factors of N Table described previously it will be seen that for the case where N=60 that L=3, which means that there are three loops. Further referring to the table, it will be noted that the factors have the loop designations $n_1=5$, $n_2=4$, and $n_3=3$. As is apparent, these factors meet the criteria of being mutually prime and fall within the designated small-n factors whose unique transforms were discovered and developed by the inventor hereof.

Referring now to FIG. 19, block 1, 2 and 3, reiterate what has just been stated previously, i.e., the dimension of the vector N has been chosen to be 60 and the three appropriate factors of N are chosen, as well as their loop ordering specified. In block 4, the input and output mapping tables are calculated. In this case since the vector dimension N is 60 the input map is designated as $a_0, \ldots, a_{59} \rightarrow a_0', \ldots, a_{59}'$. Similarly the output map is shown diagramtically as $A_0', \ldots, A_{59}' \rightarrow A_0 \ldots, A_{59}$. These maps are stored in the System RAM as indicated. Next the composite coefficients are generated and stored in block 5. Table 1 below represents the information extracted from the factors in the table specifying both the loops and factors associated with each loop, which allow the system to then go into the coefficient tables stored in the System ROM to extract the coefficients associated with each said factor. It will be noted in this table that the coefficients are evaluated in trigonometric terms with angle u stated in radians. In the normal system implementation these tables would be stored in their arithmetic value format. They are shown in this form in this particular table so that reference may be made to the small-n algorithms and it will be noted that the coefficients for each multiplication is in the form shown in Table 1.

TABLE 1

Example: N = 60    data type = real
Table of Coefficients (Symbolic)

| (Loop 3) | (Loop 2) | (Loop 1) |
|---|---|---|
| $n_3 = 3$ | $n_2 = 4$ | $n_1 = 5$ |
| CT-3 | CT-4 | CT-5 |
| $\mu = \frac{2\pi}{3}$ | $\mu = \frac{2\pi}{4}$ | $\mu = \frac{2\pi}{5}$ |
| C3-1 = 1 | C4-1 = 1 | C5-1 = 1 |
| C3-2 = cos$\mu$-1 | C4-2 = 1 | CT-2 = $\frac{\cos\mu + \cos2\mu}{2}$ - 1 |
| C3-3 = i(sin$\mu$) | C4-3 = 1 | C5-3 = $\frac{\cos\mu - \cos2\mu}{2}$ |
|  | C4-4 = i | C5-4 = i(sin$\mu$) |
|  |  | C5-5 = i(sin2$\mu$ + sin$\mu$) |
|  |  | C5-6 = i(sin2$\mu$ - sin$\mu$) |

Table 2 below illustrates the way in which the composite coefficients are generated. It should also be noted that there are 72 such coefficients as there are 3, 4 and 6 multiplications, respectively, in the three loops l=3, l=2 and l=1. Referring to Table 2, it will be noted that this table sets forth the operations in their proper sequence for computing the composite coefficients (CC). As stated previously, this is a lexical ordering type of multiplication where each innermost loop coefficient appears iteratively 1, 2, 3, 4, 5, 6, 1, 2, 3, 4, etc. while the coefficient for loop $n_2$ indexes each time a complete cycle of the innermost loop is completed. Similarly, the outermost loop indexes each time a complete cycle of the loop $n_2$ is completed. In this version all 72 coefficients are generated and placed in memory in the order in which the inner loop multiplications will require them when performing the transform utilizing the present nested loop solution method under control of the specified outer loop and inner loop operational sequences.

TABLE 2

Composite Coefficients (Symbolic: Lexical Ordering)

| CC-1 = | C3-1 | x | C4-1 | x | C5-1 |
|---|---|---|---|---|---|
| CC-2 = | C3-1 | x | C4-1 | x | C5-2 |
| CC-3 = | C3-1 | x | C4-1 | x | C5-3 |
| CC-4 = | C3-1 | x | C4-1 | x | C5-4 |
| CC-5 = | C3-1 | x | C41 | x | C5-5 |
| CC-6 = | C3-1 | x | CX41 | x | C5-6 |
| CC-7 = | C3-1 | x | C4-2 | x | C5-1 |
| CC-8 = | C3-1 | x | C4-2 | x | C5-2 |
| . | . | . | . | . | . |
| . | . | . | . | . | . |
| CC-25 = | C3-2 | x | C4-1 | x | C5-1 |
| . | . | . | . | . | . |
| . | . | . | . | . | . |
| CC-49 = | C3-3 | x | C4-1 | x | C5-1 |
| . | . | . | . | . | . |
| . | . | . | . | . | . |
| CC-67 = | C3-3 | x | C4-4 | x | C5-1 |
| CC-68 = | C3-3 | x | C4-4 | x | C5-2 |
| CC-69 = | C3-3 | x | C44 | x | C5-3 |
| CC-70 = | C3-3 | X | C4-4 | x | C5-4 |
| CC-71 = | C3-3 | x | C4-4 | x | C5-5 |
| CC-72 = | C3-3 | x | C4-4 | x | C5-6 |

Table 3 is shown to illustrate the form in which the composite coefficients would actually be stored, in the System RAM, i.e., in arithmetic form. It will be noted that the coefficients are either real or imaginary, positive or negative, but never complex. It will also be noted in Table 3 that many of the composite coefficients are cyclic, i.e., they repeat the previous sequence. As stated previously, it will be understood that these arithmetic values are stored in the System RAM at some convenient index and are accessed by means of a continuously incremented composite coefficient pointer (k), which causes the composite coefficients to be sequentially accessed as the inner loop multiplications are encountered and performed.

TABLE 3

Table of Composite Coefficient (Numeric)

| CC-1 | 1 |
|---|---|
| CC-2 | - 1.250 000 000 |
| CC-3 | - 1.118 033 989 |
| CC-4 | i 0.951 056 516 |
| CC-5 | i 1.538 841 768 |
| CC-6 | -i 0.363 271 265 |
| CC-7 | |
| CC-8 | |
| CC-9 | |
| CC-10 | same as CC-1 through CC-6 |
| CC-11 | |
| CC-12 | |
| CC-13 | |
| CC-14 | |
| CC-15 | |
| CC-16 | same as CC-1 through CC-6 |
| CC-17 | |
| CC-18 | |
| CC-19 | i |
| CC-20 | -i 1.250 000 000 |
| CC-21 | -i 1.118 033 989 |
| CC-22 | - 0.951 056 516 |
| CC-23 | - 1.538 841 768 |
| CC-24 | 0.363 271 265 |
| CC-25 | - 1.500 000 000 |
| CC-26 | - 1.876 000 000 |
| CC-27 | - 1.677 050 984 |
| CC-28 | -i 1.426 584 774 |
| CC-29 | -i 2.308 262 652 |
| CC-30 | i 0.544 906 898 |
| CC-31 | |
| CC-32 | |
| CC-33 | |
| CC-34 | Same as CC-25 through CC-30 |
| CC-35 | |
| CC-36 | |
| CC-37 | |
| CC-38 | |
| CC-39 | |
| CC-40 | Same as CC-25 through CC-30 |
| CC-41 | |
| CC-42 | |
| CC-43 | -i 1.500 000 000 |
| CC-44 | i 1,875 000 000 |
| CC-45 | -i 1.677 050 984 |
| CC-46 | 1.426 584 774 |
| CC-47 | 2.308 262 652 |
| C-48 | - 0.544 906 898 |
| CC-49 | i 0.866 025 404 |
| CC-50 | -i 1.082 531 755 |
| CC-51 | i 0.968 245 837 |
| CC-52 | - 0.823 639 104 |
| CC-53 | - 1.332 676 064 |
| CC-54 | 0.314 602 144 |
| CC-55 | |
| CC-56 | |
| CC-57 | |
| CC-58 | Same as CC-49 through CC-54 |
| CC-59 | |
| CC-60 | |
| CC-61 | |
| CC-62 | |
| CC-63 | |
| CC-64 | Same as CC-49 through CC-54 |
| CC-65 | |
| CC-66 | |
| CC-67 | - 0.866 025 404 |
| CC-68 | 1.082 531 755 |
| CC-69 | - 0.968 245 837 |
| CC-70 | -i 0.832 639 104 |
| CC-71 | - 1.332 676 064 |

TABLE 3-continued
Table of Composite Coefficient (Numeric)

| | |
|---|---|
| CC-72 | i 0.314 602 144 |

Upon completion of the composite coefficient generation sequence the system proceeds to block 6 wherein the loop parameters are calculated. These parameters provide, as will be remembered, the size of the data vectors utilized in the 2 loops $n_2$ and $n_3$. As indicated in block 6 the size of the vector for the outermost loop $N(n_3)$ VEC is calculated to be 20. As will be remember, this figure is determined from the formula $N/n_3$ which equals $60/3=20$. Similarly, to calculate the subvector size for loop 2, the formula $N/n_3 \cdot n_2 = 60/3 \cdot 4 = 5$. Thus, it will be noted that in the outermost loop, vectors having a dimension 20 are involved in all of the additions and pseudo multiplies. Similarly in loop 2, subvectors of a dimension 5 are utilized in each loop operation. In the innermost loop, scalar quantities, i.e., vector size of 1, are always used for both addition operations and multiplies. These vector dimension values are stored in the System RAM. Block 7 causes the control flow linkages to be defined. Since the outermost loop will utilize the three loop operational sequences OL3, OL4 and IL5, it will be apparent that the start label is equal to the first address of the first instruction in loop operational sequence, OL3. Similarly, the loop inward label for loop 3, LIL(3) equals the address of the first instruction in the sequence OL4. Also the loop inward label for loop 2 LIL(4) is the first instruction in the sequence IL5. These computed linkages are also stored in the System RAM.

Upon completion of block 7, the initialization computations are complete and the system is ready to begin the evaluation run.

Referring now to FIG. 20, which is a parameterized version of FIG. 13, there is shown the flow sequence for the evaluation procedure, in this case specifically tailored to three loops having the factors $n_3=3$, $n_2=4$, and $n_1=5$.

Referring now specifically to FIG. 20, blocks 1 and 2 indicate that the initial input data vector, having 60 different signal sample values, are input into the system. Block 3, indicates the input reordering operation, wherein the 60 element vector is reordered in accordance with the input reordering table.

Next in block 4, the input adds specified in operational sequence OL3 cause the respective adds to be performed on the 3 subvectors each having a dimension of 20. These input adds are performed in sequence specified in the OL3 operational sequence. At this point it is assumed that a pseudo multiply has been countered in the OL3 sequence, and the system proceeds to block 5, which moves the operation into loop 2, which operates under the OL4 operational sequence. In this block input adds are performed on four subvectors having a dimension of 5, as was explained previously. These are input add operations again as specified by the OL4 sequence.

At the end of the input adds a pseudo multiply will cause the system to branch to the inner loop of block 6, wherein the IL5 operational sequence will govern. As specified in blocks 6, 7 and 8, all inner loop operations are performed on scalar or single dimension quantities. Block 6 specifyies the input adds, block 7 specifies the scalar multiplies and block 8 specifies the scalar output adds. It will be noted that in the multiply operations the composite coefficient tables are addressed sequentially for each of the successive multiplies in each of the successive transitions into the inner loop.

Assuming, for the purpose of explanation, that the first transition of loop 1 has just been completed to block 9, wherein the just processed subvector of dimension 5 is returned into the Data RAM and the system proceeds to block 10. In this block a decision is made as to whether or not control returns in loop 2 to the next pseudo multiply in the operational sequence OL4, or whether all pseudo multiplies have been completed and the system can proceed to block 11 which performs the output adds on the four subvectors of dimension 5 as specified by the OL4 sequence.

Assuming arguendo that all of the pseudo multiplies in loop 3 have not yet been performed, the system would proceed to block 12, which states that the just processed subvector of dimension 20 will be returned in effect to loop 3 in the Data RAM. The system will then proceed to block 13, wherein a new subvector of dimension 20 will be obtained from loop 3 and the system will return to block 5, wherein the OL4 operational sequence will be completed in its entirety including the 4 inward transitions to loop 1.

It should be noted in passing that functionally blocks 9 and 12 may be looked upon as being contained within blocks 8 and 11 since the storage operations, called for in blocks 9 and 12 are necessary in both the branch and also in the main sequence. Actually the decision as to whether to branch-back into an inner loop is made, in blocks 8 and 11.

It should be noted in passing that there will be a total of 3 inward transitions through loop 2 and for each transition of loop 2 there are 4 transitions of loop 1. Thus, there are a total of 12 transitions of loop 1, 4 transitions of loop 2, and a single transition of the outermost loop 3. In block 14, the output adds are performed on three subvectors, each having a dimension of 20, as required by the OL3 operational sequence and at the end of this block, the system proceeds to block 15, which causes the output reordering sequence to reorder the data vector $A_N'$ obtained from block 14, per the output reordering table into the desired form $A_N$. Once this reordering has been performed, the system is ready to proceed to block 16, which causes the output vector $A_N$ to be gated out to whatever utilization means are provided. At this point, a decision can be made to accept another input vector $a_N$ of dimension 60, and repeat the evaluation operation since the system has been appropriately initialized for this value. Conversely, the operation of the system may be terminated.

Due to the complex nature of the operation of the system, a further illustrative example for the value $N=60$ will be explained with reference to FIG. 21 (FIGS. 21A through D) which is a parameterized version of FIG. 14, wherein the headers and procedural blocks contain the specific data which would be produced by the system controls for the situation where $N=60$ and again the data vector consists of "real" data, rather than complex data.

Figure 21C:
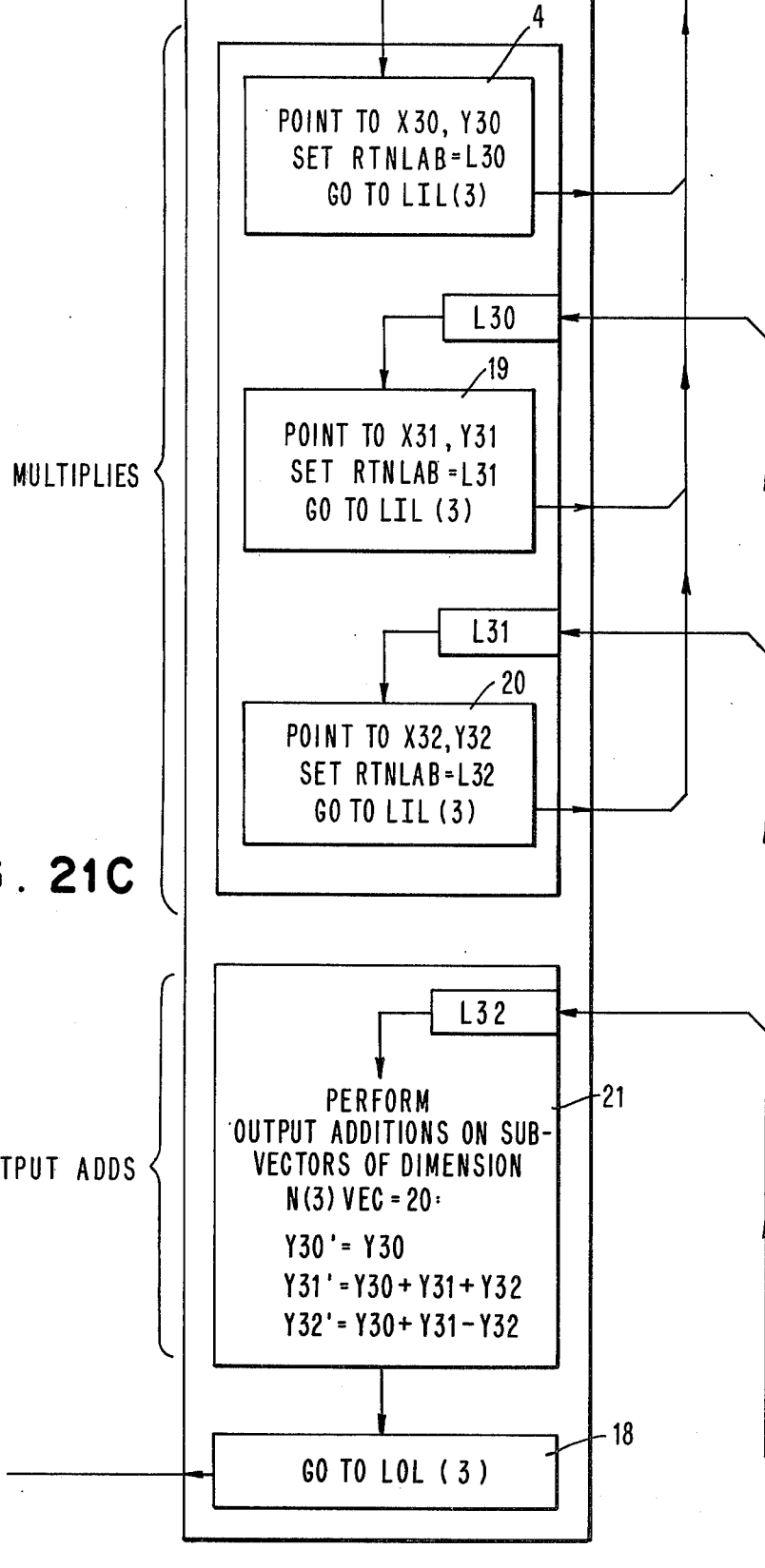
FIGS. 21A through 21D comprise a system control flow diagram similar to that of FIG. 14 specifically showing the operations performed and some of the resultant parameters developed relative to the described example wherein N=60.
Figure 21A:
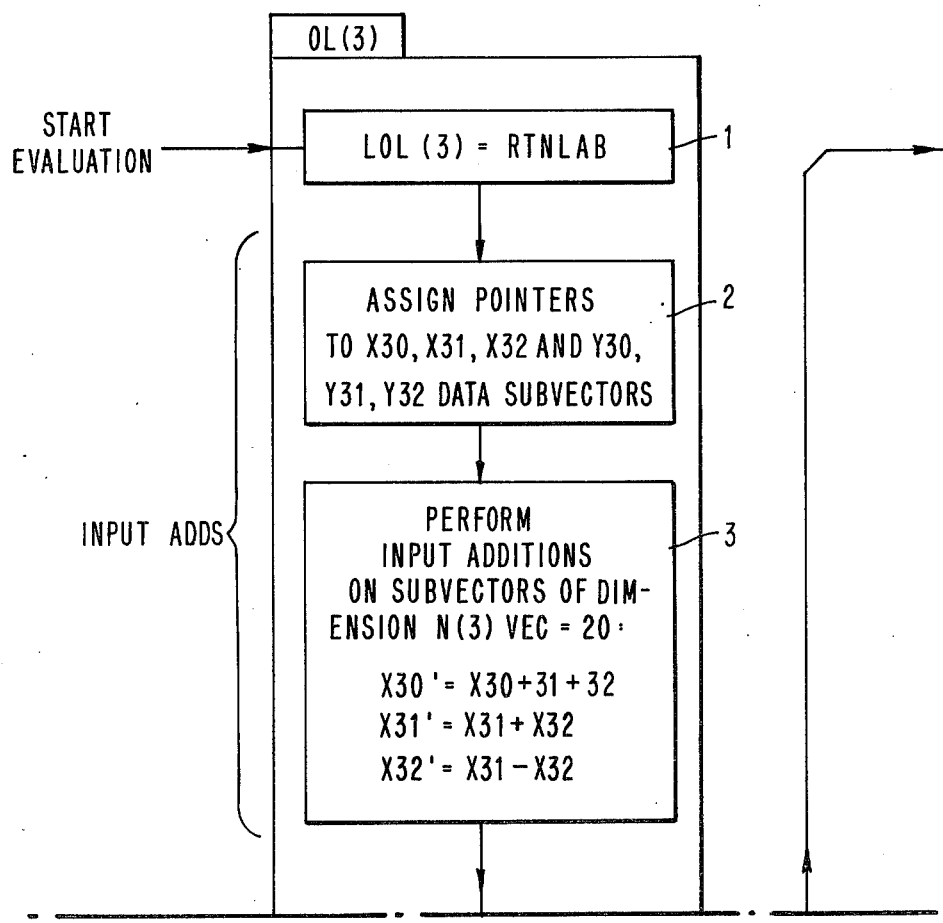
Figure 21B:
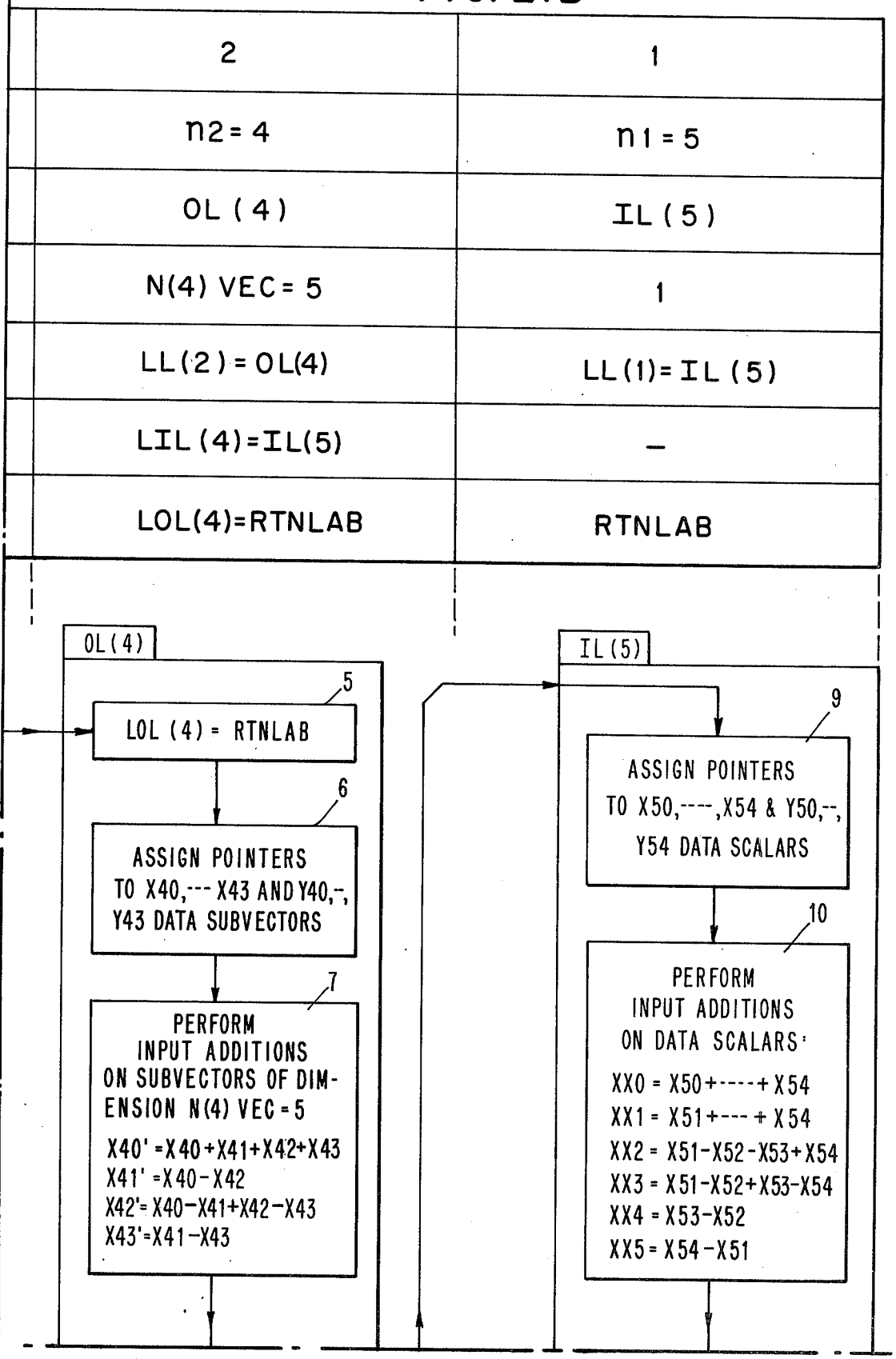
Figure 21D:
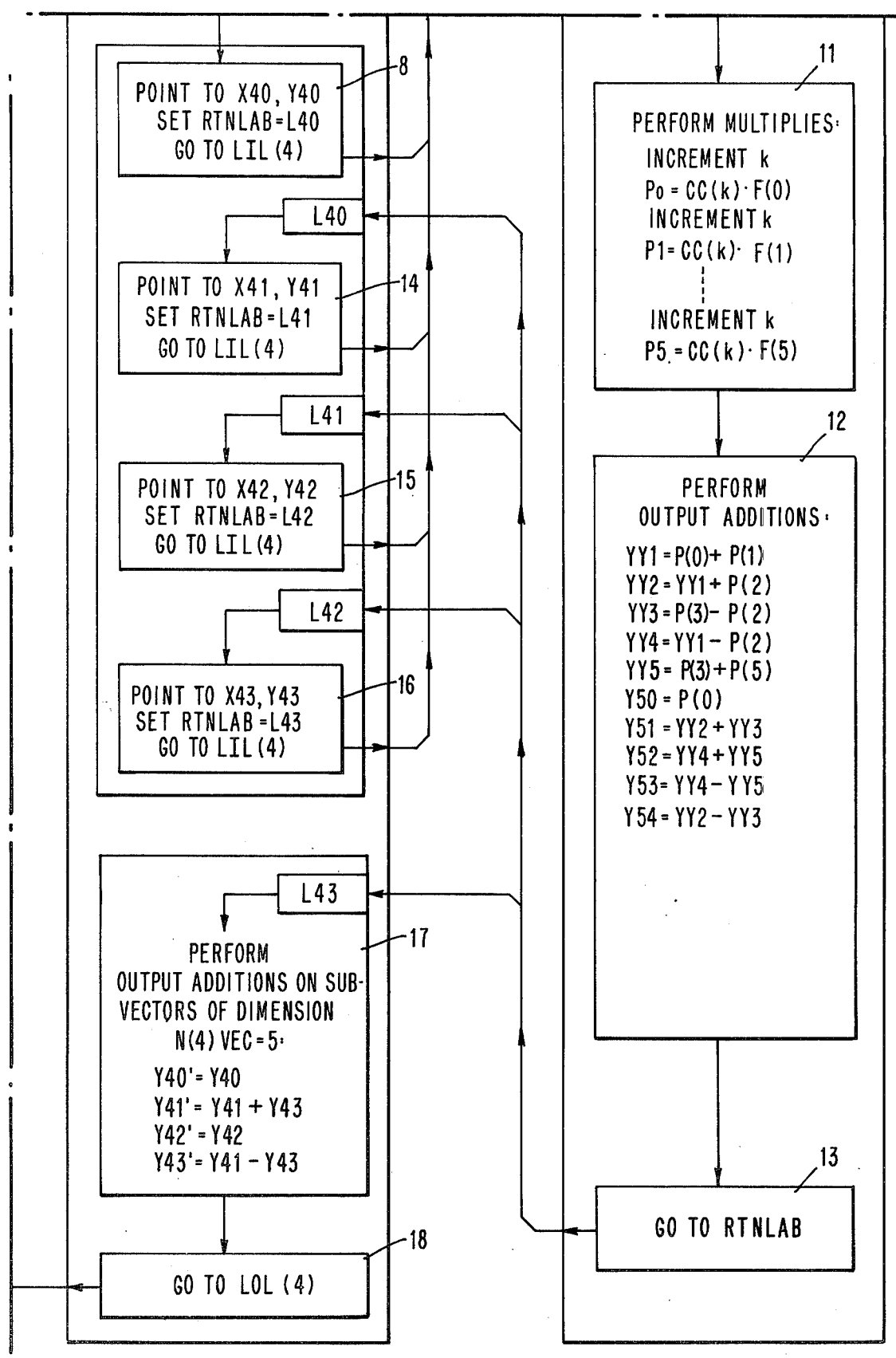

As stated previously, FIG. 21 as referred to herein, refers to the complete loop transition sequence, comprising FIGS. 21A through 21D. The organizational drawing of FIG. 21 appearing in the upper lefthand corner of FIG. 21C shows the actual organization of the four figures making up this single composite. It will be noted that the header in FIG. 21 is the same overall format as the header for FIG. 14. However, since this is a parameterized version, there are exactly 3 loops, therefore L=3 and these three loop factors are 5, 4 and 3 respectively, for loops 1, 2 and 3. The loop procedures, are specifically designated as IL5, OL4 and OL3, for loops 1, 2 and 3. The vector dimensions are 1, 5 and 20, as discussed previously with respect to FIG. 20 and the loop entry label for each loop is the beginning address in the System Control ROM for each of said loop procedures. The loop inward labels are as specified and are fixed for each loop. The loop outward labels are computed at the time of each inward transition, as will be appreciated in such a branching structure.

It will be noted in referring to the actual flow chart portions of FIG. 21, that the various blocks have been parameterized to the extent of labeling and referring to the various data subvectors as well as their implied address in the Data RAM. This addressing and instructional format may be seen to be taken directly from the three specified loop procedures or operational sequences for the three loops OL3, OL4 and IL5. Since FIG. 14 was described in considerable detail previously, the present description will presume a knowledge of this previous description and will proceed somewhat more briefly. As stated before, FIG. 21 is completely parameterized to the vector dimension N=60, and accordingly, the outer loop is shown to have 3 pseudo multiplies, loop 2 is shown to have 4 pseudo multiplies and the inner loop has 6 real scalar multiplies.

Referring now specifically to the figure, block 1 is the entry point into the outer loop OL3. At this point the loop outward label is set equal to the current setting of the return label. It will be remembered that the main procedure sequence caused this label to be set equal to the first instruction of the output reordering sequence in the System Control ROM. In block 2, pointers are assigned for the three data vectors X30, X31 and X32 in the data array X, and Y30, Y31 and Y32 in the data array Y. The vector dimension N(3) VEC=20 is utilized in this pointer assignment. In block 3, the actual indicated input additions are performed upon the three subvectors of dimension 20.

In block 4 the first pseudo multiply causes the pointers to be set for taking the first 20 unit vector into the adjacent inner loop. Also the return label is set to L30, which is the proper entry point back into sequence OL3. The system then proceeds to LIL(3) which is block 5 in loop 2. This causes loop outward label to be set equal to the return label which was set equal to L30 in block 4 of the previous loop. Block 6 causes pointers to be assigned to the 4 data subvectors of dimension 5 in the 20 member subvector brought into this loop. Thus, block 6 breaks up the 20 unit subvector in the four 5 unit subvectors, utilizing the vector dimension calculated for this loop of N(4) VEC=5. Block 7 causes the specified input additions to be performed and appropriately stored in the X data array.

Block 8 is the first pseudo multiply in procedure OL4 and causes the system pointers to be set to the first subvector preparatory to proceeding to the innermost loop procedure IL5. In addition the working register labeled RTNLAB is set equal to L40 which is the proper branchback point into this procedure, and finally the system proceeds to the loop inward label for this loop which has been previously set, equal to IL5.

In block 9 pointers are assigned so that the 5 member subvectors, carried into procedure IL5, may be accessed and the appropriate calculations performed thereon. Block 10 causes the input additions to be performed on the scalar quantities, it being noted that there are 6 factors XX0 through XX5, which must be derived. This, as will be understood by referring to the IL5 procedure, is necessary since there are 6 multiplications performed in block 11, the products of which are referred to in block 11 as P0 through P5. Each of the multiplies of block 11, it will be noted, comprises the product of one of the computed XX factors and an accessed composite coefficient from the the composite coefficient table stored in the System RAM. When all 6 required multiplies have been performed the system proceeds to block 12, where the indicated output additions are performed and the result of said output additions stored in the Y data array as indicated. The system then proceeds to block 13, which is the last block of procedure IL5. This block causes the system to return to the address stored in the register RTNLAB, which in block 8 was set to L40.

L40 causes block 14 to be entered, which causes again an appropriate setting of the data pointers, the RTNLAB register, and the branching to the inner loop IL(5) specified by LIL(4). Blocks 15 and 16 are essentially identical to blocks 8 and 14, except that on each inward transition, a different subvector is carried in, however, all inner loop operations are functionally identical. After the fourth transition the system will return to the label L43 and block 17 causes the appropriate output additions to be performed in loop 2, utilizing the 4 transformed subvectors, Y40 through Y43. The completion of the output additions in block 17, causes the system to proceed to block 18, as the last sequence in loop 2. This block causes the system to proceed back to the current setting of the loop outward label for this procedure. Assuming this was the first inward transition, the system would return to block L30 in the sequence OL3.

On subsequent outward transitions the system would go to addresses L31 and L32, respectively, as the second and third inward transitions are completed. Assuming for the sake of explanation that the 3 inward loop transitions from procedure OL3 have been completed, block 21 would be entered via address L32 and the indicated output additions on the three 20 element subvectors obtained from loop 2 would be performed as indicated. Upon the termination of block 21, a 60 element non-reordered vector $A_N'$ is a resident in the Y array in the Data RAM.

Block 22 causes the system to proceed to the loop outward label for this block, which as stated with respect to block 1, was set to be the first instruction of the output reordering sequence stored in the System Control ROM. This last procedure causes the final reordering of the final vector to the form $A_N' \rightarrow A_N$ which is the desired transform vector.

This completes the transform operation, it being clearly understood that the same type of explanation could easily be applied and derived for any desired transform on any of the allowable N's from the factors of N table, which appeared earlier in the specification.

Figure 22A:
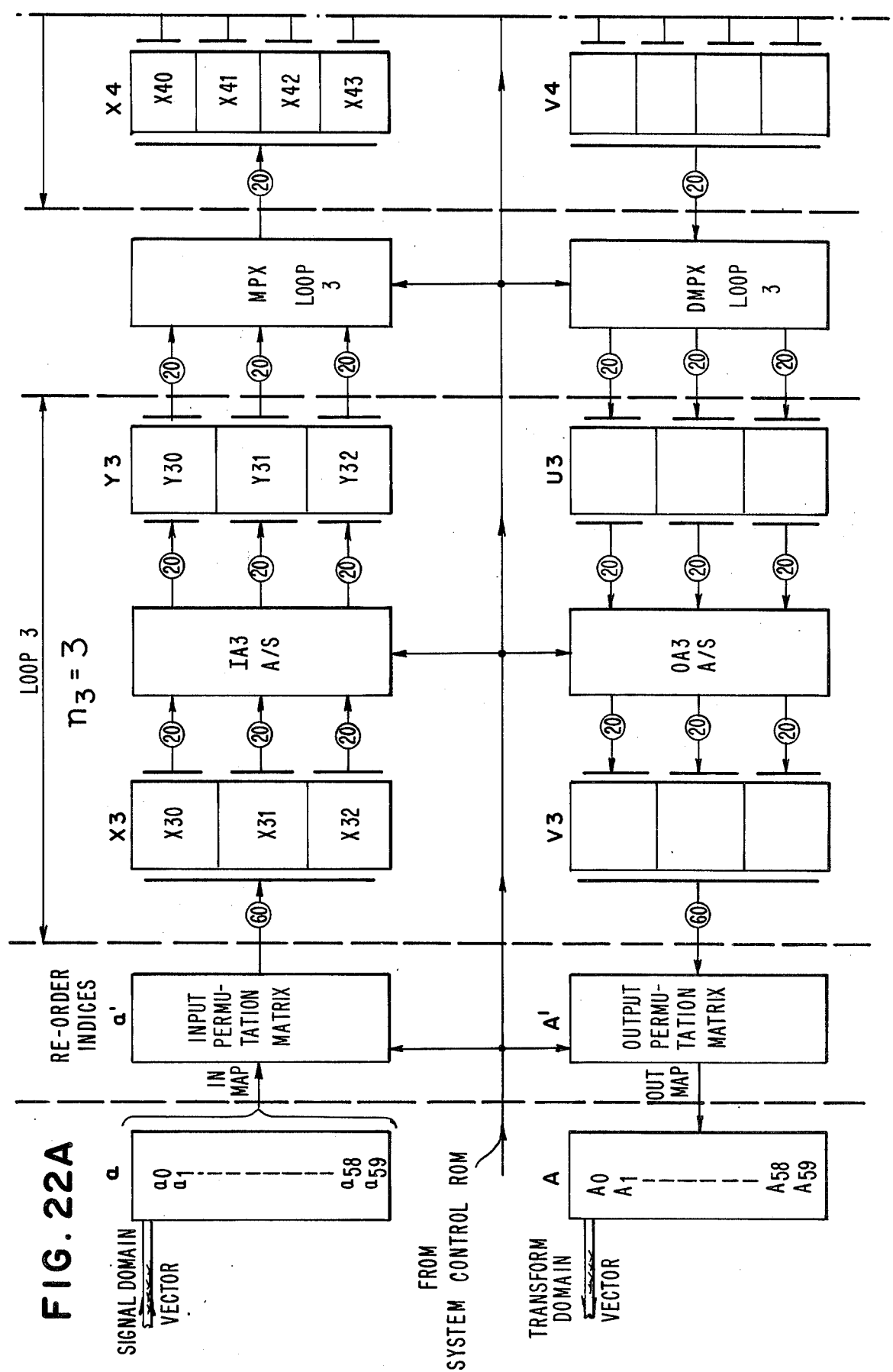
FIG. 22 comprises a block diagram of alternative embodiment of the present invention comprising a distributed system tailored to the specific example of N=60.
Figure 22B:
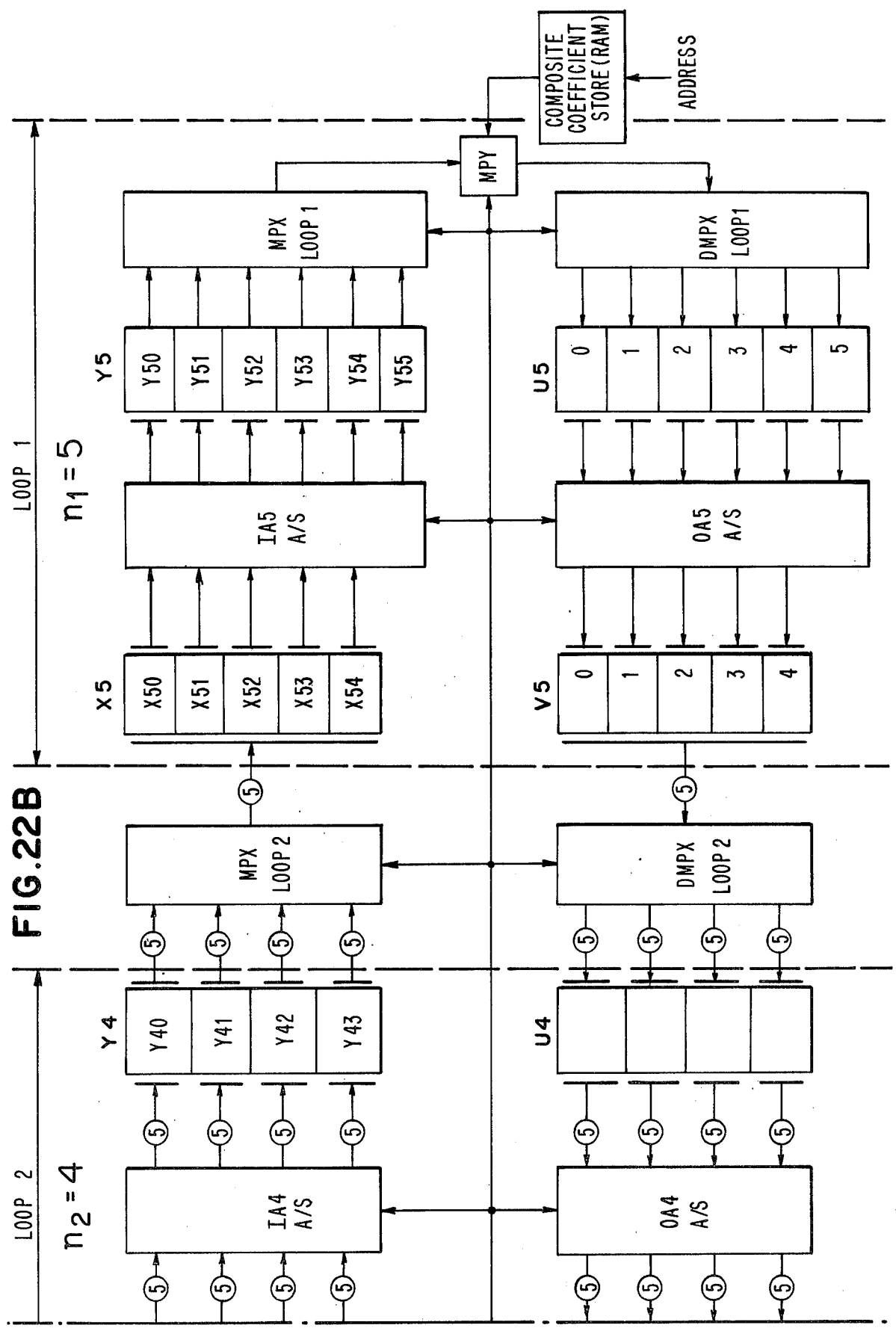

Referring now to FIG. 22 which comprises a composite of FIGS. 22A and 22B, a somewhat different system architecture is utilized to perform the actual evaluation portion of the Fourier transform disclosed herein. In this embodiment the actual hardware organization presumes that all but the initialization computations is in effect built into the system. In this embodiment the system is broken up into highly parallel architectural segments dedicated to a given loop. It will readily be appreciated that for a very general type system such an architecture could conceivably be quite ineffective insofar as utilization of hardware is concerned. For example, in the present embodiment it is presumed that a vector of the size N=60 is being processed and that there are accordingly just three loops needed. In this case, each of the storage registers X3 and Y3 in loop 3 needs to be 20 elements wide with 3 such segments X30, X31, X32, Y30, Y31 and Y32. Similarly, the adder IA3 which is a mnemonic designation for the input adder for the third loop, is similarly 20 elements wide for this particular value of N.

If on the other hand a much larger value of N were being processed the outer loop factor, i.e., loop 3 ($n_3=3$) then each segment of the registers as well as the adder width would have to be appropriately larger. It may readily be seen that if hardware is generalized the width of the elements available for each of the dedicated loop hardware structures would have to be wide enough to accommodate the largest vector that could be encountered. However, as in the presently disclosed configuration, where the system is dedicated to a particular value of N, great savings in hardware is obviously possible.

Returning again to the particular embodiment, it will be noted that the various gating controls for gating the particular values from the X3 register into the IA3 adder are presumed to be built into the system. Thus reference to the input add section of FIG. 21 will indicate the particular elements in said register which are required to produce the result of the add which is stored in the Y3 register. It will also be noted that the Y3, Y4, and Y5 registers are the same as the Y' values shown in FIG. 21 as the result of the variously specified input adds. Similarly for the output adds at the bottom of FIG. 22 the Y registers receive the results of these adds which are shown in the formulas of FIG. 21 as the quantities Y'.

The basic system control commands for such a system would come from a System Control ROM in very much the same way that they are accessed and utilized to control the embodiment of FIG. 1. However, it will apparent to those skilled in the art that the Outer Loop Operational Sequences and the Inner Loop Operational Sequences may be greatly simplified, at least in the specific case, for a fixed value of N as various registers and multiplexors automatically gate the desired data vectors during both inward and outward transitions. Thus the multiplexor (MPX) for loop 3 accesses the desired 20-member vector from the store Y3 and transmits same to the store X4 upon command. Thus the Operational Sequence OL3 sends a signal which activates the multiplexor and also indicates which of the three subvectors stored in Y3 is to be passed into X4. Similarly in register X4 of loop 2 the 20-member vector is automatically sequentially stored as four 5-member vectors.

Thus during the three necessary transitions from loop 3 to loop 2 the system accesses the three successive 20-member vectors Y30, Y31, Y32 to be gated into register X4. During each of these transitions to loop 2 the required input adds are performed in IA4 under control of the Operational Sequence OL4 and they are subsequently stored in the register Y4. The MPX for loop 2, in exactly the same fashion, gates successive 5 number vectors from Y4 into register X5 of loop 1. The adder IA5 performs the requisite input adds to load the scalar value so obtained into register Y5 after which the MPX for loop 1 gates successive scalar factors from Y5 into the multiplier (MPY) which receives in addition, for each multiplication, a specific composite coefficient from the associated composite coefficient storage RAM. The demultiplexer for loop 1 (DMPX) gates the result of each multiplication into the proper storage location in register U5 and the output adder for loop 1, OA5, performs the output additions specified for that adder by the Operational Sequence IL5 and stores the results in register V5. An outward transition next occurs and the DMPX for loop 2 causes the 5-member vector in V5 to be stored in the proper storage location in register U4 of loop 2. The requisite output adds for this loop are performed in OA4 under control of the Operational Sequence OL4 and the results stored in V4. It will of course be understood that before the output adds in loop 2 are performed, all of the current inward transitions into loop 1 must have been performed for this particular loop 2 sequence and thus the register U4 will be completely filled with data. Once the inner loop transitions have caused V4 to be filled, the DMPX for loop 3 is energized and an appropriate 20-member vector will be stored in the indicated register for loop 3, register U3. Similarly when all inward transitions through loop 2 have occurred and register U3 is completely filled with transformed data, adder OA3 is activated under control of Operational Sequence OL3 and the specified output adds are performed and stored in register V3.

At this point the primary portion of the transform has been performed and the only remaining operation is the reordering.

Referring to the figure, there are two blocks labeled Input Permutation Matrix and Output Permutation Matrix: The first causes the input vector $a_n$ to be reordered into the required vector $a_{N'}$. Similarly the Output Permutation Matrix causes the output from register V3 which is in the form $A_{N'}$ to be permuted to the form $A_N$ which is the desired output vector.

The permutations performed in these two matrices are exactly equal to the input and output reordering table described in detail previously with respect to FIGS. 6 and 7. The mapping results obtained with said input and output reordering tables are obtained in a fixed hardware form in the two matrices shown in the embodiment of FIG. 22.

It will thus be seen that the dedicated hardware of FIG. 22 would be capable of operating at considerably greater speed than the more generalized version of the embodiment of FIG. 1 since much of pointer generation and addressing would not be necessary with the dedicated hardware architecture of FIG. 22.

However, it should be understood that the basic organizational architecture of the two embodiments is essentially the same and they both utilize the specific operational sequences indicated by the listing of the small n algorithms for solving the respective discrete Fourier transform matrices for each particular factor. Exactly the same loop transitions occur with both embodiments and exactly the same data vectors are operated on in substantially the same sequence with both embodiments.

It should of course be understood that the particular order in which individual input adds, output adds and even multiplies occur makes no difference as long as the particular operations result in the same output vector $A_N$.

Conclusions

Having described the preferred embodiment of the invention of FIG. 1, and also the secondary embodiment, exemplified by FIG. 22, any person skilled in the computer arts should be able without exercise of more than routine skill in the art, tp construct such a system architecture capable of performing the extremely fast and efficient Fourier Transform disclosed herein.

It will readily be appreciated that obviously many architectural details could be changed by those skilled in the art, without departing from the spirit and scope of the presently disclosed invention. The two embodiments disclosed herein could be utilized for somewhat different purposes in a final machine structure. The embodiment of FIG. 1 is more general in nature in that it could readily handle a much larger range of vector dimension N's, and would probably be much more economical in the use of memory. The embodiment disclosed rather briefly, with respect to FIG. 22, would be tailored to a much narrower range of values of N, although it could easily be designed to operate faster as various segments of the memory are dedicated to a particular loop's operations and many of the gating and memory address generation and accessing functions would be greatly shortened with the embodiment of FIG. 22.

In summation, it should be remembered, that the present system is applicable only to a specific set of values of N's, which meet the criteria, that they must be the product of a plurality of factors, which are on the one hand mutually prime, and which on the other hand, are chosen solely from the group consisting of 2, 3, 4, 5, 7, 8, 9, 13 and 16. Of this group of factors obviously 3 and 9 may not both be used in a single transform, and similarly only one of the group consisting of 2, 4, 8 and 16, may appear in any transform.

As was discussed in detail previously in the mathematical description, underlying the present concept, was the development of the small-n algorithms for each of the above specified factors which allows the greatly reduced numbers of multiplies to be performed for a given DFT of that particular factor. Thus, although these algorithms are not considered patentable, nor is any attempt made to patent same herein; nevertheless, it was their development which makes the present solution method feasible.

Finally the unique feature of the present solution method utilizes the nested loop evaluation procedure, wherein only addition operations are performed in the outer loops, said additions being on vector quantities. Additionally, real multiplies are performed only in the inner loop and on scalar quantities.

Further, the occurrence of an apparent multiply operation in an outer loop causes a transition to the next adjacent inner loop, and the evaluation of the complete inner loop is performed before the outer loop is again entered.

The presently disclosed system architecture for performing the Discrete Fourier Transform on a specially designed digital computer system, greatly improves the efficiency of such solutions, and thus the adaptability of the Fourier Transform concept to a much wider range of problem applications than was heretofore possible with slower and thus more expensive methods and apparatus.

While the invention has been set forth and described with respect to two rather specific embodiments, it will be appreciated that other and different systems could readily be designed by those skilled in the art, without significantly departing from the spirit and scope of the present invention.

What is claimed is:

1. A digital electronic computing system architecture for performing a discrete Fourier Transform on a plurality (N) of electrical input signals, wherein N is selected to be factorable into a plurality of mutually prime factors ($n_j$) chosen from the group 2, 3, 4, 5, 7, 8, 9, 13 and 16, said system incorporating a nested loop solution method characterized by performing only vector additions and subtractions in the outer loops and scalar additions, subtractions and multiplies in the innermost loop, each loop operation being controlled by a unique control mechanism, dedicated to each said loop, said system comprising a system parameter read only memory for storing system constants related to the permissible factors 2, 3, 4, 5, 7, 8, 9, 13 and 16, and an allowable values of N table, a system random access memory for storing precomputed constants to be used during the actual transform evaluation procedure, and a data random access memory for storing the input and output data signals and intermediate results computed during the transform operation, an arithmetic and logic unit for performing the requisite additions, subtractions and multiplications, comprising the transform operations, input and output registers for storing data input to, and to be output from, the system while being transformed into and out of the data memory, a plurality of working registers for storing the intermediate results of the arithmetic and logic unit, and control unit means for effecting the transfer of data into and out of said system, into and out of said memories and for controlling operations of the arithmetic and logic unit to effect individual loop operational sequences which perform the said nested loop Fourier Transform operation, means for automatically transferring control from one operational sequence in said control unit to another whenever loop transitions are called for, said last named means comprising a decoder which recognizes an apparent multiply operation whenever such is encountered during an outer loop operational sequence, further means resident in said control unit for performing the evaluation of the Fourier Transform of the input signal vector utilizing said precomputed system constants, and means to selectively perform as many Fourier Transforms of successive different N-dimensioned input signal vector sets as desired utilizing the same precomputed system constants.

2. A digital electronic computer system architecture as set forth in claim 1, said control means for performing said initialization functions including means for verifying that a particular input vector dimension N is proper, means for determining the proper order of the various loop operational sequences forming said nested loop solution method based on the numerical value of the respective factors (n) of the overall vector which are chosen, means for computing and storing input and output reordering tables which allow the use of highly efficient individual DFT solution methods for each of the loops making up a particular transform, means for calculating and storing the composite coefficients to be utilized with each multiplication operation which occurs in the innermost loop solution, means for calculating and storing the vector dimensions to be utilized with each outer loop of the solution procedure and means for determining, evaluating and appropriately storing control flow linkage information to properly effect transition from the loop operational sequences as required by the overall transform procedure.

3. A digital electronic computer system architecture as set forth in claim 2, wherein the evaluation portion of said control unit includes means for reordering the input signal vector $a_N$ utilizing the previously calculated and stored input map, means for specifically controlling the nested loop transform sequence which performs the Fourier Transform operation on the reordered input vector $a_N'$ and converts same to the transformed vector $A_n'$ said last named means effecting the transfer of precomputed transform parameters from said system random access memory and input signal vector data from the data random access memory and which performs the requisite operations in the arithmatic and logic unit and places the appropriately transformed data vectors back in the data random access memory in sequential steps until the transform operation has been completed, and means for performing an output reordering operation utilizing the previously calculated output reordering map to permute the transformed vector $A_N'$ into the desired output vector $A_N$.

4. A digital electronic computer system architecture as set forth in claim 3, wherein said evaluation portion of said control unit includes means for accessing the loop parameters for each loop and utilizing this information to sequentially access data subvectors from memory to perform input and output additions and subtractions sequentially on the individual data segments making up the overall vector input to each loop, and means for storing said so modified data vectors back in the data random access memory in consecutive storage locations for subsequent ordered sequential accessing.

5. A digital electronic computing system architecture uniquely adapted for performing a discrete Fourier Transform on an N-dimensioned input signal vector wherein N is chosen so that it is factorable into a plurality of mutually prime factors $(n_j)$ chosen from the group consisting of 2, 3, 4, 5, 7, 8, 9, 13 and 16, said system including control means for effecting said transform utilizing a nested loop solution method wherein the various loops are each related to particular factors whose product equals the input vector dimension N, said nested loop solution method being characterized by the performance of vector additions and subtractions in the outer loops and all scalar additions, subtractions and multiplications in the innermost loop, wherein each loop operation is controlled by a unique dedicated loop operation control sequence based upon a unique optimized solution method for the particular factor to which said loop is related, said system architecture comprising as many arithmetic/logic units as there are loops for a particular transform solution and a dedicated memory for each of said arithmetic and logic units, the width of each arithmetic/logic unit and its associated memory associated with each outer loop operational sequence being sufficient to perform full vector width additions and subtractions as required of each outer loop sequence, the arithmetic and logic unit associated with each outer loop sequence includes only addition and subtraction functions, and wherein the arithmetic and logic unit associated with the innermost loop includes addition, subtraction and multiplication functions, the width of said innermost loop arithmetic unit being equal to the greatest number of addition, subtraction and multiplication operations which may be performed that do not require as an input the result of a prior addition, subtraction or multiplication operation, respectively, whereby maximum parallel operation is obtained, said control means including further means for causing inward loop transitions to occur whenever a multiply operation is encountered in an outer loop, and outward loop transitions to occur whenever an inner loop sequence is completed, said system further including means for transferring specified data subvectors on both inner and outer loop transitions.

6. A digital electronic computing system architecture as set forth in claim 5, wherein said dedicated memory associated with each loop comprises a large single random access memory which is partitioned according to computed pointers which point to the beginning and end of the input signal data vector to each loop, means for computing said pointers and a series of subpointers from the numerical value of the factor associated with each loop and the width of the input vector to the loop, each said dedicated memory section including separate storage locations for storing the input signal vector to each loop, the intermediate results of arithmetic operations performed in said loop and the final data vectors produced by all of the specified operational sequence within said loop.

7. A digital electronic computing system architecture as set forth in claim 6, including means resident in said control means for precomputing loop constants which are fixed for each loop once a suitable value for the input signal vector dimension N is chosen, and means in said control unit for performing a predetermined number of evaluations of a particular Fourier Transform of an input signal vector of fixed dimension N utilizing said precomputed system constants wherein each new data input signal vector may differ from the preceding one.

* * * * *